United States Patent
Zhang et al.

(10) Patent No.: US 8,609,244 B2
(45) Date of Patent: Dec. 17, 2013

(54) ENGINEERED LOW-DENSITY HETEROGENEOUS MICROPARTICLES AND METHODS AND FORMULATIONS FOR PRODUCING THE MICROPARTICLES

(75) Inventors: Huagang Zhang, Yucaipa, CA (US); Hamid Hojaji, Claremont, CA (US); Shannon Marie Labernik, Rancho Cucamonga, CA (US); David L. Melmeth, Fontana, CA (US); Thinh Pham, Rancho Cucamonga, CA (US); James A. McFarlane, Sydney (AU)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 11/636,136

(22) Filed: Dec. 8, 2006

(65) Prior Publication Data
US 2008/0096018 A1 Apr. 24, 2008

Related U.S. Application Data

(60) Provisional application No. 60/748,784, filed on Dec. 8, 2005.

(51) Int. Cl.
| | |
|---|---|
| *B32B 5/16* | (2006.01) |
| *C03C 10/06* | (2006.01) |
| *C03C 10/14* | (2006.01) |
| *C03C 11/00* | (2006.01) |
| *C03C 12/00* | (2006.01) |

(52) U.S. Cl.
USPC ......... 428/402; 501/4; 501/8; 501/33; 501/39

(58) Field of Classification Search
USPC ................. 428/402–406; 501/4, 8, 33, 39
See application file for complete search history.

(56) References Cited

U.S. PATENT DOCUMENTS

| | | | |
|---|---|---|---|
| 1,819,093 A | 8/1931 | Hardinge | 241/48 |
| 2,619,776 A | 12/1952 | Potters | 65/21.3 |
| 2,676,892 A | 4/1954 | McLaughlin | |

(Continued)

FOREIGN PATENT DOCUMENTS

| | | |
|---|---|---|
| CA | 1040859 | 10/1978 |
| DE | 3213521 A1 | 6/1983 |

(Continued)

OTHER PUBLICATIONS

Litigation documents corresponding to Civil Case Nos. SCVSS115246, 5:04 CV-00674-RT-SGL, 04-C 1621, 05-CV-44, and 04-CV-152, dated Dec. 15, 2004.

(Continued)

*Primary Examiner* — Hoa (Holly) Le
(74) *Attorney, Agent, or Firm* — Knobbe Martens Olson & Bear, LLP

(57) ABSTRACT

A low density material and a method for preparing a low-density material and precursor for forming a low-density material are provided. An aqueous mixture of inorganic primary component and a blowing agent is formed, the mixture is dried and optionally ground to form an expandable precursor. Such a precursor is then fired with activation of the blowing agent being controlled such that it is activated within a predetermined optimal temperature range. The firing conditions are also controlled to provide a low density sphere containing a heterogeneous sphere wall structure comprising a combination of amorphous glass and a crystalline phase or gas phase or both.

8 Claims, 20 Drawing Sheets

(56) References Cited

U.S. PATENT DOCUMENTS

| | | | |
|---|---|---|---|
| 2,746,735 A | 5/1956 | Bradford | 432/58 |
| 2,762,619 A | 9/1956 | Booth | 432/58 |
| 2,782,018 A | 2/1957 | Bradford | 432/15 |
| 2,797,201 A | 6/1957 | Veatch | |
| 2,838,881 A | 6/1958 | Plumat | 65/142 |
| 2,945,326 A | 7/1960 | Wood | 65/142 |
| 2,947,115 A | 8/1960 | Wood | 65/142 |
| 2,978,339 A | 4/1961 | Veatch et al. | 65/21.4 |
| 2,978,340 A | 4/1961 | Veatch et al. | |
| 3,010,177 A | 11/1961 | Thompson et al. | 264/117 |
| 3,081,179 A | 3/1963 | Charvat et al. | 501/35 |
| 3,150,947 A | 9/1964 | Bland | 65/21.2 |
| 3,215,505 A | 11/1965 | Schmalfeld et al. | |
| 3,256,105 A | 6/1966 | Alford | |
| 3,279,905 A | 10/1966 | Wood et al. | 65/21.2 |
| 3,293,014 A | 12/1966 | Callender et al. | 65/21.2 |
| 3,297,411 A | 1/1967 | Dear | |
| 3,321,414 A | 5/1967 | Vieli | |
| 3,341,314 A | 9/1967 | Vukasovich et al. | 65/142 |
| 3,348,956 A | 10/1967 | Ekdahl | 501/95.1 |
| 3,365,315 A | 1/1968 | Beck et al. | |
| 3,495,961 A | 2/1970 | Lange | 65/21.2 |
| 3,560,185 A | 2/1971 | Nylander | 65/142 |
| 3,560,186 A | 2/1971 | Nylander | 65/142 |
| 3,736,162 A | 5/1973 | Chvalovsky et al. | 524/4 |
| 3,752,685 A | 8/1973 | Honda et al. | |
| 3,782,985 A | 1/1974 | Gebhardt | |
| 3,838,998 A | 10/1974 | Matthews et al. | |
| 3,873,475 A | 3/1975 | Pechacek et al. | |
| 3,877,918 A | 4/1975 | Cerbo | 65/142 |
| 3,887,386 A | 6/1975 | Majumdar | 106/711 |
| 3,888,957 A | 6/1975 | Netting et al. | |
| 3,904,377 A | 9/1975 | Honda et al. | |
| 3,904,424 A | 9/1975 | Aoki et al. | 501/38 |
| 3,909,283 A | 9/1975 | Warnke | |
| 3,924,901 A | 12/1975 | Phillips | 406/51 |
| 3,954,390 A | 5/1976 | Akhundov et al. | 432/14 |
| 4,002,482 A | 1/1977 | Coenen et al. | 501/33 |
| 4,046,548 A | 9/1977 | Wood et al. | 65/142 |
| 4,057,908 A | 11/1977 | Mirliss et al. | 34/360 |
| 4,059,423 A | 11/1977 | DeVos | |
| 4,102,773 A | 7/1978 | Green et al. | 201/28 |
| 4,111,713 A | 9/1978 | Beck | |
| 4,133,854 A | 1/1979 | Hendricks | |
| 4,153,439 A | 5/1979 | Tomic et al. | 65/482 |
| 4,161,389 A | 7/1979 | Staffin et al. | 432/58 |
| 4,205,992 A | 6/1980 | Mogensen et al. | 501/36 |
| 4,217,335 A | 8/1980 | Sasaki et al. | 423/345 |
| 4,226,841 A | 10/1980 | Komeya et al. | 423/345 |
| 4,234,344 A | 11/1980 | Tinsley et al. | |
| 4,235,753 A | 11/1980 | Brown et al. | |
| 4,235,836 A | 11/1980 | Wassell et al. | |
| 4,243,421 A | 1/1981 | Kume et al. | 501/35 |
| 4,252,193 A | 2/1981 | Powers et al. | |
| 4,292,206 A | 9/1981 | Barnes, Jr. et al. | |
| 4,303,732 A | 12/1981 | Torobin | |
| 4,304,604 A | 12/1981 | Daerr et al. | 501/38 |
| 4,305,758 A | 12/1981 | Powers et al. | |
| 4,307,142 A | 12/1981 | Blitstein et al. | |
| 4,330,634 A | 5/1982 | Rodaway | |
| 4,332,618 A | 6/1982 | Ballard | |
| 4,336,338 A | 6/1982 | Downs et al. | |
| 4,340,407 A | 7/1982 | Anderson et al. | |
| 4,347,155 A | 8/1982 | Jenkins | 252/378 P |
| 4,362,566 A | 12/1982 | Hinterwaldner | |
| 4,363,878 A | 12/1982 | Yamamoto et al. | 501/36 |
| 4,370,166 A | 1/1983 | Powers et al. | |
| 4,394,346 A | 7/1983 | Morooka | |
| 4,411,847 A | 10/1983 | Netting et al. | |
| 4,430,108 A | 2/1984 | Hojaji | |
| 4,448,599 A | 5/1984 | MacKenzie et al. | |
| 4,475,936 A | 10/1984 | Aston et al. | |
| 4,487,620 A | 12/1984 | Neusy et al. | 65/21.3 |
| 4,501,830 A | 2/1985 | Miller et al. | |
| 4,504,320 A | 3/1985 | Rizer et al. | |
| 4,512,736 A | 4/1985 | Wader et al. | 432/58 |
| 4,519,777 A | 5/1985 | Akhtyamov et al. | 432/13 |
| 4,538,530 A | 9/1985 | Whitman | 110/260 |
| 4,540,629 A | 9/1985 | Sands et al. | |
| 4,595,662 A | 6/1986 | Mochida et al. | 501/15 |
| 4,602,962 A | 7/1986 | Fehlmann | |
| 4,621,024 A | 11/1986 | Wright | |
| 4,623,390 A | 11/1986 | Delmonico | |
| 4,624,798 A | 11/1986 | Gindrup et al. | |
| 4,629,413 A | 12/1986 | Michelson et al. | 431/9 |
| 4,637,990 A | 1/1987 | Torobin et al. | |
| 4,643,753 A | 2/1987 | Braun | 65/21.3 |
| 4,652,433 A | 3/1987 | Ashworth et al. | |
| 4,652,535 A | 3/1987 | Mackenzie et al. | 501/27 |
| 4,657,810 A | 4/1987 | Douden | |
| 4,661,137 A | 4/1987 | Garnier et al. | |
| 4,677,022 A | 6/1987 | Dejaiffe | 428/312.6 |
| 4,687,752 A | 8/1987 | Peters | |
| 4,749,398 A | 6/1988 | Braun | 65/142 |
| 4,751,202 A | 6/1988 | Toussaint et al. | |
| 4,751,203 A | 6/1988 | Toussaint et al. | |
| 4,752,061 A | 6/1988 | Dalton et al. | 266/87 |
| 4,767,726 A | 8/1988 | Marshall | |
| 4,769,189 A | 9/1988 | Douden | |
| 4,784,839 A | 11/1988 | Bachelard et al. | |
| 4,818,289 A | 4/1989 | Mantymaki et al. | 106/789 |
| 4,818,290 A | 4/1989 | Tuovinen et al. | 106/789 |
| 4,819,289 A | 4/1989 | Gibbs | 7/118 |
| 4,826,788 A | 5/1989 | Dennert et al. | |
| 4,830,989 A | 5/1989 | Trivedi et al. | 501/35 |
| 4,837,069 A | 6/1989 | Bescup et al. | |
| 4,851,203 A | 7/1989 | Bachelard et al. | |
| 4,867,931 A | 9/1989 | Cochran, Jr. | |
| 4,871,495 A | 10/1989 | Helferich et al. | |
| 4,882,302 A | 11/1989 | Horiuchi et al. | 501/27 |
| 4,888,057 A | 12/1989 | Nguyen et al. | 106/18.12 |
| 4,894,081 A | 1/1990 | Neusy et al. | 65/142 |
| 4,904,292 A | 2/1990 | Neusy et al. | 65/21.3 |
| 4,928,479 A | 5/1990 | Shekleton et al. | 60/804 |
| 4,937,210 A | 6/1990 | Jones et al. | |
| 4,946,811 A | 8/1990 | Tuovinen et al. | 501/155 |
| 4,981,666 A | 1/1991 | Yamada et al. | |
| 4,983,550 A | 1/1991 | Goetz et al. | |
| 5,002,696 A | 3/1991 | White | 252/378 R |
| 5,022,897 A | 6/1991 | Balcar et al. | 95/279 |
| 5,064,784 A | 11/1991 | Saito et al. | 501/33 |
| 5,069,702 A | 12/1991 | Block et al. | |
| 5,077,241 A | 12/1991 | Moh et al. | |
| 5,096,858 A | 3/1992 | Das Chaklader et al. | |
| 5,117,770 A | 6/1992 | Hassinen et al. | 110/245 |
| 5,128,114 A | 7/1992 | Schwartz | |
| 5,143,534 A | 9/1992 | Kilner et al. | 65/21.3 |
| 5,154,596 A | 10/1992 | Schwartz et al. | 431/9 |
| 5,164,003 A | 11/1992 | Bosco et al. | |
| 5,164,345 A | 11/1992 | Rice et al. | |
| 5,176,732 A | 1/1993 | Block et al. | |
| 5,190,737 A | 3/1993 | Weimer et al. | 423/345 |
| 5,194,334 A | 3/1993 | Uerdingen et al. | |
| 5,217,928 A | 6/1993 | Goetz et al. | 501/33 |
| 5,253,991 A | 10/1993 | Yokota et al. | 425/6 |
| 5,256,180 A | 10/1993 | Garnier et al. | 65/142 |
| 5,292,690 A | 3/1994 | Kawachi et al. | |
| 5,349,118 A | 9/1994 | Davidovits | |
| 5,384,345 A | 1/1995 | Naton | |
| 5,407,983 A | 4/1995 | Naton | |
| 5,443,603 A | 8/1995 | Kirkendall | |
| 5,455,212 A | 10/1995 | Das Chaklader et al. | |
| 5,458,973 A | 10/1995 | Jeffs | |
| 5,525,556 A | 6/1996 | Dunmead et al. | |
| 5,534,348 A | 7/1996 | Miller et al. | |
| 5,558,822 A | 9/1996 | Gitman et al. | 264/15 |
| 5,559,170 A | 9/1996 | Castle | 523/223 |
| 5,580,907 A | 12/1996 | Savin | |
| 5,591,684 A | 1/1997 | Kawachi et al. | |
| 5,601,789 A | 2/1997 | Ruhl et al. | 422/168 |
| 5,609,833 A | 3/1997 | Ruhl et al. | 422/173 |
| 5,611,833 A | 3/1997 | Brahmbhatt et al. | 65/21.3 |
| 5,611,883 A | 3/1997 | Tompkins et al. | 156/272.8 |
| 5,618,173 A | 4/1997 | Ruhl et al. | 431/183 |

(56) References Cited

U.S. PATENT DOCUMENTS

| | | | |
|---|---|---|---|
| 5,655,853 A | 8/1997 | Wormser | 406/66 |
| 5,658,656 A | 8/1997 | Whitney et al. | |
| 5,676,536 A | 10/1997 | Ruhl et al. | 431/5 |
| 5,676,563 A | 10/1997 | Kondo et al. | 439/502 |
| 5,743,393 A | 4/1998 | Webb et al. | 206/319 |
| 5,849,055 A | 12/1998 | Arai et al. | |
| 5,858,083 A | 1/1999 | Stav et al. | |
| 5,883,029 A | 3/1999 | Castle | 501/33 |
| 5,895,768 A | 4/1999 | Speit | |
| 5,899,256 A | 5/1999 | Rohatgi | |
| 5,925,449 A | 7/1999 | Davidovits | |
| 5,932,347 A | 8/1999 | Rapp et al. | 428/392 |
| 5,935,699 A | 8/1999 | Barber | |
| 5,967,211 A | 10/1999 | Lucas et al. | |
| 6,027,330 A | 2/2000 | Lifshits | 431/8 |
| 6,034,155 A | 3/2000 | Espeland et al. | |
| 6,048,593 A | 4/2000 | Espeland et al. | |
| 6,077,327 A | 6/2000 | Hamayoshi et al. | 75/332 |
| 6,105,888 A | 8/2000 | Goehner et al. | 241/5 |
| 6,171,651 B1 | 1/2001 | Brown | |
| 6,207,077 B1 | 3/2001 | Burnell-Jones | |
| 6,214,309 B1 | 4/2001 | Shaw et al. | |
| 6,254,845 B1 | 7/2001 | Ohashi et al. | |
| 6,254,981 B1 | 7/2001 | Castle | 428/325 |
| 6,258,456 B1 | 7/2001 | Meyer | 428/403 |
| 6,360,563 B1 | 3/2002 | Gerhardt et al. | 65/21.1 |
| 6,367,288 B1 | 4/2002 | Lindner et al. | 65/531 |
| 6,387,302 B1 | 5/2002 | Konya et al. | 264/15 |
| 6,444,162 B1 | 9/2002 | Anshits et al. | |
| 6,461,988 B2 | 10/2002 | Budd et al. | |
| 6,486,084 B2 | 11/2002 | Oda et al. | 501/32 |
| 6,506,819 B1 | 1/2003 | Shukla et al. | |
| 6,531,222 B1 | 3/2003 | Tanaka et al. | |
| 6,551,567 B2 | 4/2003 | Konya et al. | 423/337 |
| 6,572,697 B2 | 6/2003 | Gleeson et al. | |
| 6,582,819 B2 | 6/2003 | McDaniel et al. | |
| 6,620,487 B1 | 9/2003 | Tonyan et al. | |
| 6,626,991 B1 | 9/2003 | Drochon et al. | |
| 6,630,417 B2 | 10/2003 | Kawai et al. | 501/16 |
| 6,648,961 B2 | 11/2003 | Brothers et al. | |
| 6,656,265 B1 | 12/2003 | Garnier et al. | |
| 6,660,078 B2 | 12/2003 | Brothers et al. | |
| 6,689,286 B2 | 2/2004 | Wilde et al. | 252/62 |
| 6,811,603 B2 | 11/2004 | Brothers et al. | |
| 6,814,798 B2 | 11/2004 | Vijn et al. | |
| 6,969,422 B2 | 11/2005 | Mazany et al. | 106/600 |
| 7,112,549 B2 | 9/2006 | Yoshitomi et al. | 501/128 |
| 7,651,563 B2 * | 1/2010 | Datta et al. | 106/672 |
| 7,666,505 B2 * | 2/2010 | Datta et al. | 428/402 |
| 2001/0043996 A1 | 11/2001 | Yamada et al. | |
| 2002/0004111 A1 | 1/2002 | Matsubara et al. | |
| 2002/0025436 A1 | 2/2002 | Meyer | |
| 2003/0100434 A1 | 5/2003 | Yoshitomi et al. | 501/87 |
| 2003/0177955 A1 | 9/2003 | Vijn et al. | |
| 2004/0079260 A1 | 4/2004 | Datta et al. | |
| 2004/0080063 A1 | 4/2004 | Datta et al. | |
| 2004/0081827 A1 * | 4/2004 | Datta et al. | 428/384 |
| 2004/0262801 A1 * | 12/2004 | Hojaji et al. | 264/44 |
| 2005/0011412 A1 | 1/2005 | Vijn et al. | |
| 2006/0240967 A1 * | 10/2006 | Hojaji et al. | 501/33 |
| 2008/0095692 A1 | 4/2008 | Pham | |
| 2008/0096018 A1 | 4/2008 | Zhang et al. | 428/402 |
| 2009/0076196 A1 | 3/2009 | Hojaji | |
| 2009/0156385 A1 | 6/2009 | Biscan et al. | |

FOREIGN PATENT DOCUMENTS

| | | |
|---|---|---|
| DE | 3314796 | 10/1984 |
| DE | 3908172 A1 | 9/1990 |
| DE | 19962137 | 6/2001 |
| EP | 0033133 | 8/1981 |
| EP | 0036275 | 9/1981 |
| EP | 102092 | 3/1984 |
| EP | 0159046 | 10/1985 |
| EP | 0159173 | 10/1985 |
| EP | 0242872 | 10/1987 |
| EP | 0247817 | 12/1987 |
| EP | 0359362 B1 | 3/1990 |
| EP | 0430995 | 6/1991 |
| EP | 0593779 | 4/1994 |
| EP | 0601594 | 6/1994 |
| EP | 0717675 | 6/1996 |
| EP | 0801037 B1 | 10/1997 |
| EP | 0891954 B1 | 1/1999 |
| EP | 0931778 | 7/1999 |
| EP | 0999232 | 5/2000 |
| EP | 1156021 A1 | 11/2001 |
| EP | 1160212 A1 | 12/2001 |
| EP | 1172341 A1 | 1/2002 |
| EP | 1891984 A1 | 2/2008 |
| FR | 2671072 | 7/1992 |
| GB | 413294 | 7/1934 |
| GB | 682432 | 11/1952 |
| GB | 0740145 | 11/1955 |
| GB | 743866 | 1/1956 |
| GB | 744070 | 2/1956 |
| GB | 752345 | 7/1956 |
| GB | 896910 | 5/1962 |
| GB | 1062410 | 3/1967 |
| GB | 1066768 | 4/1967 |
| GB | 1448320 | 9/1976 |
| GB | 1493202 | 11/1977 |
| GB | 1493203 | 11/1977 |
| GB | 1515521 | 6/1978 |
| GB | 1532922 | 11/1978 |
| GB | 2019386 | 10/1979 |
| GB | 2025928 | 1/1980 |
| GB | 1584175 | 2/1981 |
| GB | 2248834 | 4/1992 |
| GB | 2256867 | 12/1992 |
| GB | 2330138 A | 4/1999 |
| JP | 192478/1990 | 7/1990 |
| JP | 4104945 | 4/1992 |
| JP | 246726/1993 | 9/1993 |
| JP | 07024299 A2 | 1/1995 |
| JP | 07292846 A2 | 11/1995 |
| JP | 07315869 A2 | 12/1995 |
| JP | 08169779 A2 | 7/1996 |
| JP | 09020526 A | 1/1997 |
| JP | 09067174 | 3/1997 |
| JP | 09077543 | 3/1997 |
| JP | 09124327 A2 | 5/1997 |
| JP | 09255383 | 9/1997 |
| JP | 95648/1998 | 4/1998 |
| JP | 10095648 | 4/1998 |
| JP | 10152356 | 6/1998 |
| JP | 11116299 | 4/1999 |
| JP | 335146/1990 | 12/1999 |
| JP | 2000119050 | 4/2000 |
| JP | 2000143307 | 5/2000 |
| JP | 2000302498 | 10/2000 |
| JP | 2001163647 | 6/2001 |
| JP | 2001240439 | 9/2001 |
| JP | 2002003248 | 1/2002 |
| JP | 2002037645 | 2/2002 |
| JP | 2002037680 | 2/2002 |
| JP | 2002231865 | 8/2002 |
| JP | 55064/2003 | 2/2003 |
| JP | 2003073756 | 3/2003 |
| RU | 2039019 | 7/1995 |
| SU | 1650196 A | 5/1991 |
| SU | 1724613 | 4/1992 |
| WO | 82/03386 | 10/1982 |
| WO | 83/01947 | 6/1983 |
| WO | WO-8500361 | 1/1985 |
| WO | 85/02394 | 6/1985 |
| WO | 87/00827 | 2/1987 |
| WO | 90/02102 | 3/1990 |
| WO | WO-9210440 | 6/1992 |
| WO | 95/07177 | 3/1995 |
| WO | WO 96/07538 | 3/1996 |
| WO | WO 98/03284 | 1/1998 |
| WO | WO 98/29353 | 7/1998 |

(56) References Cited

FOREIGN PATENT DOCUMENTS

| | | | |
|---|---|---|---|
| WO | WO 01/72863 A1 | 10/2001 | |
| WO | WO 2004/018090 A1 | 3/2004 | |
| WO | WO 2004/101137 A1 | 11/2004 | |
| WO | 2006/091929 | 8/2006 | |
| WO | 2007/067774 | 6/2007 | |

OTHER PUBLICATIONS

Pawlowski, et al., Novel raw material for producing heat insulating materials, Silikattechnik, 1982, 33(11): 339-340.

Kolay, et al., Physical, chemical, mineralogical, and thermal properties of cenospheres from an ash lagoon, 2001, Cement and Concrete Research 31, 539-542.

Microspheres, S.A., What are Cenospheres, available at www.microspheres.co.za/contents.htm, printed Jul. 11, 2006, 5 pp.

Gubka, "Composition and Morphology of Cenospheres," at www.atom.nw.ru/rie/projects/gubka/properties/cenospheres.shtml, printed Jul. 11, 2006, 2 pp.

Drozhzhin, et al., "Technical Monitoring of Microspheres from Fly Ashes of Electric Power Stations in the Russian Federation", 2003, 8 pp.

3M Material Safety Data Sheet 3M Glass Bubbles, Types K and S, Apr. 10, 2006, 7 pp.

Corning Glass Works,"Glass" reprinted version of the Encyclopedia of Chemical Technology, vol. 10, $2^{nd}$ ed., 1955, pp. 542-543.

DigitalFire Corporation, "Do you Need to Know About Eutectics to Make a Good Glaze?", printed Jul. 14, 2003, available at http://www.digitalfire.ab.ca/cermat/education/119.php?PHPSESSID=1e2d7f3f3a24698394ecae57ed3b06d5.

Sphere Services Inc., "Cenospheres—Hollow Ceramic Microspheres", printed May 15, 2007, available at http://www.sphereservices.com/ceno.html, 2 pp.

Encyclopedia Britannica, "Technology Education—Glass," printed May 15, 2007, available at http://www.geocities.com/tech_3d_2000/industrial/manufacturing/glass/glass.htm?20 . . . .

Amaral, S.T., Muller, I.L., Passivation of pure iron in alkaline solution containing silicate and sulphate, Corrosion Science, 1999, 747-758, V.41.

Drogowska, M. et al. Influence of anions on the passivity behavior of copper in alkaline solutions, Surface and Coatings Technology, 1988, 383-400, V.34.

Hoar, T.P., The Production and breakdown of the passivity of metals, Corrosion Science, 1967, 341-355, V.7.

Johnson, C.A., et al. Leaching Behaviour and Solubility—Controlling Solid Phases of Heavy Metals in Municipal Solid Waste Incinerator Ash, Waste Management, 1996, 129-134, V. 16(1-3).

Joshi, P.S., et al. Passivation of Carbon Steel Alloy in De-oxygenated Alkaline pH Media, Corrosion Science, 1993, 1367-1379, V. 34(8).

Novakovsky, V.M., Electrochimica Acta: Thermodynamic and Kinetic Causes of Passivity, 1965, 353-365, V. 10.

Omurtag, Y. et al. Corrosion Science: Some Investigations on the Corrosion Characteristics of Fe—Si Alloys, 1970, 225-231, V. 10.

Singh, R., et al. Microporous and Mesoporous Materials: Stabilization of Natural Faujasite Zeolite: Possible Role of Alkaline Earth Metal Ions, 1998, 103-109, V. 21.

Stolica, N., Corrosion Science: Pitting Corrosion on Fe—Cr and Fe—Cr—Ni Alloys, 1969, 455-470, V. 9.

Sukhotin, A.M. et al. Corrosion Science: The Passivity of Iron in Acid and Alkaline Solutions, 1965, 393-407, V.5.

Tack, F.M. et al. Environmental Pollution: Metal Solubility as a Function of pH in a Contaminated Dredged Sediment Affected by Oxidation, 1996, 199-208, V.91.

Tourky, A.R., et al. Corrosion Science: Further Studies on the Effect of C-content on the Corrosion and Passivity of Fe, 1968, 857-870, V.8.

International Preliminary Report on Patentability and Written Opinion of the International Searching Authority for PCT/US2006/006799, issued Aug. 28, 2007, 11 pp.

Office Action for JP 529583 dated Aug. 18, 2009, with translations, 18 pp.

U.S. Appl. No. 10/648,010, filed Aug. 25, 2003; entitled "Synthetic Microspheres and Methods of Making Same;" First Inventor: Amlan Datta.

Derwent Acc. No. 1992-401310 for HU 60701T published Oct. 28, 1992.

Derwent Acc. No. 2009-E28129 for CN 101337822 A published Jan. 7, 2009.

\* cited by examiner

FIG. 192.—System SiO₂-2Na₂O·SiO₂.

F. C. Kracek, *J. Phys. Chem.*, 34, 1588 (1930); *J. Am. Chem. Soc.*, 61, 2869 (1939).

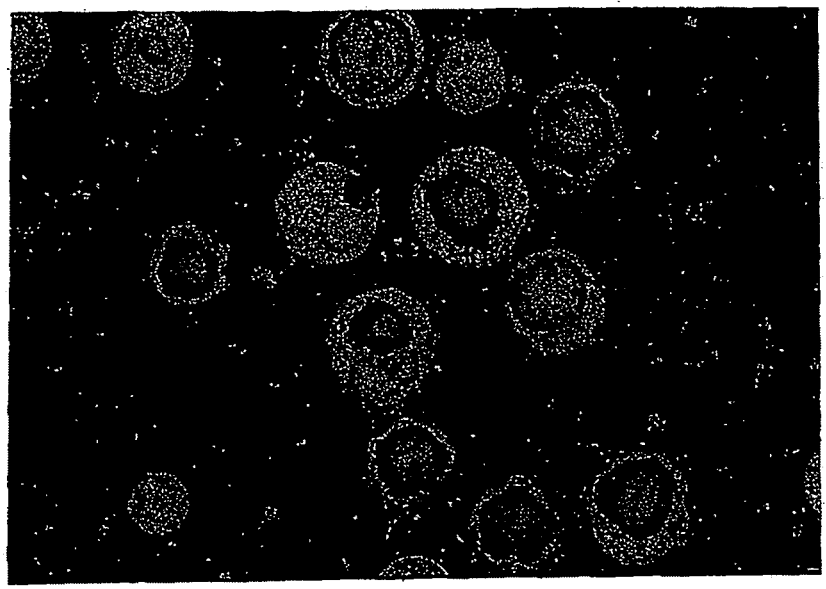
Figure 3 (product of Formulation 1A).
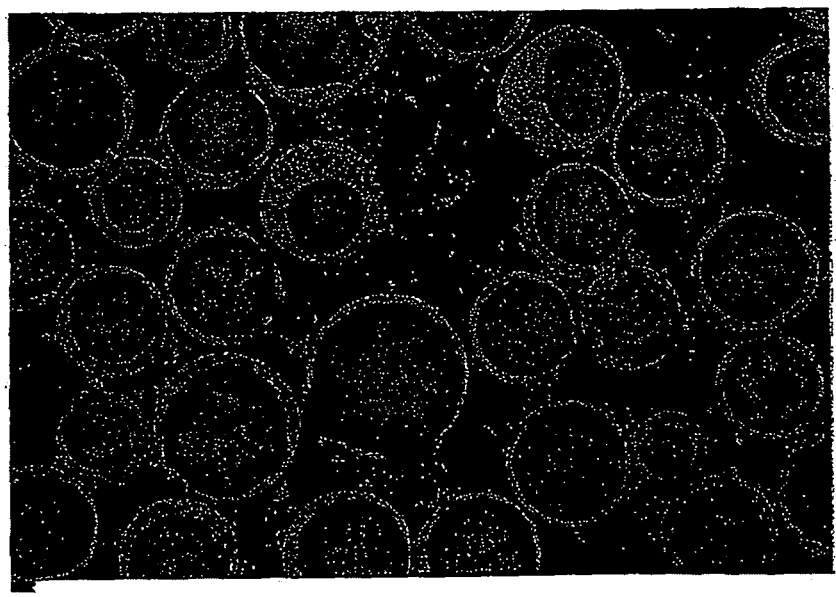
Figure 4 (product of Formulation 1B).

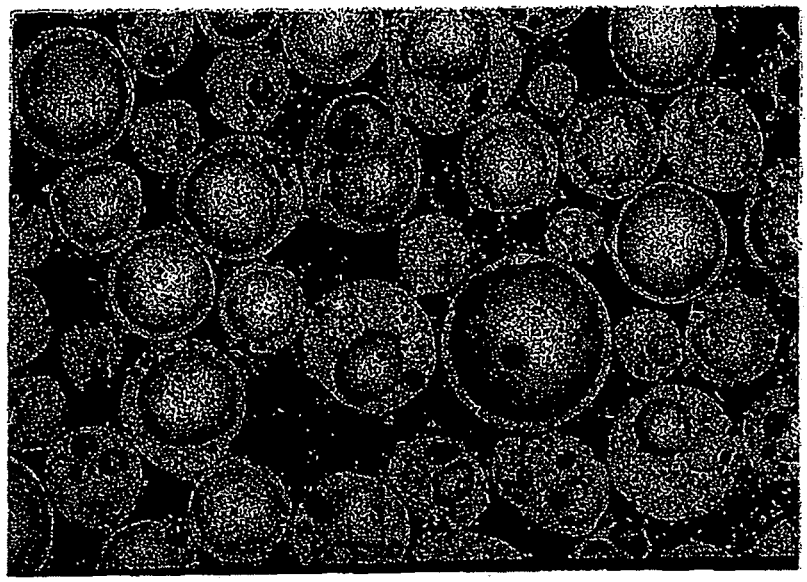
Figure 5 (product of Formulation 1C).
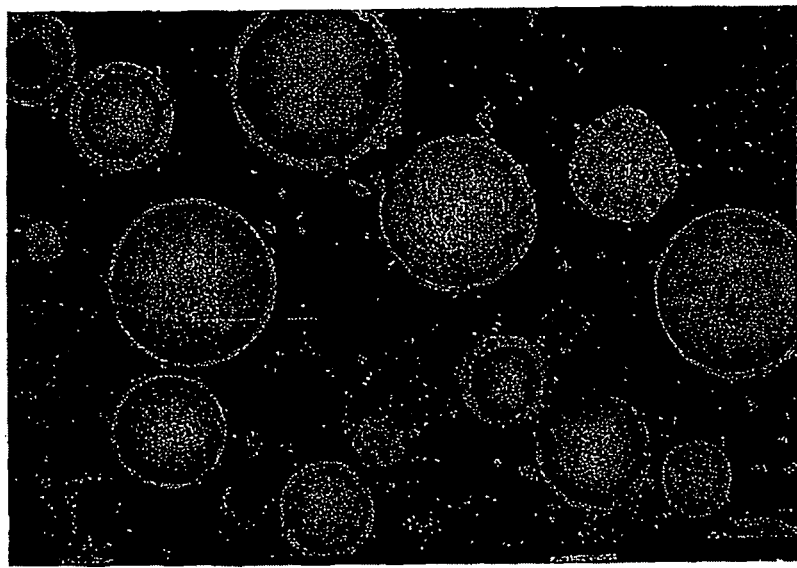
Figure 6 (product of Formulation 1D).

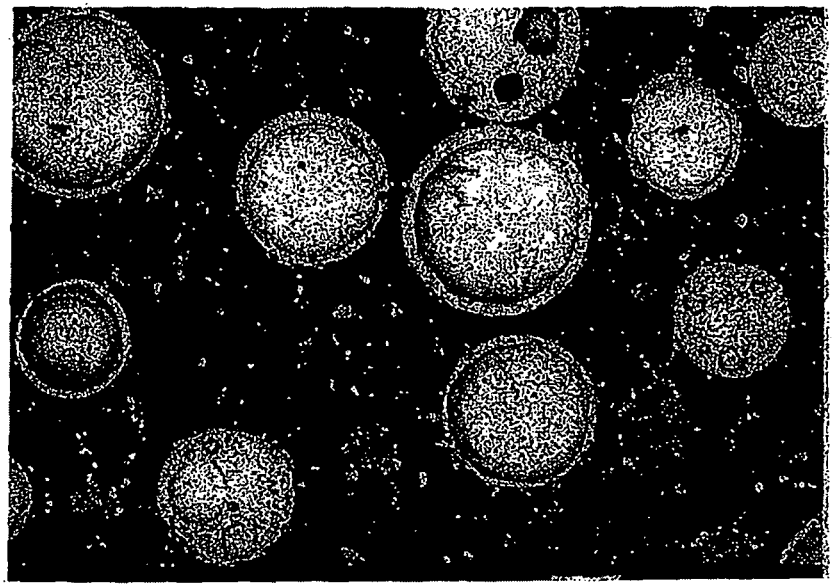
Figure 7 (product of Formulation 1E).
Figure 8 (product of Formulation 1F).

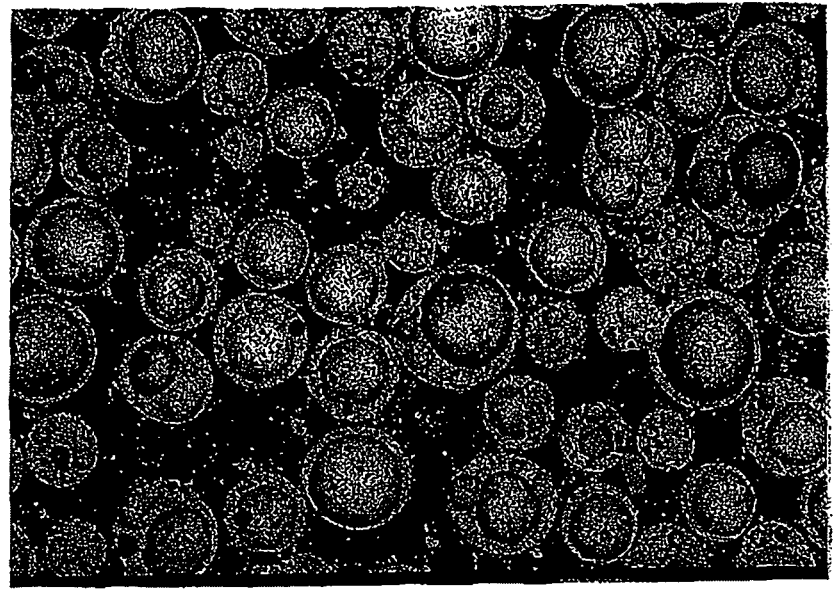
Figure 9 (product of Formulation 2A).
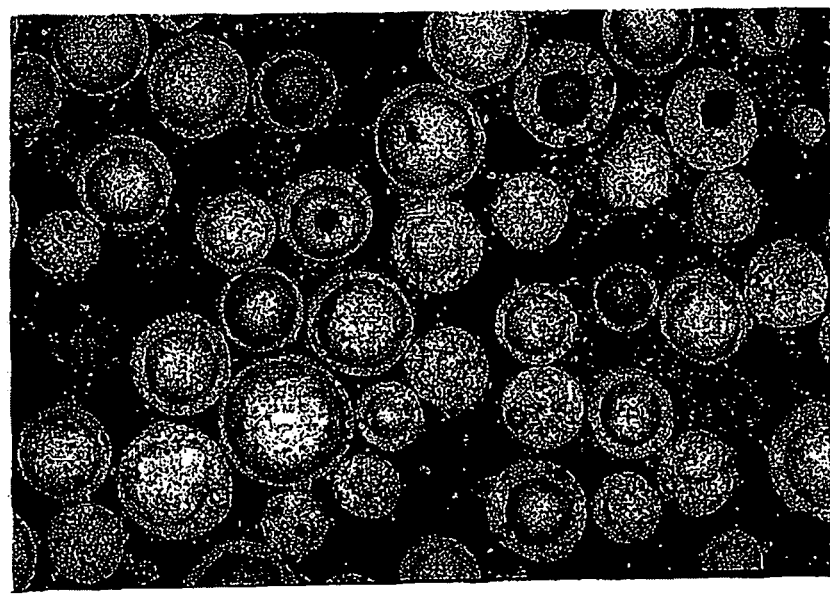
Figure 10 (product of Formulation 2B).

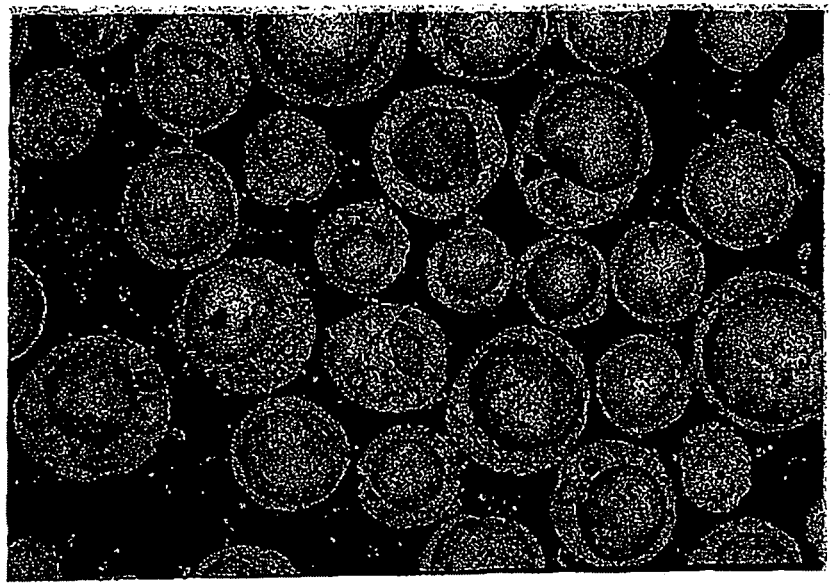
Figure 11 (product of Formulation 2C).
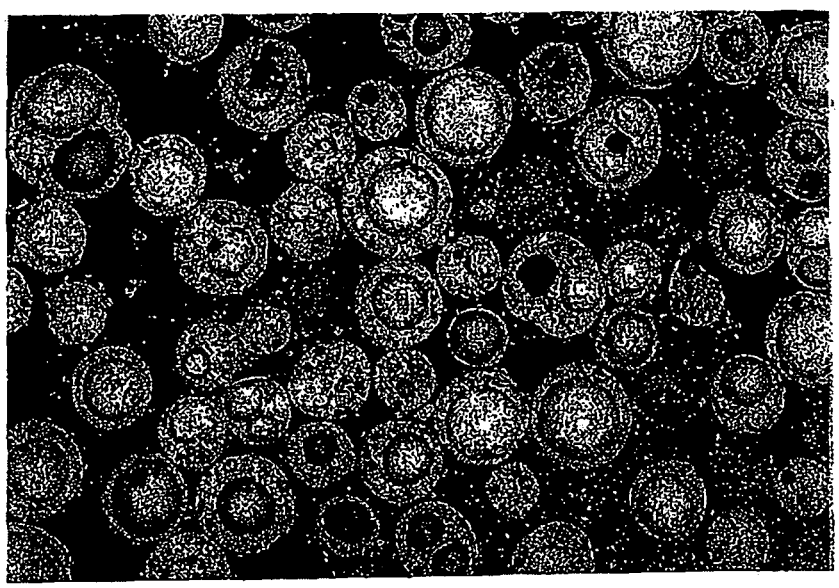
Figure 12 (product of Formulation 2D).

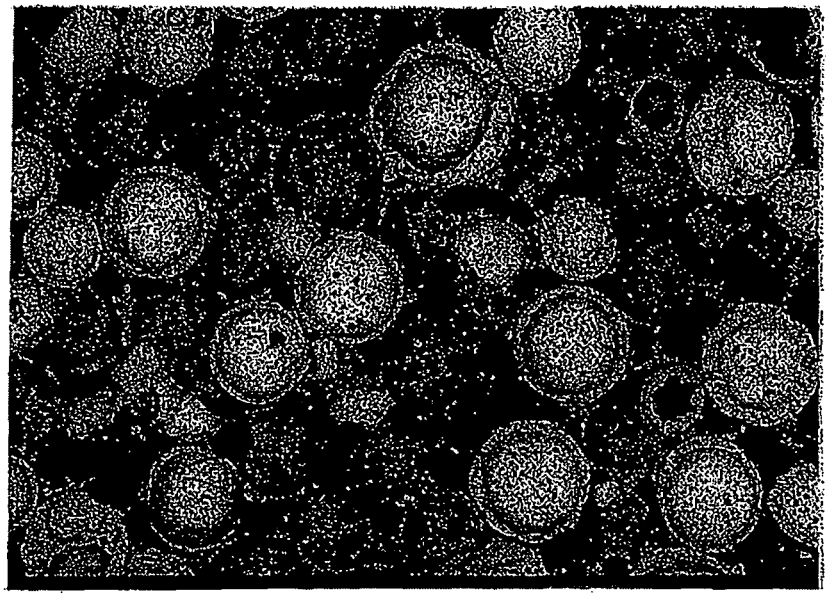
Figure 13 (product of Formulation 2E).
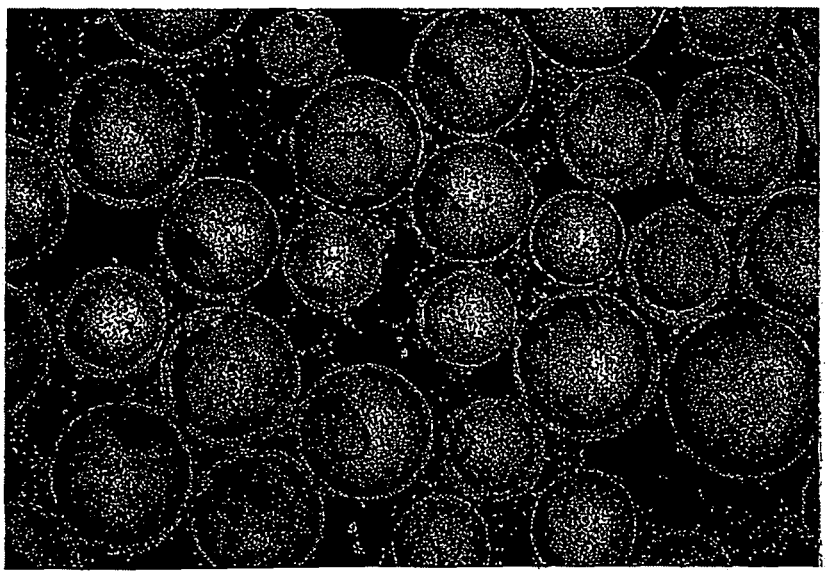
Figure 14 (product of Formulation 2F).

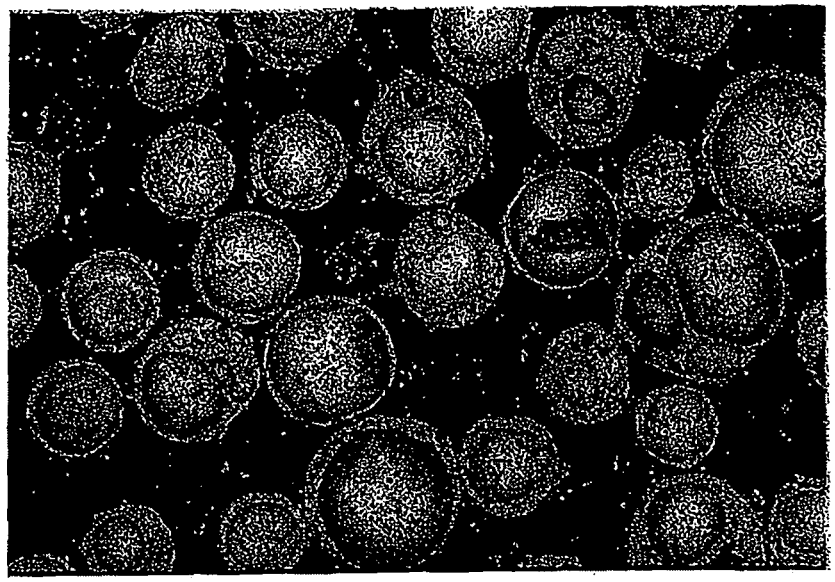
Figure 15 (product of Formulation 3A).
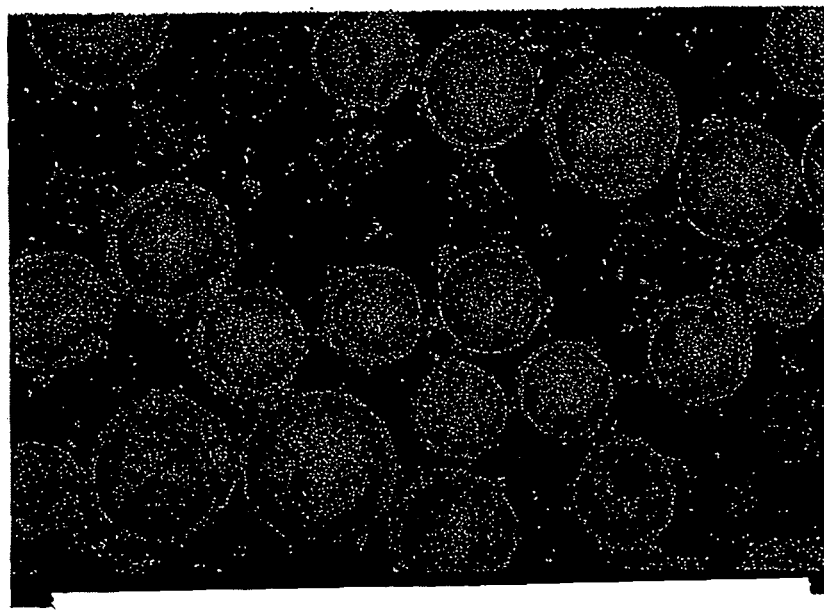
Figure 16 (product of Formulation 3B).

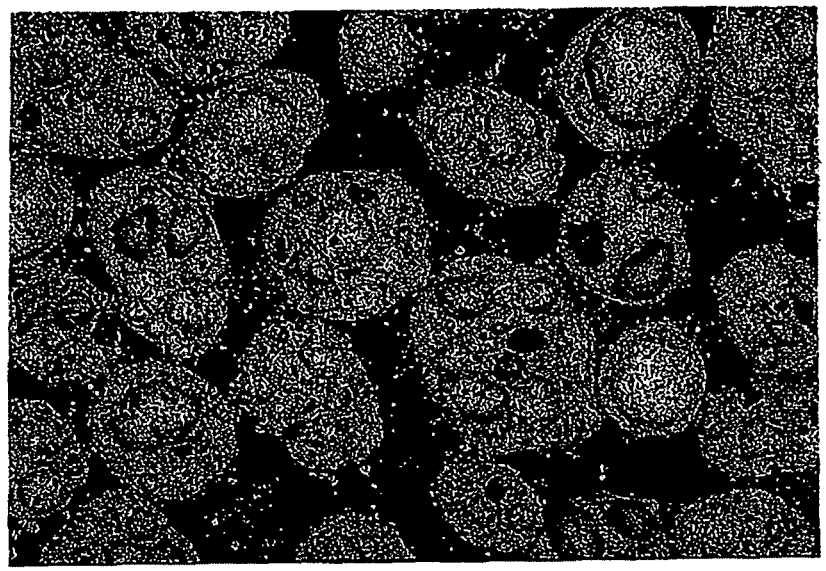
Figure 17 (product of Formulation 3C).
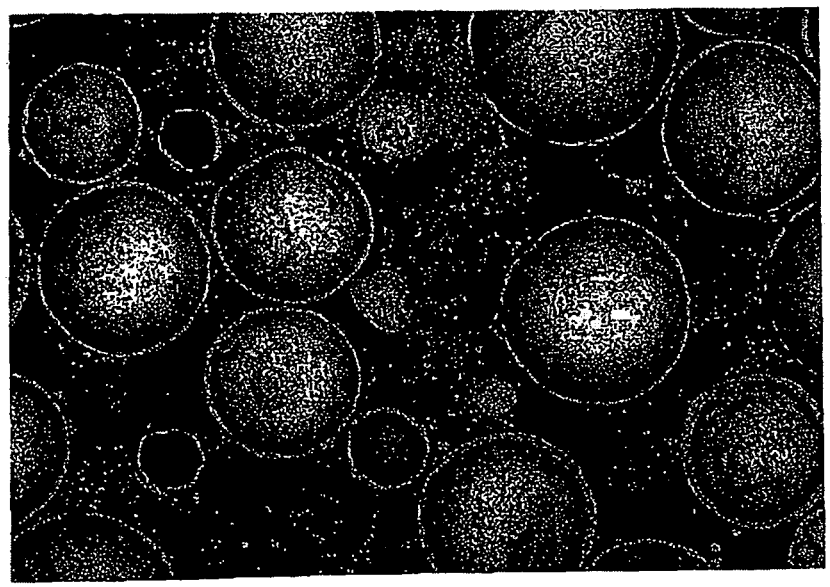
Figure 18 (product of Formulation 4A).

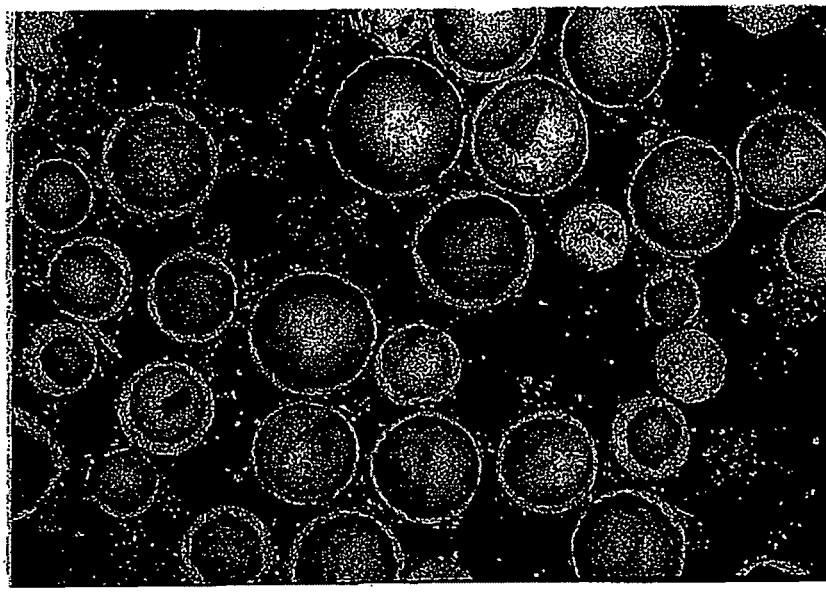
Figure 19 (product of Formulation 4B).
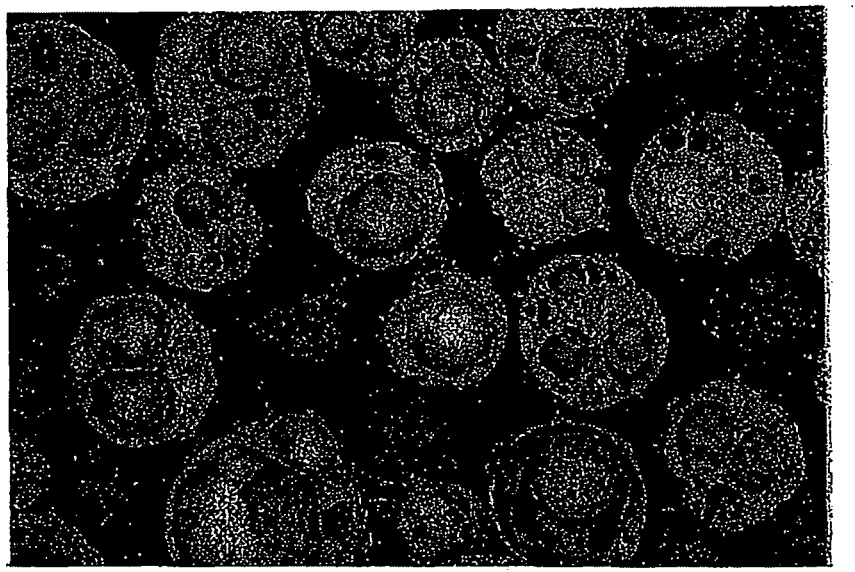
Figure 20 (product of Formulation 5A).

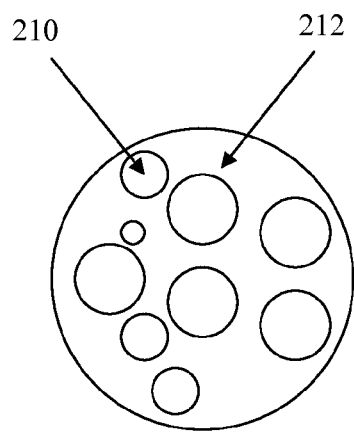
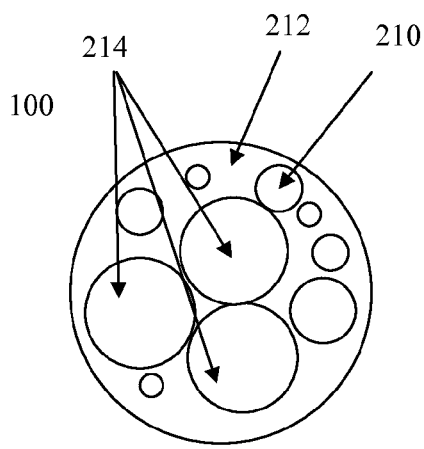
FIG. 24A    FIG. 24B
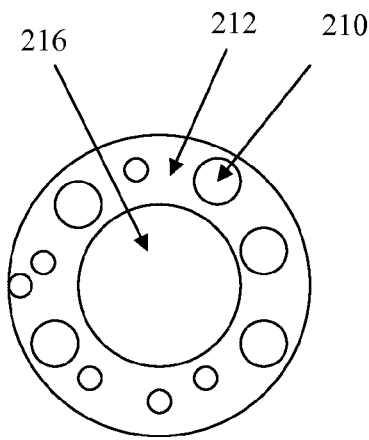
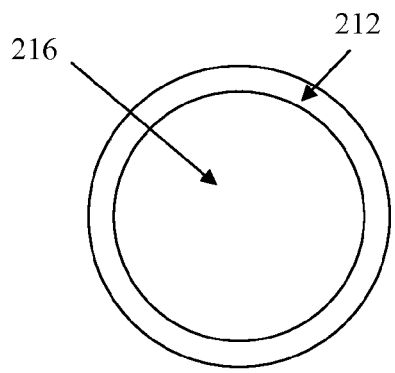
FIG. 25    FIG. 26
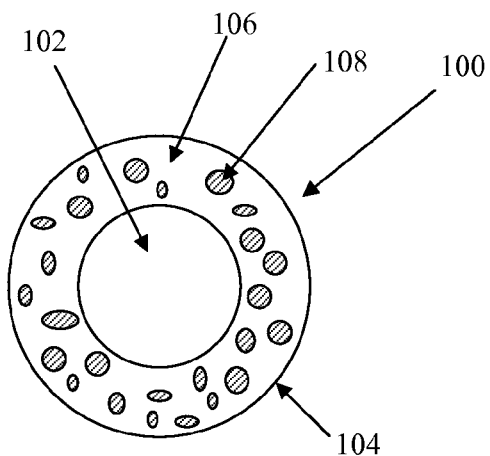
FIG. 23

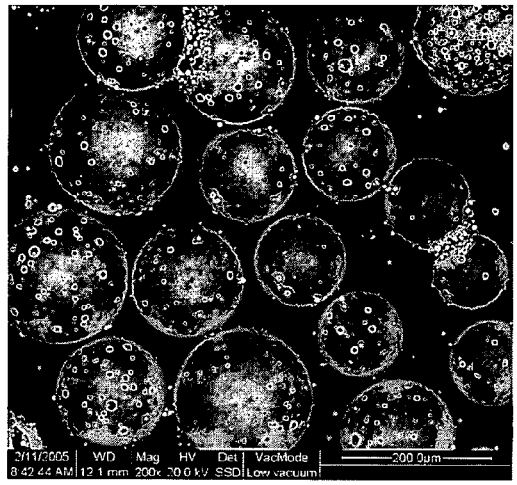 
FIG. 31A FIG. 31B
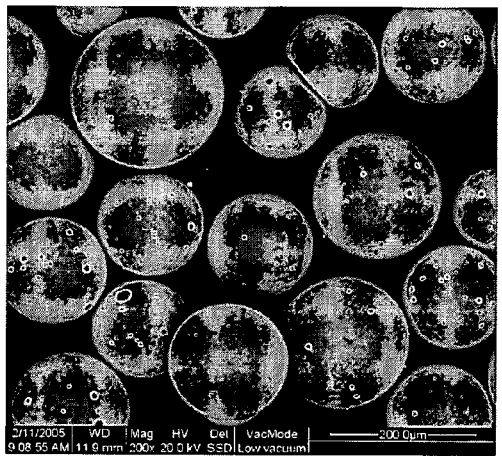 
FIG. 32A FIG. 32B

ENGINEERED LOW-DENSITY HETEROGENEOUS MICROPARTICLES AND METHODS AND FORMULATIONS FOR PRODUCING THE MICROPARTICLES

BACKGROUND OF THE INVENTION

1. Field of the Invention

The present invention generally relates to engineered microparticles, and more particularly, relates to an engineered, low-density microparticle with high chemical durability. The present invention also relates to methods and formulations for forming the microparticle and uses thereof.

2. Description of the Related Art

Any discussion of the prior art throughout the specification should in no way be considered as an admission that such prior art is widely known or forms part of common general knowledge in the field.

Cenospheres are generally spherical inorganic hollow microparticles that are commonly found in fly ash produced as a by-product in coal-fired power stations. Cenospheres typically make up around 1-2% of the fly ash and can be recovered or "harvested" from the fly ash. These cenospheres derived from coal combustion are commercially available. The composition, form, size, shape and density of the coal-derived cenospheres provide particular benefits in the formulation and manufacture of many low-density products.

One of the characterizing features of the coal-derived cenospheres is their high chemical durability. This high chemical durability is understood to be due to the relatively low content of alkali metal oxides, particularly sodium oxide, in their composition. Accordingly, low-density composites produced from coal-derived cenospheres have the desirable properties of high strength to weight ratio and chemical inertness. Chemical inertness is especially important in Portland cement applications, where relative chemical inertness plays an important role in achieving highly durable cementitious products. Thus, harvested cenospheres from coal combustion have proven to be especially useful in building products and in general applications where they may come into contact with corrosive environments.

Despite the known utility of coal-derived cenospheres, their widespread use has been limited to a large extent by their cost and availability. The recovery of cenospheres in large quantities from fly ash is a labor intensive and expensive process. Although it is possible to increase the recovery of cenospheres from fly ash by modifying the collection process, the cost of improved recovery does not make this economically viable.

It may also be possible to alter combustion conditions in power stations to increase the yield of cenospheres in fly ash. However, combustion conditions in power stations are optimized for coal-burning rather than cenosphere production, and it is not economically viable to increase the yield of cenosphere production at the expense of coal-burning efficiency. Moreover, while the coal-derived cenospheres appear to be chemically durable in a cementitious environment, they still exhibit some degree of leaching in a caustic environment.

In addition to coal-derived cenospheres, the prior art also discloses incorporating synthetic glass microspheres in certain low-density composite materials. However, there are also disadvantages associated with the properties and/or methods of making these conventional synthetic glass microspheres. For example, an early method for manufacturing hollow glass microspheres involved combining sodium silicate and borax with a suitable foaming agent, drying and crushing the mixture, adjusting the size of the crushed particles and subsequently firing the particles. However, this method suffers from the use of borax, which is an expensive starting materials. Hence, the resulting microspheres are necessarily expensive. In addition, the product has poor chemical durability due to a high percentage of sodium oxide in the resulting glass composition.

Generally speaking, prior art methods for forming engineered expanded microparticles such as glass microspheres involve firing an inorganic material in the presence of a blowing, gasifying or foaming agent. Such blowing, gasifying or foaming agents are typically activated when the material from which the microparticle is produced is in an appropriate form, such as liquid. However, it is sometimes extremely difficult to match the blowing agent with the material from which the microparticle will be formed and using the blowing agent in the most efficient manner.

In addition, prior art methods for forming engineered expanded microparticles generally describe heating the starting materials to form a homogeneous melt prior to expanding the materials. However, a significant amount of the foaming agent could escape during the process, thus increasing the density of the foamed product.

In view of the foregoing, it will be appreciated that there is a need for a synthetic, low-cost microparticle engineered to have favorable physical and chemical properties for incorporation into low density composite materials. It is also desirable to have a system which allows a greater degree of control over the process of forming the engineered microparticles.

BRIEF DESCRIPTION OF THE DRAWINGS

FIG. 3 to 8 are scanning electron micrographs of synthetic hollow microspheres obtained from Example 1;

FIGS. 9 to 14 are scanning electron micrographs of synthetic hollow microspheres obtained from Example 2;

FIGS. 15 to 17 are scanning electron micrographs of synthetic hollow microspheres obtained from Example 3;

FIGS. 18 to 19 are scanning electron micrographs of synthetic hollow microspheres obtained from Example 4;

FIG. 20 is a scanning electron micrograph of synthetic hollow microspheres obtained from Example 5;

FIG. 23 is a schematic of a cross-section of an engineered heterogeneous microparticle of one preferred embodiment;

FIGS. 24A and 24B illustrate a first and a second stage of the formation of an engineered heterogeneous microparticle of one preferred embodiment;

FIG. 25 illustrates a third stage of the formation of an engineered heterogeneous microparticle of one preferred embodiment;

FIG. 26 illustrates a fully formed conventional hollow glass microsphere in which the sphere wall is homogeneous amorphous glass;

FIG. 31A is a scanning electron micrograph of engineered, heterogeneous microparticles of yet another embodiment of the present invention;

FIG. 31B is a scanning electron micrograph of the microparticles of FIG. 31A wherein the microparticles have been ruptured to illustrate the wall characteristics;

FIG. 32A is a scanning electron micrograph of engineered, heterogeneous microparticles of yet another embodiment of the present invention;

FIG. 32B is a scanning electron micrograph of the microparticles of FIG. 32A wherein the microparticles have been ruptured to illustrate the wall characteristics;

DETAILED DESCRIPTION OF PREFERRED EMBODIMENTS

Figure 1:
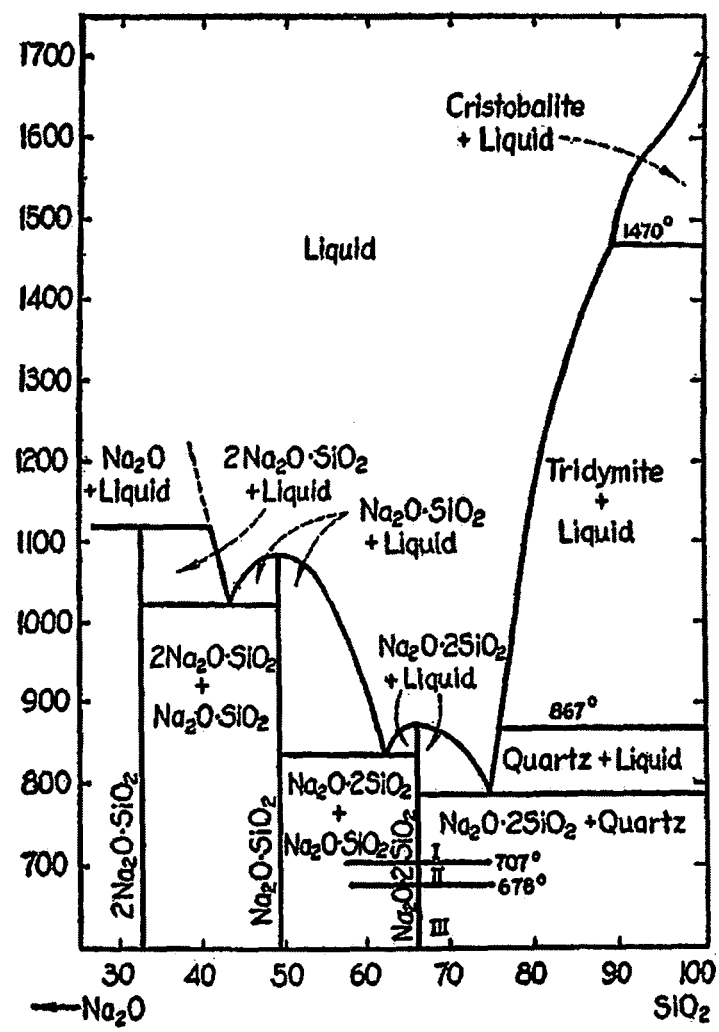
FIG. 1 is a phase equilibrium diagram for binary system $Na_2O$—$SiO_2$, the composition being expressed as a weight percentage of $SiO_2$.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

As used herein, the term "engineered microparticle" or "expanded microparticle" is a broad term and shall have its ordinary meaning and shall include, but not be limited to, a hollow microparticle synthesized as a primary target product of a synthetic process. The term does not include harvested coal-derived cenospheres which are merely a by-product of coal combustion in coal-fired power stations.

As used herein, the terms "microsphere" and "microparticle" are broad terms and shall have their ordinary meaning and shall include, but not be limited to, any substantially rounded discrete particle, including those that are not true geometric spheres and those that are solid or hollow.

As used herein, the term "precursor" is a broad term and shall have its ordinary meaning and shall include, but not be limited to, an agglomerate or particle made from a suitable formulation prior to its expansion to form one or more expanded microparticles. The term "control agent" is a broad term and shall have its ordinary meaning and shall include, but not be limited to components included in the precursor which control activation of the blowing component.

As used herein, the term "primary component" is a broad term and shall have its ordinary meaning and shall include, but not be limited to, a major constituent of the formulation/precursor, in the sense that the amount of primary component usually exceeds the amounts of the other constituents. Moreover, the term "inorganic primary component" is also a broad term and shall have its ordinary meaning and shall include, but not be limited to, a primary component consisting essentially of inorganic materials. However, small amounts, for example up to about 10 wt. %, of other materials, including organic components, may still be included in the inorganic primary component.

As used herein the term "activation" is a broad term and shall have its ordinary meaning and shall include, but not be limited to, one or more conditions, such as temperature, redox of the oxides present in the formulation, and gaseous atmosphere during thermal treatment (such as oxygen partial pressure) range, which causes a blowing component to release its blowing gas.

Certain preferred embodiments of the present invention advantageously provide an engineered, low-density, heterogeneous microparticle with high chemical durability and methods for producing the microparticles in excellent yield from widely available and inexpensive starting materials. Hence, the preferred embodiments not only provide an engineered microparticle with favorable physical and chemical characteristics but also reduce the overall cost of producing the microparticles, and consequently increase the scope for their use, especially in the building industry, and all filler applications such as in polymeric composites where the use of presently available cenospheres is relatively limited due to their prohibitive cost and low availability. As will be described in greater detail below, certain preferred embodiments of the present invention are also directed toward controlling activation of the blowing agent(s) in achieving reliable synthesis of expanded microparticles from a wide range of materials. The engineered microparticles preferably can be formed by first preparing a precursor comprising a primary component, a blowing agent, and then firing the precursor at predetermined process conditions to seal the surface of the precursor and activate the blowing agent thereby forming a hollow microparticle.

Methods of Forming Precursor to the Expanded Microparticle

In one embodiment, the precursor for producing the engineered, heterogeneous microparticle can be formed by combining the primary component, blowing component and optionally, a control agent in an aqueous mixture. This aqueous mixture is then dried to produce an agglomerated precursor. As described above, the preferred embodiments of the present invention provide a method of forming a precursor, which includes the steps of mixing and drying. The resultant precursor is generally a substantially solid agglomerate mixture of its constituent materials.

Typically, the mixing step provides an aqueous dispersion or paste, which is later dried. Mixing can be performed by any conventional means used to blend ceramic powders. Examples of preferred mixing techniques include, but are not limited to, agitated tanks, ball mills, single and twin screw mixers, and attrition mills. Certain mixing aids such as. surfactants may be added in the mixing step, as appropriate. Surfactants, for example, may be used to assist with mixing, suspending and dispersing the particles.

Drying is typically performed at a temperature in the range of about 30 to 600° C. and may occur over a period of up to about 48 hours, depending on the drying technique employed. Any type of dryer customarily used in industry to dry slurries and pastes may be used. Drying may be performed in a batch process using, for example, a stationary dish or container. Alternatively, drying may be performed in a spray dryer, fluid bed dryer, rotary dryer, rotating tray dryer or flash dryer.

Preferably, the mixture is dried such that the water content of the resultant agglomerate precursor is less than about 14 wt. %, more preferably less than about 10 wt. %, more preferably less than about 5 wt. %, and more preferably about 3 wt. % or less. It was found that, in certain embodiments, with about 14 wt. % water or more in the precursor, the precursor tends to burst into fines upon firing. It is understood by the present inventors that this bursting is caused by rapid steam explosion in the presence of too much water. Hence, in certain embodiments, the resultant precursor should preferably be substantially dry, although a small amount of residual moisture may be present after the solution-based process for its formation. In some embodiments, a small amount of water may help to bind particles in the precursor together, especially in cases where particles in the precursor are water-reactive.

Preferably, the dried precursor particles have an average particle size in the range of about 10 to 1000 microns, more preferably about 30 to 1000 microns, more preferably about 40 to 500 microns, and more preferably about 50 to 300 microns. The particle size of the precursor will be related to the particle size of the resultant engineered hollow microparticle, although the degree of correspondence will, of course, only be approximate. If necessary, standard comminuting/sizing/classification techniques may be employed to achieve the preferred average particle size.

Method of Forming Precursor Using a Spray Dryer

Drying of the precursor is preferably performed using a spray dryer having an aqueous feed. It has been found that spray drying has at least several advantages when used in the preferred embodiments of the present invention. As discussed above, preferred embodiments of the present invention envisage various techniques for controlling activation of the blowing agent such that it is activated at a predetermined (e.g. optimal temperature) point in the production process among other novel features. Such control can be achieved by combining a control agent in the precursor formulation. Another embodiment includes a series of control agents and/or blowing agents such that there is sufficient blowing/expanding gas available at the optimal temperature. In one embodiment, a series of blowing agents may be used which are sequentially activated as temperature rises.

Yet a further embodiment involves distributing the blowing agent throughout the precursor such that while the precursor is being fired, the blowing agent distributed near the surface is quickly exposed to a higher temperature while the blowing agent near the core of the precursor is initially "physically" shielded from the heat. It is believe that the thermal conductivity of the formulation causes a delay between application of heat on the surface of the precursor to temperature rise within the core of the precursor. Accordingly, blowing agent which is within the core of the precursor will not be activated until a large portion of the precursor particle has already reached its optimal temperature.

Still further, as discussed above, some blowing agents may be activated by oxidation. In these embodiments, blowing agents within the core of the precursor will not be exposed to oxygen to the same extent as blowing agents on the surface, which further protects the blowing agent in the core of the precursor from being prematurely activated by oxygen.

Rather surprisingly, the Applicant has found that spray dryers are not only useful for forming precursors for the engineered microparticles but are also excellent at providing the aforementioned optimal distribution of the blowing agent within the precursor. Not wishing to be bound by any particular theory, it would appear that blowing agents which are water soluble tend to come to the surface during the spray dry production technique. Non water soluble blowing agents tend to remain within the core. Accordingly, one can design a mixture of blowing agents which provide initial, subsequent and final activation according to their water solubility. An example may be sugar which is useful as a blowing agent but is water soluble. During the spray dry technique, this blowing agent will tend to migrate to the surface of the precursor. Silicone carbide on the other hand, which is also a useful blowing agent is non water soluble and thus is not likely to migrate to the surface of the precursor.

Spray dryers are well known to one skilled in the art and are described in a number of standard textbooks such as *Industrial Drying Equipment*, C. M. van't Land and *Handbook of Industrial Drying* $2^{nd}$ *Edition*, Arun S. Mujumbar, which are hereby incorporated by reference in their entireties.

In addition to the aforementioned advantages, it is generally desirable to synthesize expanded microparticles having a predetermined average particle size and a predetermined, preferably narrow, particle size distribution. The use of a spray dryer in certain preferred embodiments of the present invention has been found to substantially reduce the need for sizing/classification of the precursors or, ultimately, the synthetic expanded microparticles. Spray drying has the additional advantage of allowing a high throughput of material and fast drying times. Hence, in a particularly preferred embodiment of the present invention, the drying step is performed using a spray dryer.

It has been determined that the particle size and particle size distribution of precursor particles and hence the resultant microparticles can be affected by one or more of the following parameters in the spray drying process:

inlet slurry pressure and velocity (particle size tends to decrease with increasing pressure);
  design of the atomizer (rotary atomizer, pressure nozzle, two fluid nozzle or the like)
  design of the gas inlet nozzle;

volume flow rate and flow pattern of gas; and
slurry viscosity and effective slurry surface tension.

Preferably, the aqueous slurry feeding the spray dryer comprises about 25 to 75% w/v solids, more preferably about 40 to 60% w/v solids.

In addition to the ingredients described above, the aqueous slurry may contain further processing aids or additives to improve mixing, flowability or droplet formation in the spray dryer. Suitable additives are well known in the spray drying art. Examples of such additives are sulphonates, glycol ethers, cellulose ethers and the like. These may be contained in the aqueous slurry in an amount ranging from about 0 to 5% w/v.

In the spray drying process, the aqueous slurry is typically pumped to an atomizer at a predetermined pressure and temperature to form slurry droplets. The atomizer may be one or a combination of the following: an atomizer based on a rotary atomizer (centrifugal atomization), a pressure nozzle (hydraulic atomization), or a two-fluid pressure nozzle wherein the slurry is mixed with another fluid (pneumatic atomization).

In order to ensure that the droplets formed are of a proper size, the atomizer may also be subjected to cyclic mechanical or sonic pulses. The atomization may be performed from the top or from the bottom of the dryer chamber. The hot drying gas may be injected into the dryer co-current or counter-current to the direction of the spraying.

It has been found that by controlling the spray drying conditions, the average particle size of the precursors and the precursor particle size distribution can be controlled. For example, a rotary atomizer has been found to produce a more uniform agglomerate particle size distribution than a pressure nozzle. Furthermore, rotating atomizers allow higher feed rates, suitable for abrasive materials, with negligible blockage or clogging. In some embodiments, a hybrid of known atomizing techniques may be used in order to achieve agglomerate precursors having the desired characteristics.

The atomized droplets of slurry are dried in the spray dryer for a predetermined residence time. The residence time can affect the average particle size, the particle size distribution and the moisture content of the resultant precursors. The residence time is preferably controlled to give the preferred characteristics of the precursor, as described above. The residence time can be controlled by the water content of the slurry, the slurry droplet size (total surface area), the drying gas inlet temperature and gas flow pattern within the spray dryer, and the particle flow path within the spray dryer. Preferably, the residence time in the spray dryer is in the range of about 0.1 to 10 seconds, although relatively long residence times of greater than about 2 seconds are generally more preferred. Preferably, the inlet temperature in the spray dryer is in the range of about 300 to 600° C. and the outlet temperature is in the range of about 90 to 220° C.

Spray drying advantageously produces precursors having this narrow particle size distribution. Consequently, engineered expanded microparticles resulting from these precursors will have a similarly narrow particle size distribution and consistent properties for subsequent use.

A further surprising advantage of using a spray dryer is that the resultant precursors have an improved intra-particle distribution of constituents. While the atomized droplets are resident in the spray dryer, water is rapidly pulled from the interior to the exterior, thus forming a concentration gradient of soluble species in the agglomerate, with relatively water-soluble species being more concentrated towards the exterior. Another advantage of spray drying is to form dried cellulated agglomerated precursors according to a preferred method of present invention (e.g. pre-foaming). The entrained gas will further expand during the foaming process to lower the density of the product which otherwise may not have been possible to achieve with multiple blowing agents. By this optional and yet novel method, low temperature gas forming compounds are added to the precursor before the drying process. The gas forming compound can be activated either by physical means such as degassing due to a reduction in surface tension (reverse temperature solubility), or by chemical means. An example of chemical gasification at low temperature is decomposition of carbonates to $CO_2$ by changing the pH, or use of appropriate organic compounds such as air entraining agents customarily used in concrete.

For an efficient and reliable synthesis of hollow microparticles, the precursor of certain embodiments preferably has a high concentration of glass-forming material at the surface, which can form a molten glassy skin during firing. Furthermore, the precursor preferably has a concentration of blowing agent near the core, which can release a blowing gas for entrapment within the glassy skin during firing. With careful selection of materials, this preferred intra-particle distribution can be achieved using the spray drying method.

Inorganic Primary Component

In a preferred embodiment, the amount of inorganic primary component comprises at least about 40 wt. % based on the total dry weight of the agglomerate precursor, more preferably at least about 50 wt. %, more preferably at least about 60 wt. %, more preferably at least about 70 wt. % and more preferably at least about 80 wt. %.

The preferred ratio of primary component to other components, such as blowing agent, will vary, depending on the composition of each of these ingredients. Typically, the ratio of primary component to blowing agent will be in the range of about 1000:1 to about 10:1, more preferably, about 700:1 to about 15:1, and more preferably about 500:1 to about 20:1.

Preferably, the inorganic primary component comprises at least one material selected from inorganic oxides, non-oxides, salts or combinations thereof. Such materials may be industrial and/or residential by-products, minerals, rocks, clays, technical grade chemicals or combinations thereof. One of the advantages of the preferred embodiments of the present invention is that it allows the synthesis of hollow microparticles from inexpensive industrial and/or residential waste products. Accordingly, the inorganic primary component may comprise materials such as fly ash, bottom ash, blast-furnace slag, paper ash, waste glasses (e.g. soda lime glasses, borosilicate glasses or other waste glasses), waste ceramics, kiln dust, waste fiber cement, concrete, incineration ash, diatomaceous earth, silica sand, silica fume, or combinations thereof.

Preferably, the inorganic primary component is capable of forming a viscoelastic liquid when heated to a predetermined temperature. This viscoelastic liquid is preferably a glass-forming liquid. Preferably, the inorganic primary component comprises at least one compound in an oxide form, which can form a majority of a glass phase. Non-oxide components may oxidize and become part of the glass phase, except for those elements that can remain dissolved but not oxidized, such as halides.

In one preferred embodiment, the inorganic primary component comprises at least one silicate material. Silicate materials are well known to the person skilled in the art. Generally, these are materials having a relatively large component of silica ($SiO_2$), preferably greater than about 30 wt. %, preferably greater than about 50% and more preferably greater than about 60%. In some cases, alumina is also a major oxide constituent of the silicate materials. The use of silicate in the preferred embodiments of the present invention hence includes all aluminosilicate materials that are suitable as primarily compounds.

The amounts of silica and alumina in the silicate material will vary depending on the source and may even vary within the same source. Fly ash, for example, will contain varying amounts of silica and alumina depending on the type of coal used and combustion conditions. Preferably, the mass ratio of silica ($SiO_2$) to alumina ($Al_2O_3$) is greater than about 1. Typically, silicate materials for use in this preferred embodiment of the present invention have a composition of about 30 to 95 wt. % $SiO_2$; about 0 to 45 wt. % (preferably about 2 to 45 to wt. %) $Al_2O_3$; up to about 30 wt. % (preferably up to about 15 wt. %) divalent metal oxides (e.g. MgO, CaO, SrO, BaO); up to about 50 wt. % monovalent metal oxides (e.g. $Li_2O$, $Na_2O$, $K_2O$); and up to about 20 wt. % of other metal oxides, including metal oxides which exist in multiple oxidation states (e.g. $SnO_2$, $MnO_2$, $Fe_2O_3$ etc.).

Typical silicates, which may be used in certain embodiments of the present invention are fly ash (e.g. Type F fly ash, Type C fly ash etc.), waste glass, bottom ash, blast-furnace slag, paper ash, basaltic rock, andesitic rock, feldspars, silicate clays (e.g. kaolinite clay, illite clay, bedalite clay, bentonite clay, china, fire clays etc.), bauxite, obsidian, volcanic ash, volcanic rocks, volcanic glasses, geopolymers or combinations thereof.

Silicates, such as those described above, may form the majority of the inorganic primary component. For example, silicates may form at least about 50 wt. %, at least about 70 wt. %, or at least about 90 wt. % of the inorganic primary component, based on the total weight of the inorganic primary component.

Fly ash, waste soda lime glass, andesitic rock, basaltic rock and/or clays are preferred source materials for the inorganic primary component. Fly ash is a particularly preferred inorganic primary component due to its low cost and wide availability. In one form of the invention, the primary component comprises at least about 5 wt. % fly ash, and more preferably at least about 10 wt. % fly ash, based on the total amount of primary component. In another form of the invention, the inorganic primary component comprises at least about 50 wt. % fly ash, at least about 70 wt. % fly ash, or at least about 90 wt. % fly ash, based on the total amount of inorganic primary component. In some embodiments of the present invention, the inorganic primary component may include a geopolymer, which is formed when a silicate is contacted with an aqueous solution of a metal hydroxide (e.g. NaOH or KOH). Geopolymers are well known in the art.

The inorganic primary component may be either calcined or non-calcined. The term "calcined" refers to the inorganic material being heated in air to a predetermined calcination temperature for a predetermined duration so as to either oxidize or pre-react certain component(s). Calcination of the inorganic material may be advantageous since the blowing (expansion) process can be sensitive to the redox state of multivalent oxide(s) present in the inorganic material. Without wishing to be bound by theory, it is believed that activation of the blowing agents is influenced by the release of oxygen from multivalent oxide(s) present in the inorganic material (e.g. by redox reaction). As an example, a carbonaceous blowing agent may react with oxygen released from ferric oxide ($Fe_2O_3$) to form $CO_x$, (where x can be 1 or 2 depending on carbon oxidation state) which is in turn reduced to ferrous oxide (FeO). The release of $CO_x$ from the blowing agent expands the microsphere. Hence, by pre-calcinating the inorganic material in air, the relative amount of ferric oxide is increased, which is then used as a source of oxygen for blowing agents to produce more gas, thereby lowering the density of the microparticles. In addition, calcination can promote pre-reaction of oxide components and/or cause partial vitrification in the inorganic material, which may be beneficial in the production of high quality microparticles.

In cases where high chemical durability is required, the primary inorganic component is preferably a low alkali material, preferably less than about 10 wt. %. In some embodiments, high alkali materials may still be included in the inorganic primary component. Accordingly, waste glass powders, such as soda lime glasses (sometimes referred to as cullet) having an alkali content of up to about 15 wt. % may be included.

Preferably, the inorganic primary component has an average primary particle size in the range of about 0.001 to 250 microns, more preferably about 0.05 to 50 microns, more preferably about 0.1 to 25 microns, and more preferably about 0.2 to 10 microns. Preferred particle sizes may be achieved by appropriate grinding and classification. All types of grinding, milling, and overall size reduction techniques that are used in ceramic industry can be used. Without limiting to other methods of size reduction used for brittle solids, preferred methods according to the present invention are ball milling (wet and dry), high energy centrifugal milling, jet milling, and attrition milling. If more than one inorganic material is to be used, then the multitude of ingredients can be co-ground together. In one embodiment, all the constituent materials of the agglomerate precursor are co-ground together, such as in a wet ball mill, before mixing.

Blowing Component

The blowing agents used in the preferred embodiments of the present invention are compounds which, when heated, liberate a blowing gas by one or more of combustion, evaporation, sublimation, thermal decomposition, gasification or diffusion. The blowing gas may be, for example, $CO_2$, CO, $O_2$, $N_2$, $N_2O$, NO, $NO_2$, $SO_2$, $SO_3$, $H_2O$, air or mixtures thereof. Preferably, the blowing gas comprises $CO_2$ and/or CO.

Preferably, the amount of blowing component is in the range of about 0.05 to 10 wt. % based on the total dry weight of the precursor, more preferably about 0.1 to 6 wt. %, and more preferably about 0.2 to 4 wt. %. The exact amount of blowing component will depend on the composition of the inorganic primary component, the types of blowing agents and the required density of the final hollow microsphere.

In one embodiment, the blowing component comprises a primary blowing agent and a secondary blowing agent. The primary blowing agent has a first activation temperature and the second blowing agent has a second activation temperature lower than the first activation temperature. In use, the secondary blowing agent is initially activated as temperature rises followed by the primary blowing agent. This conserves the primary blowing agent.

Preferably, the primary blowing agent is selected from powdered coal, carbon black, activated carbon, graphite, carbonaceous polymeric organics, oils, carbohydrates such as sugar, corn syrup, starch; PVA, various amines, carbonates, carbides (e.g. silicon carbide, aluminium carbide), sulfates, sulfides, nitrides (such as aluminium nitride, silicon nitride, boron nitride), nitrates, polyols, glycols, glycerine or combinations thereof. Silicon carbide and carbon black are particularly preferred primary blowing agents.

Preferably, the secondary blowing agent is selected from carbon, carbonaceous polymeric organics, oils, carbohydrates such as sugar, corn syrup, starch; PVA, various amines, carbonates, sulfates, sulfides, nitrides, nitrates, polyols, glycols, glycerine or combinations thereof. Carbon black, sugar, corn syrup and starch are particularly preferred secondary blowing agents.

In alternative embodiments of the present invention, the blowing component comprises further blowing agents, in addition to the primary and secondary blowing agents described above. These additional blowing agents are designated tertiary, quaternary etc. blowing agents having corresponding third, fourth etc. activation temperatures.

Accordingly, in one alternative embodiment the blowing component further comprises a tertiary blowing agent having a third activation temperature, wherein the third activation temperature is lower than the first activation temperature. Preferably, the third activation temperature is also lower than the second activation temperature. The tertiary blowing agent may be selected from carbonaceous polymeric organics, oils, carbohydrates such as sugar, corn syrup, starch; PVA, various amines, sulfates, sulfides, nitrides, nitrates, polyols, glycols, glycerine or combinations thereof. Sugar, corn syrup, and starch are particularly preferred tertiary blowing agents. If the blowing agent is non-water soluble, the blowing agent preferably has an average particle size of about 10 microns.

The use of multiple blowing agents has been shown to have particular benefits in the synthesis of expanded microparticles. It provides control of the blowing (expansion) process, thereby allowing a reliable synthesis of expanded microparticles from a wide range of readily available and inexpensive inorganic materials. Furthermore, it maximizes the efficiency of high quality (and relatively expensive) primary blowing agents, which further reduces the cost of synthetically manufacturing expanded microparticles.

Without wishing to be bound by theory, it is believed that the primary blowing agent produces the majority of gas during the blowing (expansion) process of the precursor. The secondary and, optionally, tertiary, quaternary etc. blowing agent acts as a sacrificial material by reducing or preventing premature spending of the primary blowing agent, for example by vaporization and/or oxidation, before the precursor material has become molten enough to capture the blowing gas during the expansion process.

For instance, a preferred blowing agent composition includes silicon carbide as a primary blowing agent and carbon or powdered coal as a secondary blowing agent. Carbon acts as the sacrificial blowing agent and starts to oxidize first, thereby keeping oxygen away from carbide until the precursor melts. Once the precursor melts, the majority of CO and $CO_2$ gas produced by oxidation of carbide is trapped within the molten precursor.

Figure 2:
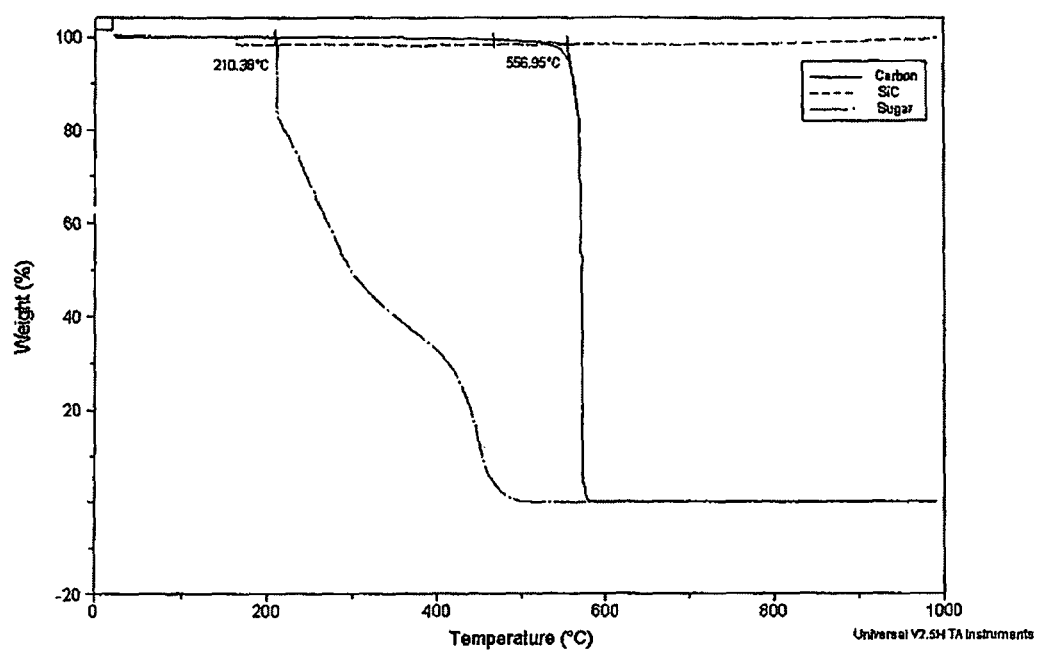
FIG. 2 is a TGA plot of three preferred blowing agents, sugar, carbon black and silicon carbide, showing sequential activation temperatures of sugar to be the lowest and carbide being the highest.

An alternative blowing agent composition comprises silicon carbide as the primary blowing agent, carbon as the secondary blowing agent, and sugar as the tertiary blowing agent. Without wishing to be bound by theory, it is believed that sugar starts to oxidize first, thereby consuming oxygen to substantially prevent oxidation of carbon and carbide, then carbon begins to oxidize preventing oxidation of carbide, and then finally carbide oxidizes to CO and $CO_2$, which are primarily responsible for blowing (expansion) of the microparticle. One advantage of the preferred embodiments is to reduce the overall cost of the blowing agent. Sugar is less costly than carbon, and silicon carbide is by far much more expensive than either one. By using the multi blowing agents, the amount of expensive silicon carbide required to produce a given low density product is dramatically reduced. FIG. 2 depicts the TGA (thermal gravimetric analysis) of sugar, carbon, and silicon carbide in air. As shown in FIG. 2, the activation temperatures with ascending order start with sugar, then carbon, and finally silicon carbide.

This novel mixture of blowing agents allows the use of inexpensive sacrificial blowing agents, such as sugar, carbon and/or powdered coal, in order to increase the efficiency and blowing capacity of a more expensive primary blowing agent, such as silicon carbide.

As discussed earlier, an additional and important advantage is realized when the precursors are prepared using the spray drying method. By making use of the mechanism described above, whereby relatively water-soluble species are pulled towards the exterior of the precursor during spray drying, an advantageous intra-particle distribution of primary and secondary blowing agents can be achieved.

Hence, using a relatively water-insoluble primary blowing agent and a relatively water-soluble secondary blowing agent, the secondary blowing agent can migrate towards the surface of the precursor, leaving the primary blowing agent uniformly dispersed. With the primary and secondary blowing agents separated in this way, the secondary blowing agent can more effectively "scavenge" oxygen away from the primary blowing agent in the critical period during firing in which a glassy skin has not yet formed around the precursor. This scavenging effect protects the primary blowing agents against premature spending, thereby maximizing its blowing capacity after or during formation of the glassy skin.

Sugar is an example of a useful secondary blowing agent. Sugar is soluble in water and will migrate towards the exterior of the precursor during spray drying. At the same time, sugar can be converted to carbon at the spray drying temperature, resulting in a fine dispersion of carbon particles throughout the exterior part of the precursor. This fine dispersion of carbon particles acts as an effective secondary (sacrificial) blowing agent by scavenging oxygen away from a primary blowing agent such as silicon carbide during the initial period of firing. Furthermore, organic compounds, such as sugar and starch, help to bind the agglomerate precursor constituents together. Thus, materials such as sugar and starch can act as both binding agents and blowing agents in certain preferred embodiments of the present invention.

Control Agent

The secondary and tertiary blowing agents mentioned above act as control agents to protect and conserve the primary blowing agent in the precursor formulation. Persons skilled in the art will be aware of other materials which can be included in the precursor formulation and which can act to control activation of the blowing agent by, for example, scavenging oxygen in the process environment.

Binding Agent

In a preferred embodiment of the present invention, a binding agent/agents (or binder) may also be mixed with the inorganic primary component and blowing component. The primary function of the binding agent is to intimately bind the silicate particles in the precursor together. The binder also may be selected to react with the silicate materials to lower the viscosity of the resulting glassy microparticles at the firing temperature.

In general, any chemical substance that is reactive and/or adheres with the inorganic primary component can be used as the binding agent. The binder may be any commercially available material used as a binder in the ceramic industry.

Preferably, the binding agent is selected from alkali metal silicates (e.g. sodium silicate), alkali metal aluminosilicates, alkali metal borates (e.g. sodium tetraborate), alkali or alkaline earth metal carbonates, alkali or alkaline earth metal nitrates, alkali or alkaline earth metal nitrites, boric acid, alkali or alkaline earth metal sulfates, alkali or alkaline earth metal phosphates, alkali or alkaline earth metal hydroxides (e.g. NaOH, KOH or $Ca(OH)_2$), carbohydrates (e.g. sugar, starch etc.), colloidal silica, inorganic silicate cements, Portland cement, lime-based cement, phosphate-based cement, organic polymers (e.g. polyacrylates) or combinations thereof. In some cases, fly ash, such as ultrafine, Type C or Type F fly ash, can also act as a binding agent. The binding agent and blowing agent are typically different from each other, although in some cases (e.g. sugar, starch etc.) the same substance may have dual blowing/binding agent properties, as described above.

The term "binder" or "binding agent", as used herein, is a broad term and shall have its ordinary meaning and shall include, but not be limited to, all binding agents mentioned above, as well as the in situ reaction products of these binding agents with other components in the agglomerate. For example, an alkali metal hydroxide (e.g. NaOH) will react in situ with at least part of an inorganic primary component comprising a silicate to produce an alkali metal silicate. Sodium hydroxide may also form sodium carbonate when exposed to ambient air containing $CO_2$, the rate of this process increasing at higher temperatures (e.g. 400° C.). The resulting sodium carbonate can react with silicates to form sodium silicate. Preferably, the amount of binding agent is in the range of about 0.1 to 50 wt. % based on the total dry weight of the agglomerate precursor, more preferably about 0.5 to 40 wt. % and more preferably about 1 to 30 wt. %.

It has already been discussed above that it is preferred to have the binding agent positioned towards the exterior portions of the precursor so that, during firing, the binding agent forms a molten skin. Formation of this molten skin should preferably be prior to or during activation of the blowing component, especially activation of the primary blowing agent. Not only will this formation of a molten skin further protect blowing agent within the precursor, it advantageously provides synthetic expanded microparticles of low density.

Using the spray drying method for forming the agglomerate precursor, it has been unexpectedly found that the concentration of the binding agent, as well as the blowing agents, within different zones of the agglomerate precursor can be controlled by appropriate selection of the solubility limits of this component. Accordingly, it is preferred that, using the spray drying method, the binding agent has a relatively high water-solubility so that it is more concentrated at the exterior of the agglomerate precursor and, hence, can form a molten skin during subsequent firing. Alkali compounds such as alkali hydroxides, or in particular compounds of sodium silicate and sodium aluminosilicate are preferred binding agents in this regard, since they are soluble in water and can, therefore, migrate towards the exterior of the agglomerate precursor.

Method of Forming Synthetic Expanded Microparticles

The precursors produced by the method described above may be used to synthesize expanded microparticles by firing at a predetermined temperature profile. Preferably, the temperature profile during firing fuses the precursor into a melt, reduces the viscosity of the melt, seals the surface of the precursor and promotes expansive formation of gas within the melt to form bubbles. The temperature profile should also preferably maintain the melt at a temperature and time sufficient to allow gas bubbles to coalesce and form a large primary void. After foaming, the newly expanded particles are rapidly cooled, thus forming hollow glassy microparticles. Accordingly, the temperature profile is preferably provided by a furnace having one or more temperature zones, such as a drop tube furnace, a vortex type furnace, a fluidized bed furnace or a fuel-fired furnace, with upward or downward draft air streams. A fuel-fired furnace includes furnace types in which precursors are introduced directly into one or a multitude of combustion zones, to cause expansion or blowing of the particles. This is a preferred type of furnace, since the particles benefit by direct rapid heating to high temperatures, which is desirable. The heat source may be electric or provided by burning fossil fuels, such as natural gas or fuel oil. However, the preferred method of heating is by combustion of natural gas, since this is more economical than electric heating and cleaner than burning fuel oil.

Typically, the peak firing temperature in firing step is in the range of about 600 to 2500° C., more preferably about 800 to 2000° C., more preferably about 1000 to 1500° C., and more preferably about 1100 to 1400° C. However, it will be appreciated that the requisite temperature profile will depend on the type of inorganic primary component and blowing component used. Preferably, the exposure time to the peak firing temperature described above will be for a period of about 0.05 to 20 seconds, more preferably about 0.1 to 10 seconds.

Engineered Hollow Microparticles

Certain preferred embodiments of the present invention further provide an engineered hollow microparticle obtained by the method described above. Such hollow microparticle are inexpensive to produce and may be used advantageously as a cheap alternative to coal-derived harvested cenospheres.

Synthetic hollow microparticles according to some preferred embodiments of the present invention typically comprise a substantially spherical wall with a closed shell (void) structure. The synthetic hollow microparticles preferably have one or more of the following characteristics:

(i) an aspect ratio of between about 0.8 and 1.

(ii) a void volume of between about 30 and 95%, based on the total volume of the microsphere;

(iii) a wall thickness of between about 1 and 30% of the microsphere radius;

(iv) a composition of about 30 to 95 wt. % $SiO_2$, about 0 to 45 wt. % (preferably about 6 to 40 wt. %) $Al_2O_3$, up to about 30 wt. % divalent metal oxides (e.g. MgO, CaO, SrO, BaO), about 2 to 10 wt. % monovalent metal oxides (e.g. $Na_2O$, $K_2O$), and up to about 20 wt. % of other metal oxides, including metal oxides which exist in multiple oxidation states (e.g. $TiO_2$, $Fe_2O_3$ etc.);

(v) a silica to alumina ratio which is greater than about 1;

(vi) an average diameter of between about 5 and 1000 microns, more preferably between about 40 and 500 microns;

(vii) an outer wall thickness of between about 1 and 100 microns, preferably between about 1 and 70 microns, more preferably between about 2.5 and 20 microns;

(viii) a particle density of between about 0.1 and 2.6 g/cm³, more preferably between about 0.2 and 1.5 g/cm³, and more preferably between about 0.4 and 1.0 g/cm³; or (ix) a bulk density of less than about 2.0 g/cm³, preferably less than about 1.0 g/cm³.

Use of Engineered Microparticles

The engineered microparticles according to certain preferred embodiments of the present invention may be used in a wide variety of applications, for example, in filler applications, modifier applications, containment applications or substrate applications. The scope of applications is much greater than that of coal derived cenospheres due to the low cost and consistent properties of engineered microparticles.

Engineered microparticles according to preferred embodiments may be used as fillers in composite materials, where they impart properties of cost reduction, weight reduction, improved processing, performance enhancement, improved machinability and/or improved workability. More specifically, the engineered microparticles may be used as fillers in polymers (including thermoset, thermoplastic, and inorganic geopolymers), inorganic cementitious materials (including material comprising Portland cement, lime cement, alumina-based cements, plaster, phosphate-based cements, magnesia-based cements and other hydraulically settable binders), concrete systems (including precise concrete structures, tilt up concrete panels, columns, suspended concrete structures etc.), putties (e.g. for void filling and patching applications), wood composites (including particleboards, fiberboards, wood/polymer composites and other composite wood structures), clays, and ceramics. One particularly preferred use is in fiber cement building products.

The engineered microparticles may also be used as modifiers in combination with other materials. By appropriate selection of size and geometry, the microparticles may be combined with certain materials to provide unique characteristics, such as increased film thickness, improved distribution, improved flowability etc. Typical modifier applications include light reflecting applications (e.g. highway markers and signs), industrial explosives, blast energy absorbing structures (e.g. for absorbing the energy of bombs and explosives), paints and powder coating applications, grinding and blasting applications, earth drilling applications (e.g. cements for oil well drilling), adhesive formulations and acoustic or thermal insulating applications.

The engineered microparticles may also be used to contain and/or store other materials. Typical containment applications include medical and medicinal applications (e.g. micro-containers for drugs), micro-containment for radioactive or toxic materials, and micro-containment for gases and liquids.

The engineered microparticles may also be used to provide specific surface activities in various applications where surface reactions are used such as substrate applications. Surface activities may be further improved by subjecting the microparticles to secondary treatments, such as metal or ceramic coating, acid leaching etc. Typical substrate applications include ion exchange applications for removing contaminants from a fluid, catalytic applications in which the surface of the microparticle is treated to serve as a catalyst in synthetic, conversion or decomposition reactions, filtration where contaminants are removed from gas or liquid streams, conductive fillers or RF shielding fillers for polymer composites, and medical imaging.

Example 1

Example 1 illustrates several formulations and methods for making expanded microparticles of certain embodiments of the present invention. Each formulation consists essentially of basalt and sodium hydroxide.

The formulations were prepared by mixing ground basalt with solid sodium hydroxide and water. Various mixtures of blowing agents with control agents including silicon carbide, sugar, carbon black and coal were added either in combination or isolation. The formulations are shown in Table 1. The composition of the basalt is given in Table 2.

Formulation 1A

Formulation 1A, as shown in Table 1, provides a method to make expanded microparticles from a formulation consisting essentially of basalt, sodium hydroxide and sugar as the blowing agent. A sample was prepared by mixing about 92 grams of basalt; ground to a $d_{50}$ particle size of about 2 microns, with about 5 grams of solid sodium hydroxide (flakes), about 3 grams of commercial sugar and about 23 mL of water.

Formulation 1B

Formulation 1B, as shown in Table 1, provides a method to make expanded microparticles from a formulation consisting essentially of basalt, sodium hydroxide and carbon black as the blowing agent. A sample was prepared by mixing 94 grams of basalt; ground to a $d_{50}$ particle size of about 2 microns, with about 5 grams of solid sodium hydroxide (flakes), about 1 gram of a commercial grade carbon black and about 38 mL of water.

Formulation 1C

Formulation 1C, as shown in Table 1, provides a method to make expanded microparticles from a formulation consisting essentially of basalt, sodium hydroxide and silicon carbide as the blowing agent. A sample was prepared by mixing 94.5 grams of basalt; ground to a $d_{50}$ particle size of about 1 micron, with 5 grams of solid sodium hydroxide (flakes), 0.5 grams of a commercial grade silicon carbide and 38 mL of water.

Formulation 1D

Formulation 1D, as shown in Table 1, provides a method to make expanded microparticles from a formulation consisting of basalt, sodium hydroxide, silicon carbide as the primary blowing agent and coal as the control agent or secondary blowing agent. A sample was prepared by mixing about 93.5 grams of basalt, about 0.5 grams of a commercial grade silicon carbide and about 1 gram of a commercial grade coal; the resulting blend being co-ground to a $d_{50}$ particle size of about 1 micron. This blend was then mixed with about 5 grams of solid sodium hydroxide (flakes) and about 38 mL of water.

Formulation 1E

Formulation 1E, as shown in Table 1, provides a method to make expanded microparticles from a formulation consisting essentially of basalt, sodium hydroxide, silicon carbide as the primary blowing agent and sugar as the control agent or secondary blowing agent. A sample was prepared by mixing about 92 grams of basalt; ground to a $d_{50}$ particle size of about 1 micron, with about 5 grams of solid sodium hydroxide (flakes), about 0.5 grams of a commercial grade silicon carbide, about 2.5 grams of a commercial sugar and about 37 mL of water.

Formulation 1F

Formulation 1F, as shown in Table 1, provides a method to make expanded microparticles from a formulation consisting essentially of basalt, sodium hydroxide, carbon black as the primary blowing agent and sugar as the control agent or secondary blowing agent. A sample was prepared by mixing about 91.4 grams of basalt; ground to a $d_{50}$ particle size of about 2 microns, with about 4.8 grams of solid sodium hydroxide (flakes), about 0.8 grams of a commercial grade carbon black, about 3 grams of a commercial sugar and about 38 mL of water.

Each mixture formed according to Formulations 1A-1F respectively was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate feed rate of about 0.14 g/min. The constant temperature zone of the furnace could be adjusted to provide residence times from less than one second to approximately several seconds at the peak firing temperatures, although the residence time in the below example was between about 0.6 seconds and 1.1 seconds. The foamed microparticles were collected on a funnel shaped collecting device covered with a fine mesh screen positioned at the bottom portion of the furnace. A mild suction was applied to the end of funnel to aid in collecting the microparticles. The products were characterized for particle density (e.g. apparent density), and microscopic examination by SEM. The results are summarized in Table 3. FIGS. 3 to 9 show SEM examinations of the products obtained from formulations 1A to 1F respectively.

TABLE 1

Formulations (grams) 1A to 1F

| Formulation No. | Basalt | Sodium Hydroxide | Blowing Agent | Control Agent | Water (mL) |
|---|---|---|---|---|---|
| 1A | 92.0 | 5.0 | 3.0 Sugar | — | 23 |
| 1B | 94.0 | 5.0 | 1.0 Carbon Black | — | 38 |
| 1C | 94.5 | 5.0 | 0.5 SiC | — | 38 |
| 1D | 93.5 | 5.0 | 0.5 SiC | 1.0 powdered coal | 38 |
| 1E | 92.0 | 5.0 | 0.5 SiC | 2.5 Sugar | 37 |
| 1F | 91.4 | 4.8 | 0.8 Carbon Black | 3.0 Sugar | 38 |

TABLE 2

| Composition of Basalt | | | | | | | | | | | |
| --- | --- | --- | --- | --- | --- | --- | --- | --- | --- | --- | --- |
| | $SiO_2$ | $Al_2O_3$ | $Fe_2O_3$ | CaO | MgO | $SO_3$ | $Na_2O$ | $K_2O$ | $TiO_2$ | $Mn_2O_3$ | $P_2O_5$ | Total |
| % wt | 46.1 | 15.8 | 11.4 | 9.5 | 9.6 | 0.0 | 2.8 | 1.5 | 2.4 | 0.25 | 0.59 | 99.94 |

TABLE 3

Result Summary

| Formulation No. | Temperature (degree C.) | Apparent density (g/cm³) |
| --- | --- | --- |
| 1A | 1300 | 1.28 |
| 1B | 1300 | 1.13 |
| 1C | 1250 | 1.13 |
| 1D | 1300 | 0.82 |
| 1E | 1300 | 0.85 |
| 1F | 1300 | 1.21 |

Example 1 illustrates the following

SiC is a more effective primary blowing agent than carbon and sugar to lower the particle density. Note that the net carbon content of SiC (30 wt % carbon) is less than equivalent mass of carbon in carbon (100 wt %), and sugar (40 wt % carbon);

Use of SiC with one or more control agents is more effective in lowering the particle density compared to any single blowing agent used in this example; and the combination of any single blowing agent with a control agent can be optimized to strongly influence the product's particle density, such as all SiC combinations are more effective to lower the particle density as compared to carbon-sugar combination.

Example 2

Example 2 illustrates several formulations and methods for making expanded microparticles from a formulation consisting essentially of various silicate compounds, sodium hydroxide and multi-staged blowing agents. Expanded microparticles were prepared using blends of a soda lime waste glass and various silicate materials. These blends also include mixtures of a primary blowing agent with control agents of silicon carbide with control agents, sugar, and/or carbon black. The formulations are shown in Table 4. The composition of the waste glass used in this work is given in Table 5.

Formulation 2A

Formulation 2A, as shown in Table 4, provides a method to make expanded microparticles from a formulation consisting essentially of glass, sodium hydroxide, with silicon carbide as the blowing agent and carbon black as the control agent. A sample was prepared by mixing about 95.6 grams of glass; ground to a $d_{50}$ particle size of about 1 micron, with about 3 grams of solid sodium hydroxide (flakes), about 0.4 grams of a commercial grade silicon carbide, about 1 gram of a commercial grade carbon black and about 58 mL of water.

Formulation 2B

Formulation 2B, as shown in Table 4, provides a method to make expanded microparticles from a formulation consisting essentially of glass, fly ash, sodium hydroxide, with silicon carbide as the blowing agent and carbon black as the control agent. A sample was prepared by mixing about 65.5 grams of glass and about 28.1 grams of fly ash; the mixture being co-ground to a $d_{50}$ particle size of about 2 microns. The glass/fly ash blend was mixed with about 5 grams of solid sodium hydroxide (flakes), about 0.4 grams of a commercial grade silicon carbide, about 1 gram of a commercial grade carbon black and about 42 mL of water. The composition of the fly ash is given in Table 5.

Formulation 2C

Formulation 2C, as shown in Table 4, provides a method to make expanded microparticles from a formulation consisting essentially of glass, basalt, sodium hydroxide, with silicon carbide as the blowing agent and carbon black as the control agent. A sample was prepared by mixing about 46.8 grams of glass and about 46.8 grams of basalt; the mixture being co-ground to a $d_{50}$ particle size of about 2 microns. The glass/basalt blend was mixed with about 5 grams of solid sodium hydroxide (flakes), about 0.4 grams of a commercial grade silicon carbide, about 1 gram of a commercial grade carbon black and about 37 mL of water. The composition of the basalt is given in Table 5.

Formulation 2D

Formulation 2D, as shown in Table 4, provides a method to make expanded microparticles from a formulation consisting essentially of glass, volcanic ash, sodium hydroxide, with silicon carbide as the blowing agent and carbon black as the control agent. A sample was prepared by mixing about 46.8 grams of glass and about 46.8 grams of volcanic ash; the mixture being co-ground to a $d_{50}$ particle size of about 2 microns. The glass/volcanic ash blend was mixed with about 5 grams of solid sodium hydroxide (flakes), about 0.4 grams of a commercial grade silicon carbide, about 1 gram of a commercial grade carbon black and about 50 mL of water. The composition of the volcanic ash is given in Table 5.

Formulation 2E

Formulation 2E, as shown in Table 4, provides a method to make expanded microparticles from a formulation consisting essentially of glass, andesite, sodium hydroxide, with silicon carbide as the primary blowing agent and sugar as the control agent. A sample was prepared by mixing about 47.1 grams of glass and about 47.1 grams of andesite; the mixture being co-ground to a $d_{50}$ particle size of about 2 microns. The glass/andesite blend was mixed with about 3 grams of solid sodium hydroxide (flakes), about 0.4 grams of a commercial grade silicon carbide, about 2.5 grams of sugar and about 50 mL of water. The composition of the andesite is given in Table 5.

Formulation 2F

Formulation 2F, as shown in Table 4, provides a method to make expanded microparticles from a formulation consisting essentially of glass, andesite, sodium hydroxide, with silicon carbide as the blowing agent and carbon black as the control agent. A sample was prepared by mixing about 47.8 grams of glass and about 47.8 grams of andesite; the mixture being co-ground to a $d_{50}$ particle size of about 1 micron. The glass/andesite blend was mixed with about 3 grams of solid sodium hydroxide (flakes), about 0.4 grams of a commercial grade silicon carbide, about 1 gram of a commercial grade carbon black and about 43 mL of water.

Each mixture formed according to Formulations 2A to 2F respectively was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate feed rate of about 0.14 g/min. The constant temperature zone of the furnace could be adjusted to provide residence times from less than one second to approximately several seconds at the peak firing temperatures. The foamed microparticles were collected on a funnel shaped collecting device covered with a fine mesh screen positioned at the bottom portion of the furnace. A mild suction was applied to the end of funnel to aid in collecting the microparticles. The products were characterized for particle density (e.g. apparent density), and microscopic examination by SEM. The results are summarized in Table 6.

FIGS. 10 to 16 show SEM cross sectional views for each of samples made with Formulations 2A to 2F.

TABLE 4

Formulations (grams) 2A to 2F

| Formulation No. | Waste Glass | Additional Component | Sodium Hydroxide | Blowing Agent | Control Agent | Water (mL) |
|---|---|---|---|---|---|---|
| 2A | 95.6 | — | 3.0 | 0.4 SiC | 1.0 Carbon Black | 58 |
| 2B | 65.5 | 28.1 fly ash | 5.0 | 0.4 SiC | 1.0 Carbon Black | 42 |
| 2C | 46.8 | 46.8 basalt | 5.0 | 0.4 SiC | 1.0 Carbon Black | 37 |
| 2D | 46.8 | 46.8 volcanic ash | 5.0 | 0.4 SiC | 1.0 Carbon Black | 50 |
| 2E | 47.1 | 47.1 andesite | 3.0 | 0.4 SiC | 2.5 Sugar | 42 |
| 2F | 47.8 | 47.8 andesite | 3.0 | 0.4 SiC | 1.0 Carbon Black | 43 |

TABLE 5

Chemical Compositions

| | $SiO_2$ | $Al_2O_3$ | $Fe_2O_3$ | CaO | MgO | $SO_3$ | $Na_2O$ | $K_2O$ | $TiO_2$ | $Mn_2O_3$ | $P_2O_5$ | Total |
|---|---|---|---|---|---|---|---|---|---|---|---|---|
| Glass | 74.7 | 2.0 | 0.9 | 11.1 | 0.6 | 0.0 | 10.0 | 0.5 | 0.06 | 0.06 | 0.02 | 99.94 |
| Fly Ash | 52.7 | 20.2 | 13.2 | 7.6 | 2.5 | 0.4 | 0.4 | 1.3 | 1.3 | 0.16 | 0.08 | 99.84 |
| Volcanic Ash | 76.4 | 12.4 | 2.1 | 0.9 | 0.3 | 0.0 | 2.1 | 5.5 | 0.15 | 0.08 | 0.03 | 99.96 |
| Andesite | 67.8 | 15.2 | 4.6 | 2.1 | 0.6 | 0.0 | 2.7 | 4.9 | 0.7 | 0.9 | 0.28 | 99.78 |

TABLE 6

Result Summary

| Formulation No. | Temperature (degree C.) | Residence time (second) | Apparent density (g/cm³) |
|---|---|---|---|
| 2A | 1200 | 0.6-1.1 | 0.98 |
| 2B | 1300 | 0.6-1.1 | 1.11 |
| 2C | 1200 | 0.6-1.1 | 0.93 |
| 2D | 1200 | 0.6-1.1 | 0.94 |
| 2E | 1300 | 0.6-1.1 | 0.93 |
| 2F | 1300 | 0.6-1.1 | 0.77 |

As shown by the results of Example 2, the combination of blowing agent with control agent such as silicon carbide-carbon and silicon carbide-sugar is very effective in production of expanded microparticles; and waste glass is an economical and suitable addition to various silicate mixtures; and Silicate raw materials, appropriate for production of expanded microparticles according to certain embodiments of present invention can be selected from a wide range of waste byproducts, minerals, chemicals, and rocks.

Example 3

Example 3 illustrates several formulations and methods for making expanded microparticles from formulations comprising various quantities of volcanic ash, sodium hydroxide, mixtures of blowing and control agents and other minor additives.

Formulation 3A

Formulation 3A is shown in Table 8. A sample was prepared by mixing about 78.2 grams of volcanic ash; ground to a $d_{50}$ particle size of about 3 microns, with about 20 grams of solid sodium hydroxide (flakes), about 0.8 grams of a commercial grade silicon carbide as the primary blowing agent, about 1 gram of a commercial grade carbon black as the control agent and about 43 mL of water.

Formulations 3B and 3C

Formulations 3B and 3C are shown in Table 8. Samples were prepared using a blend of volcanic ash and iron (III) oxide that was co-ground to a $d_{50}$ particle size of approximately 1 micron. The formulations are shown in Table 7. The composition of the volcanic ash is given in Table 5. The mixture was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate feed rate of about 0.14 g/min. The constant temperature zone of the furnace could be adjusted to provide residence times from less than one second to approximately several seconds at the peak firing temperatures. The foamed microparticles were collected on a funnel shaped collecting device covered with a fine mesh screen positioned at the bottom portion of the furnace. A mild suction was applied to the end of funnel to aid in collecting the microparticles. The products were characterized for particle density (e.g. apparent density), and microscopic examination by SEM.

The results are summarized in Table 8.

FIGS. 17 to 20 show two cross sections per sample, of the products of Formulations 3A to 3C respectively.

TABLE 7

Formulations (grams) 3A to 3C

| Formulation No. | Volcanic Ash | Sodium Hydroxide | Blowing Agents | Control Agents | Iron (III) Oxide | Water (mL) |
|---|---|---|---|---|---|---|
| 3A | 78.2 | 20.0 | 0.8 SiC | 1.0 Carbon Black | | 43 |
| 3B | 76.6 | 19.6 | 0.8 | 1.0 Carbon Black | 2.0 | 43 |
| 3C | 86.2 | 9.8 | 0.8 | 1.0 Carbon Black | 2.2 | 43 |

TABLE 8

Result Summary

| Formulation No. | Temperature (degree C.) | Residence time (second) | Apparent density (g/cm$^3$) |
|---|---|---|---|
| 3A | 1200 | 0.6-1.1 | 0.71 |
| 3B | 1200 | 0.6-1.1 | 0.60 |
| 3C | 1200 | 0.6-1.1 | 0.59 |

The results of Example 3 illustrate the following:

Combination of silicon carbide as primary blowing agent and carbon black as control agent is very effective in expanding volcanic ash into very light rounded product; and As sodium concentration is increased in the formulation, the product roundness approaches near spherical shape. Sodium oxide is a powerful fluxing agent for silicate glasses, such as viscosity reducer. Therefore, less viscous formulations tend to form spherical expanded particles rather than only rounded micro-particles, primarily because of lower surface tension at the firing temperature.

Example 4

Example 4 illustrates several formulations and methods for making expanded microparticles from formulations consisting essentially of fly ash, sodium hydroxide, and blowing control agents.

Formulation 4A

Formulation 4A is shown in Table 9. A sample was prepared by mixing about 79 grams of a type F fly ash; ground to a $d_{50}$ particle size of about 4 microns, with about 19 grams of solid sodium hydroxide (flakes), about 1 gram of a commercial grade silicon carbide as the primary blowing agent, about 1 gram of a commercial grade carbon black as the control agent and about 42 mL of water.

Formulation 4B

Formulation 4B is shown in Table 9. A sample was made by mixing about 68.7 grams of a type F fly ash similar to the one used in formulation 4A, with about 29.5 grams of solid sodium hydroxide, as shown in Table 9. The composition of the fly ash is given in Table 5. The mixture was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate feed rate of about 0.14 g/min. The constant temperature zone of the furnace could be adjusted to provide residence times from less than one second to approximately several seconds at the peak firing temperatures. The foamed microparticles were collected on a funnel shaped collecting device covered with a fine mesh screen positioned at the bottom portion of the furnace. A mild suction was applied to the end of funnel to aid in collecting the microparticles. The products were characterized for particle density (e.g. apparent density), and microscopic examination by SEM.

The results are summarized in Table 10. FIGS. 21 and 22 show two cross sections per sample, of the products of Formulations 4A and 4B respectively.

TABLE 9

Formulations (grams) 4A and 4B

| Formulation No. | Fly ash | Sodium Hydroxide | Blowing Agent | Control Agent | Water (mL) |
|---|---|---|---|---|---|
| 4A | 79.0 | 19.0 | 1.0 SiC | 1.0 Carbon Black | 42.0 |
| 4B | 68.7 | 29.5 | 0.8 SiC | 1.0 Carbon Black | 43.0 |

TABLE 10

Result Summary

| Formulation No. | Temperature (degree C.) | Residence time (second) | Apparent density (g/cm$^3$) |
|---|---|---|---|
| 4A | 1200 | 0.6-1.1 | 0.67 |
| 4B | 1200 | 0.6-1.1 | 1.03 |

The results of Example 4 illustrate the following:

A combination of silicon carbide as the primary blowing agent and carbon as the control agent is very effective in producing low density microparticles from a silicate waste byproduct, fly ash;

The concentration of fluxing compound such as sodium hydroxide can be optimized to produce excellent spherical microparticles with low particle density; and Higher concentration of fluxing agent beyond an optimum value, not only increases the particle density of the product, but also negatively impacts the economy. Waste fly ash is much less expensive than sodium hydroxide.

Example 5

Example 5 illustrates several formulations and methods for making expanded microparticles from a formulation consisting essentially of phosphatic clay a waste byproduct from phosphate ore beneficiation, sodium hydroxide, silicon carbide and carbon black.

Formulation 5A

A sample was prepared by mixing about 88.4 grams of phosphatic clay; ground to a $d_{50}$ particle size of about 0.6 microns, with about 9.8 grams of solid sodium hydroxide (flakes), about 0.8 grams of a commercial grade silicon carbide, about 1.0 grams of a commercial grade carbon black and about 85 mL of water. The composition of the phosphatic clay is given in Table 11. The mixture was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate feed rate of about 0.14 g/min. The constant temperature zone of the furnace could be adjusted to provide residence times from less than one second to approximately several seconds at the peak firing temperatures. The foamed microparticles were collected on a funnel shaped collecting device covered with a fine mesh screen positioned at the bottom portion of the furnace. A mild suction was applied to the end of funnel to aid in collecting the microparticles. The products were characterized for particle density such as apparent density, and microscopic examination by SEM.

The results are summarized in Table 12.

TABLE 11

Chemical Composition of Phosphatic Clay

| $SiO_2$ | $Al_2O_3$ | $Fe_2O_3$ | CaO | MgO | $SO_3$ | $Na_2O$ | $K_2O$ | $TiO_2$ | $Mn_2O_3$ | $P_2O_5$ | Total |
|---|---|---|---|---|---|---|---|---|---|---|---|
| 36.5 | 17.8 | 2.7 | 20.8 | 3.4 | 0.33 | 0.29 | 0.88 | 0.57 | 0.05 | 16.7 | 100.0 |

TABLE 12

Result Summary

| Temperature (degree C.) | Residence time (second) | Apparent density (g/cm$^3$) |
|---|---|---|
| 1300 | 0.8-1.5 | 0.92 |

The results of Example 5 illustrate the following:

Multi-blowing agent combinations of silicon carbide and carbon has been effectively used to produce low density microparticles from a waste clay byproduct; and The P$_2$O5-CaO combined concentration is more than about 33% of the total wt % of the product. The combination can potentially form an amorphous apatite phase in the product. Apatite containing product may exhibit useful bioactive reactions in medical applications.

Alkali Resistant Glass Formulations

Specific glass formulation can be advantageously used in the disclosed processes and methods for producing microspheres contained elsewhere herein. Some preferred embodiments utilize novel glass compositions shown to have superior alkali resistance characteristics when compared with commercially available spheres and coal-derived cenospheres, even at elevated temperatures that are formed from abundant and low cost materials. Glass articles having the characteristics described herein may be incorporated into composite materials comprising either organic polymer matrices or inorganic binder matrices or into other media where the described benefits are desirable.

According to embodiments disclosed herein, a glass composition may be formed having a high concentration of alkaline earth metal oxides and iron oxide, while maintaining a low concentration of alkali metal oxides. These types of compositions have been found to perform exceptionally well at high pH levels and under hydrothermal conditions.

It has been recognized that the chemical durability of silicate glasses in an aqueous environment strongly depends on their composition. Oxides included in the compositions of silicate glasses have been classified as network modifiers, such as alkaline metal oxides, alkaline earth metal oxides, ZnO, etc. and intermediate oxides, such as $Al_2O_3$, $ZrO_2$, $TiO_2$, $P_2O_5$. An increase in the percentage of silica and/or intermediate oxides generally improve the resistance to corrosion in aqueous media due to an increase in the content of bridging oxygen atoms (i.e., oxygen atoms which participate in bridging two silicon atoms, or a silicon atom to an intermediate atom, or between two intermediate atoms). Such an increase in the number of bridging oxygens strengthens the tetrahedral silicon-oxygen network that forms the backbone of the glass. On the other hand, an increase in the percentage of network modifiers generally reduces the resistance to aqueous attack because alkali oxides, in general, form terminal groups such as —Si—O$^-$ Na$^+$ in which the oxygen atoms are non-bonding, and therefore weaken the tetrahedral network.

Of particular interest are the roles of certain oxides, such as $Al_2O_3$, forming negatively charged tetrahedral $[AlO_4]^-$ groups with the negative charge balanced by the positive charge on an alkali metal ion. Thus, in the presence of such oxides, alkali ions can be incorporated into the glass without reducing its stability. This accounts for the role of $B_2O_3$ and $Al_2O_3$ in the production of durable glasses. Other oxides, such as $ZrO_2$ and $TiO_2$ can replace $SiO_2$ on a one to one basis in the glass network. However, this mechanism indicates that the effect of a glass component on overall corrosion resistance depends on the content of other components. For instance, in the absence of an excess of alkali oxides over $B_2O_3$ and $Al_2O_3$, the two latter oxides assume a triangular or octahedral, rather than tetrahedral coordination, and they no longer contribute to improved durability.

The change balance of an alkali metal ion with an aluminosilicate network can be understood by consideration of crystalline albite (NaAlSi$_3$O$_8$). Albite is an open aluminosilicate network in which both Si and Al are four fold coordinated by oxygen to form tetrahedra arranged as three-dimensionally interconnected cages. All oxygen atoms in this crystalline structure "bridge" between either Si or Al cations through covalent bonds. The negative $[AlO_4]^-$ groups are charge compensated by Na+ ions which occupy the oxygen-rich sites. Similar features can be expected in aluminosilicate glasses.

In glasses with equal parts $Al_2O_3$ and $Na_2O$, the Na$^+$ cations can be described as filling the oxygen rich cavities of the fully-polymerized former network, thereby tying up negatively charged $[AlO_4]^-$ groups. In this case, ionic bonds form between sodium ions and oxygen thus reducing the degree of openness of the glass network, thus maintaining the alumina in the glass network.

On the other extreme, in binary glasses, the Na$^+$ cations are tethered to the silicate network through non-bridging oxygens (NBO's), thus opening up the glass network, which is not particularly desirable for chemical durability.

In the pH range of about 12.5-14, which is the expected pH range found in aqueous media within the bulk of hydrating cement, the major components of many glasses are not durable and will become solubilized. More specifically, at high pH levels, silica is converted to silicic acid and alumina reacts to form aluminum hydroxide. Thus, alumina will not have the same beneficial effect on glass durability as it would have had at neutral or weakly basic environments.

A similar behavior is expected with many other common glass components, such as ZnO, $SnO_2$, PbO, $P_2O_5$, $GeO_2$, and other well-known glass components. Thus, glass manufacturers have historically believed that glassy materials within cementitious composites require relatively high concentrations of typical refractory oxides such as silica, zirconia, titania, and alumina, and a low concentration of alkali oxides to improve their durability. The increased refractory oxides provide the alkali resistance not inherent in many common glass components, but as a result of the high concentration of refractory oxides, most AR glasses of this type are relatively costly, and their use has been limited to only special applications when cost becomes less important than high tensile strength achieved by fiber reinforcement.

It has been found that while many oxides become more soluble due to anionic dissociation at high pH levels, the alkaline earths, and the lanthanides become less soluble at increasingly high pH. In fact, testing has shown that the maximum solubility of calcium reaches values of 1, $10^{-2}$, $10^{-4}$, and $10^{-6}$ M at pH values of approximately 11.5, 12.5, 13.5 and 14.5, respectively. Thus, preferred levels of calcium are about 1-25 wt. %, more preferably, 5-20 wt. %, and even more preferably 10-15 wt. %.

Interestingly, leach testing in an alkaline environment indicates that other materials added to the composition can offset the benefits of high calcium. For example, tests have shown that high levels of alkali metals, such as greater than about 10 wt. % of either $Na_2O$ or $K_2O$ or a combination of both, have deleterious effects on the durability of the glass composition, even in the presence of relatively high levels of calcium. Therefore, the inventors believe that high concentrations of calcium alone will not provide the desired durable glass, but that there are other elements that interact with the increased levels of calcium to provide the desired AR glass properties, and in some preferred embodiments, the $CaO/Na_2O$ molar ratio is believed to be important in alkali resistance. In some preferred embodiments, the $CaO/Na_2O$ molar ratio is typically greater than 1, and in some embodiments, is 2, 3, 4, 5, 10, 15, 20, 25, 30, or more.

While calcium is used herein as exemplary, the inventors believe, without wishing to be bound by theory, that other materials may be used in place of calcium to produce the desired alkali resistant properties. Some of these other materials include, without limitation, MgO and ZnO.

In addition, it has been found unexpectedly that leach testing indicates that in addition to the presence of Si and Al, another factor of importance in stabilizing the leach rate appears to be iron oxide. Statistical analyses indicate that leach rates drop with increasing $Fe_2O_3$, up to about 15 wt. %. Plotting of statistical data shows that the leaching curve drops sharply between about 0 wt. % and 1 wt. % Fe and gradually flattens out toward about 15 wt. % Fe. Thus, without wishing to be bound by this theory, it is believed that an amount of iron oxide, typically in the form of $Fe_2O_3$, up to about 15 wt. % provides improved alkali resistance in combination with the described levels of calcium and the $CaO/Na_2O$ molar ratio. Preferred embodiments include about 1-15 wt. % $Fe_2O_3$, and more preferably between about 5-12 wt. %, and more preferably, between about 7-10 wt. %.

Figure 21A:
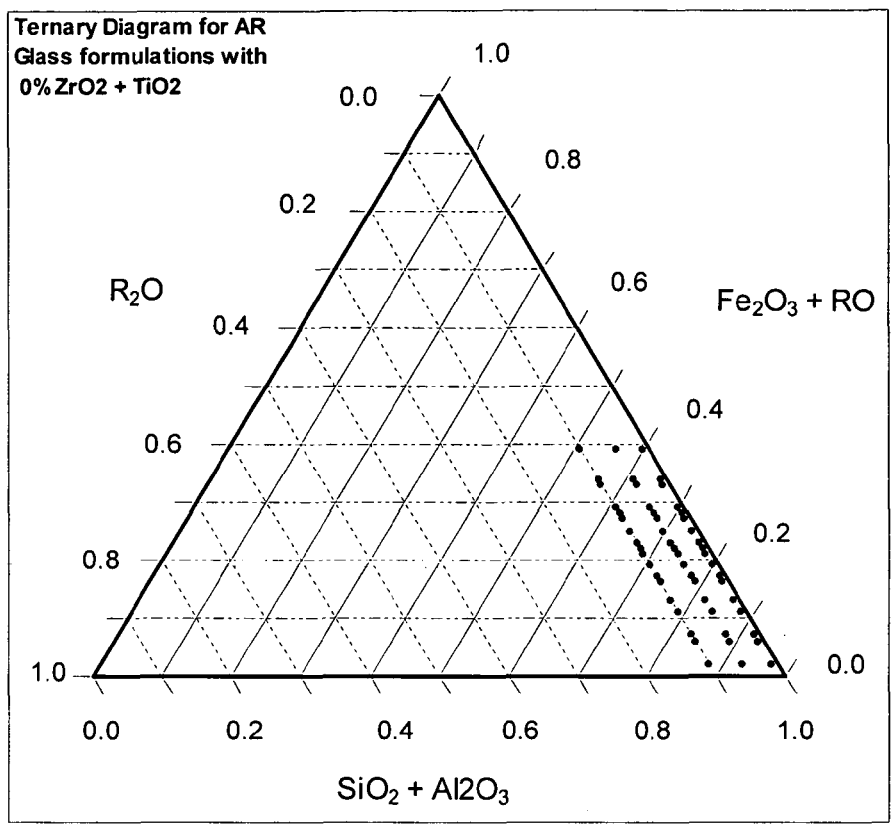
FIG. 21A is a ternary diagram for an alkali resistant (AR) glass formulation having about 0% $ZrO2+TiO2$.

FIG. 21a depicts an illustrative ternary phase diagram of the preferred compositional range according to several preferred embodiments the present invention, but should in no way be construed as limiting the scope of the invention. FIG. 21a specifically illustrates a ternary phase diagram of glass within a compositional range having no zirconia or titania, according to preferred embodiments of the invention.

Figure 21B:
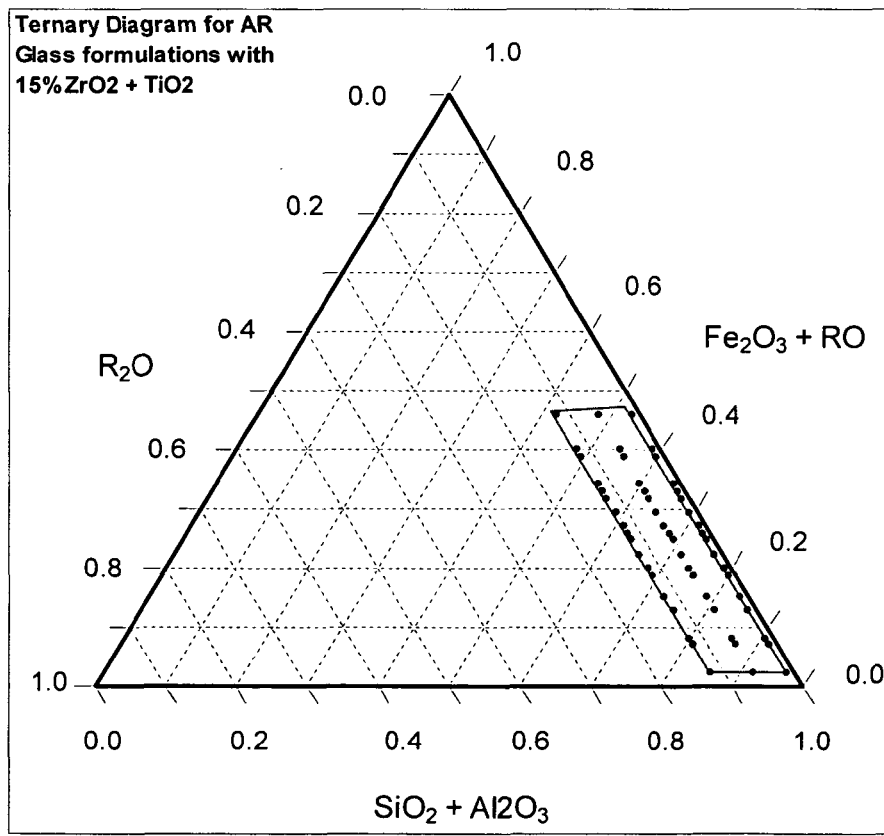
FIG. 21B is a ternary diagram for an AR glass formulation having up to about 15% $ZrO2+TiO2$.

FIG. 21b depicts another illustrative ternary phase diagram of another preferred compositional range including zirconia and titania up to a combined 15 wt. %. In this case 85 parts of the material highlighted in FIG. 21b would be combined with 15 parts zirconia or titania to yield a glass formulation consistent with the preferred embodiments of the invention.

As is shown in the following tables containing test data, it has been found unexpectedly that the higher combined concentrations of iron and calcium oxides is more effective than the refractory oxides alone against corrosion in severe aqueous alkaline environments. These findings are more specific to alkali reaction during high temperature hydrothermal curing of cementitious composites in which the curing temperature is typically around 180° C. for a period of about 5-10 hours.

Many of the embodiments disclosed herein, whether in the form of fibers, spheres, or other inclusions, have compositions relatively low in alkali oxides, below about 10%, and rich in iron and calcium oxides, with $Fe_2O_3$+CaO within the range of about 2-40 wt. %. Optionally, $ZrO_2$ and $TiO_2$ can be added to the glass composition to further improve the alkali durability in high alkali environments. Moreover, other oxides such as $P_2O_5$ and ZnO may also be beneficial in further improving the alkali resistance of glass articles in high pH environments.

It has been unexpectedly found that certain glass compositions within the compositional envelope of the present invention, when subjected to hydrothermal conditions in a strong alkaline solution, form a crystalline layer over the exposed surface of the glass article ("passivity layer"). It has been found that hydrothermally treating the glass article at a temperature of about 180° C. in an alkaline solution saturated with calcium hydroxide at a pH level of about 12-14 results in the formation of a passivity layer on the outside surface of the glass article. The passivity layer is shown in FIG. 22b. In several preferred embodiments in which the glass article is a hollow sphere, the passivity layer has a thickness that is preferably less than the sphere wall thickness. In some embodiments, the passivity layer thickness is less than about 10% of the sphere wall thickness, and even more preferably, the passivity layer thickness is less than about 5%, and in some embodiments is less than about 2% of the hollow sphere wall thickness.

It has been found that incorporating relatively high concentrations of iron and calcium oxides results in the passivity layer formation during hydrothermal treatment. Addition of small percentages of zirconium oxide to the glass compositions rich in iron and calcium oxide further improved the formation and tightness of the passivity layer. Subsequent examination of the passivity layer by energy dispersive x-ray (EDX) analysis revealed the enrichment of iron and calcium oxides and depletion of alkali oxides.

Through experimentation and testing, the inventors have learned that exposure of commercial ZAR glasses to cementitious environments results in an increase in calcium and zirconium content and decrease in silica and alkali content, but does not result in the formation of a passivity layer similar to the present inventive compositions.

EDX examination of the passivity layer formation on spherical glass beads of the inventive glass compositions revealed that the passivity layer formation on glass articles without added zirconia is rich in iron and calcium oxides and low in alkali oxides. The passivity layer formation with the addition of 1-6 wt. % zirconia to the parent glass is enriched in iron and calcium oxides, but not with zirconia. The passivity layer soaks calcium from the surrounding cementitious solution which is saturated with calcium hydroxide. The zirconia does not play a major role in the formation of the passivity layer and it only decreases the intrinsic solubility of silica.

Based upon extensive corrosion testing, the inventors found that glasses made according to embodiments of the present invention have as good, and sometimes better, corrosion resistance as the best commercial glasses that have very high zirconia content, even having as much as 15 wt. % zirconia and more. Electron microscopy of commercial zirconia glasses showed no passivity layer formation similar to the inventive glasses when subjected to the same hydrothermal conditions.

The produced passivity layer provides protection against alkali corrosion during the service life of the cementitious products. This finding was confirmed by first subjecting two glasses with varying amounts of iron and calcium oxides to identical hydrothermal treatment to form the passivity layer. Two samples, Glass A and Glass B were compared for alkali resistance. Glass A was made according to the composition of the present invention and Glass B was a coal ash derived cenosphere which is frequently used as durable glass in cementitious systems. Glass A had twice the iron oxide content and nine times more calcium oxide than Glass B. However, Glass B had almost 1.5 times more alumina than Glass A.

The glass samples were hydrothermally treated and then subjected to a standard accelerated correction test at 90° C. in five molar sodium hydroxide solution. While ASTM C 1203-91 test standards use 10% sodium hydroxide solution in water to measure alkali resistance, due to the high durability of glasses tested, a stronger alkaline solution was chosen for conducting accelerated tests. A 20% sodium hydroxide solution (5 molar) was chosen for the accelerated corrosion tests.

After an 8 hour test, the mass loss due to corrosion was almost twice as much for commercially available Glass B. After one week of testing under the same conditions, the mass loss of Glass B was almost three times that of Glass A. These findings indicate that the passivity layer formation due to the dual presence of iron and calcium oxides outperforms high alumina cenosphere glass compositions.

Figure 22A:
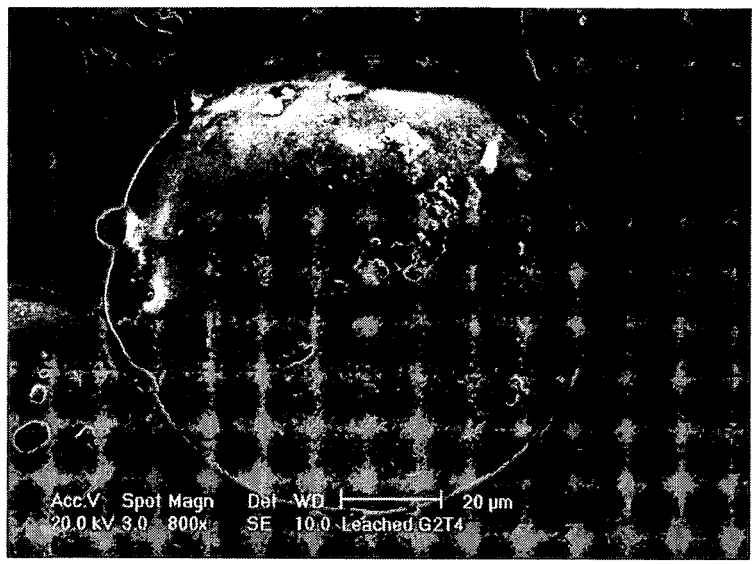
FIG. 22A is a scanning electron micrograph of a coal-derived cenosphere showing its outer surface without a passivity layer.
Figure 22B:
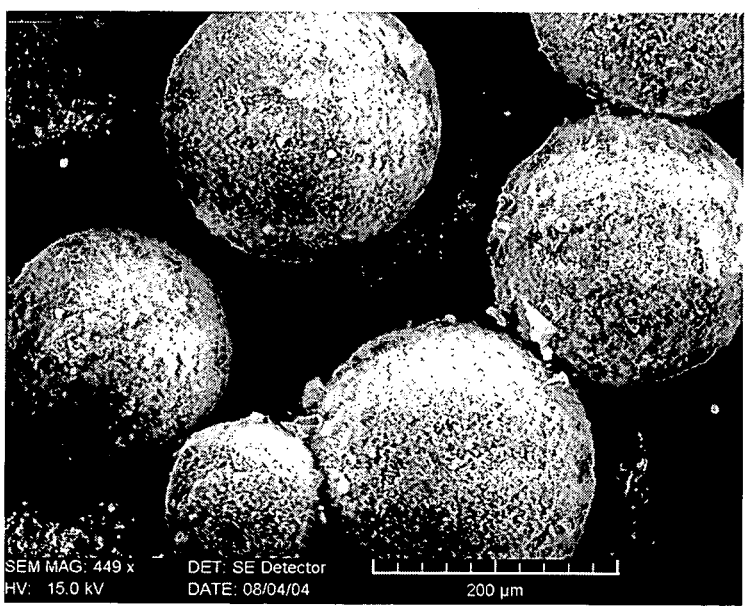
FIG. 22B is a scanning electron micrograph of microparticles made according to certain embodiments of the present invention showing the formation of a passivity layer on the outer surface of the microparticle.

FIGS. 22a and 22b are scanning electron micrographs (SEM micrographs) of a cenosphere and a glass article embodiment according to the present invention after both being subjected to hydrothermal conditions. As can be seen, the glass article of FIGS. 22b and 22c, produced in accordance with the present invention, show a passivity layer formation. It is believed that the formation of the passivity layer greatly improves the native glasses ability to withstand corrosive attack in high alkali environment.

Subsequent testing and SEM and EDS analysis have shown that commercially available cenospheres and AR glasses do not form this type of passivity layer when subjected to similar conditions. Without wishing to be bound by theory, the inventors believe that the passivity layer is formed as material leaches from the glass formulation and is then redeposited onto the surface. This is supported by leaching tests in which leaching of $SiO_2$ and $Al_2O_3$ sharply decreases with time, suggesting that these levels actually redeposit onto the surface of the article, as shown in the following Table 1

TABLE 13

Wt % Leached from inventive glass composition at different time points.

| Element as Oxide | Wt % Leached | | |
|---|---|---|---|
| | 1 hr Treatment | 5 hrs Treatment | 19 hrs Treatment |
| $SiO_2$ | 0.24 | 7.8 | 3.3 |
| $Al_2O_3$ | 0.05 | 7.6 | 2.5 |
| $Na_2O$ | 0.49 | 27.6 | 58.1 |
| Total | 0.21 | 6.36 | 5.06 |

As shown in Table 1 above, while leaching of $Na_2O$ increases from 5 hrs to 19 hrs, leaching of $SiO_2$ and $Al_2O_3$ sharply decreases indicating that these two elements redeposit on the surface of the glass article. Accordingly, as expected, the passivity layer has a chemical formulation that is rich in Si and Al. Additionally, the passivity layer further includes Mg, Fe and Ca, as confirmed by EDS analysis. Interestingly, when utilizing the glass compositions described herein, it appears that the addition of zirconia does not substantially influence the formation of the passivity layer, but rather improves the texture and uniformity of the passivity layer.

Accelerated corrosion testing in 20 wt % hydroxide at 95° C. confirmed that spheres made from the glass formulations provided herein and incorporating the passivity layer, proves much stronger AR characteristics, as shown in the following examples.

Additional testing was performed to measure the alkali resistance of glass articles made from glass compositions described herein along with several commercial AR glasses. The total fraction of glass dissolved was assessed in a synthetic solution saturated with calcium hydroxide and pH adjusted with lithium hydroxide at 180° C. in a pressurized vessel. This environment is similar to the aqueous environment found in a hydrating cementitious mixture in an autoclave. However, lithium hydroxide was used instead of sodium or potassium hydroxides which are normally present in ordinary cement in order to minimize the background concentrations measured by inductively coupled plasma spectroscopy (ICP). With this substitution, sodium and potassium concentrations were measured accurately in the resulting leach solutions.

Test Data

Examples A and B illustrate the leaching rates of microparticles produced according to methods described herein in comparison with a commercial grade cenosphere product, and several commercially available microspheres.

Example A

An aqueous alkaline solution as was prepared with 2.343 g/L of LiOH, and 0.080 g/L of Ca(OH)2 at a pH of about 13.0. The test materials included a commercially available coal ash cenosphere (produced at 4 Corners power plant, and sold by Phoenix Cement), commercial soda lime microspheres (sold under trade name of SISCOR by Spherical Industrial Solutions, Toronto-Canada), and synthetically produced spherical microparticles according to one embodiment of the present invention, identified as sample 3-4-54. The alkaline solution was heated to 180° C. and the test materials were left to soak for 5 hours. The solid charge was 0.25 g in 15 ml of solution for all the three materials. The leach tests were performed at 180° C. after a duration of 5 hours. Table 14 summarizes the major oxide constituents of the three test specimens.

TABLE 14

|  | Phoenix Cement cenosphere | SISCOR | 3-4-54 |
| --- | --- | --- | --- |
| $SiO_2$ | 64.6 | 71.2 | 47.9 |
| $Al_2O_3$ | 25.8 | 3.9 | 20.6 |
| CaO | 0.9 | 9.6 | 13 |
| $K_2O$ | 1.6 | 0.7 | 1.2 |
| $Fe_2O_3$ | 4.1 | 0.3 | 7.7 |
| $TiO_2$ | 0.5 | 0.1 | 1.2 |
| MgO | 1.3 | 1.9 | 3.3 |
| $Na_2O$ | 1.1 | 12.1 | 5 |
| BET surface area m2/g | 1.1 | 1.3 | 1.0 |

From Table 14 (above), the specific surface area of all the three samples are relatively close. Sample 3-4-54 is one preferred embodiment of the present invention. As can be seen, the compositions are different, with sample 3-4-54 having the highest calcium and iron oxide content. Sample 3-4-54 additionally has a much lower silica content than the other samples. While sample 3-4-54 has higher alkali content than the cenospheres sample, it is much lower than the SISCOR sample.

Table 15 (below), illustrates the percentage leached with respect to the major oxides as determined by ICP and the normalized leach rate with respect to time and exposed surface area.

TABLE 15

| Percentage leached Wt. % | Phoenix cement cenosphere | SISCOR | 3-4-54 |
| --- | --- | --- | --- |
| $SiO_2$ | 15.6 | 30.7 | 7.9 |
| $Al_2O_3$ | 1.7 | 6.0 | 6.8 |
| $K_2O$ | 18.4 | 62.0 | 33.9 |
| $Fe_2O_3$ | 0.1 | 1.0 | 0.05 |
| $TiO_2$ | 0.4 | 1.8 | 0.2 |
| MgO | 0.03 | .01 | 0.02 |
| $Na_2O$ | 54.7 | 59.5 | 51.6 |
| Total percentage leached wt. % | 11.4 | 29.8 | 8.1 |

From Table 15 above, it is clear that sample 3-4-54, one embodiment of the present invention, exhibited the least amount of leaching followed by cenospheres and then SISCOR. The leach rate is directly associated with the composition's AR properties. As a result of the low leaching, particles made according to the composition of sample 3-4-54 should provide better resistance to the caustic environment found in hydrating cement than either of the other two commercially available alkali resistant glasses.

Example B

In the following example, additional commercial products were tested, including 3M-S32: SCOTCHLITE®, manufactured by 3M Corp., of Minnesota; PORAVER®, manufactured by Spherical Industrial Solution of Toronto, Canada; SPHERIGLASS®, made by PQ Corp, USA; and SIL-CELL®, made by Silbrico Corp., USA. Table 16 lists the major oxides contained in the Example B products.

TABLE 16

|  | MATERIALS | | | |
| --- | --- | --- | --- | --- |
|  | 3M-S32 | PORAVER | SPHERIGLASS | SIL-CELL |
| $SiO_2$ | 78.6 | 73.1 | 74.9 | 81.1 |
| $Al_2O_3$ | 0.5 | 3.7 | 0.7 | 11.0 |
| CaO | 13.1 | 9.4 | 9.4 | 0.6 |
| $K_2O$ | 0.1 | 0.8 | 0.1 | 5.2 |
| $Fe_2O_3$ | 0.1 | 0.4 | 0.6 | 1.6 |
| $TiO_2$ | 0.0 | 0.1 | 0.1 | 0.1 |
| MgO | 0.2 | 2.1 | 4 | 0.1 |
| $Na_2O$ | 7.3 | 14.8 | 14.5 | 2.9 |

The leach data of the samples listed in Table 16 are presented in the following Table 17:

TABLE 17

|  | MATERIALS | | | |
| --- | --- | --- | --- | --- |
| Percent of oxides leached out wt. % | 3M-S32 | PORAVER | SPHERIGLASS | SIL-CELL |
| $SiO_2$ | 27.2 | 36.3 | 20.5 | 27.7 |
| $Al_2O_3$ | 4.7 | 2.3 | 13.1 | 1.1 |
| CaO | 4.8 | 0.9 | 0.0 | 10.9 |
| $K_2O$ | 100 | 60.2 | 100 | 12.1 |
| $Fe_2O_3$ | 5.9 | 0.6 | 0.3 | 0.8 |
| $TiO_2$ | 7.7 | 2.0 | 2.4 | 2.6 |
| MgO | 2.2 | 0.1 | 0.02 | 2.8 |
| $Na_2O$ | 51.9 | 73.6 | 42.4 | 50.4 |
| Total Percentage leached: | 25.9 | 38.1 | 21.8 | 25.4 |

Total percentage leached from sample 3-4-54: 8.1

From Table 17 above, it can be seen that materials with high silica alone (SIL-CELL), and high silica and calcium oxide (3M-S32) are highly affected by an aqueous alkaline environment as experienced within hydrating cement in an autoclave, thus further supporting the conclusion that CaO alone is unable to provide acceptable alkali resistance. Likewise, both PORAVER and SPHERIGLASS, even though they exhibit modest amounts of CaO, are highly susceptible to corrosion in the aqueous alkaline environment at elevated temperatures, again reinforcing the concept that other elements are needed to cooperate with CaO in order to provide the desired alkali resistance.

Example C

Example C testing was carried out to quantify the effects of adding small amounts of zirconia to embodiments of the present invention to determine the improved alkali resistance. In the following examples, samples 1A, 1B, 1C, and 1D were prepared according to embodiments of the present invention. These samples of alkali resistant glass were made from formulations consisting of fly ash, sodium hydroxide, zirconium silicate and sugar.

The formulation of sample 1A was prepared by mixing 92 grams of a type F fly ash with 5 grams of solid sodium hydroxide (flakes), 3 grams of sugar and 25 mL of water. A formulation 1B sample was prepared by mixing 90.5 grams of a type F fly ash with 5 grams of solid sodium hydroxide (flakes), 3 grams of sugar, 1.5 grams of zirconium silicate and 28 mL of water. Formulation 1C was prepared by mixing 89 grams of a type F fly ash with 5 grams of solid sodium hydroxide (flakes), 3 grams of sugar, 3 grams of zirconium silicate and 28 mL of water. Formulation 1D was prepared by mixing 86 grams of a type F fly ash with 5 grams of solid sodium hydroxide (flakes), 3 grams of sugar, 6 grams of zirconium silicate and 27 mL of water.

Sample 2A is a sample of commercially available alkali resistant glass having a nominal 0% zirconium oxide content. Sample 2B is a sample of commercially available alkali resistant glass having a nominal 14% zirconium oxide content. Sample 2C is a sample of commercially available alkali resistant glass having a nominal 16% zirconium oxide content. Sample 2D is a sample of commercially available alkali resistant glass having a nominal 18% zirconium oxide content. The compositions are presented in Table 18 below.

The mixtures were each blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of 106 to 180 μm. In the next step, the powders were fed into a vertical heated tube furnace at an approximate feed rate of 0.14 g/min. The constant temperature zone of the furnace could be adjusted to provide residence times from less than one second to approximately several seconds at the peak firing temperatures. The resulting particles were collected on a funnel shaped collecting device covered with a fine mesh screen positioned at the bottom portion of the furnace. A mild suction was applied to the end of funnel to aid in collecting the micro-inclusions. The products were each inspected for shape and form using microscopic examination to ensure complete melting, before being assessed for alkali resistance by exposure to Modified Lawrence Solution at 180° C., at a pressure of 135 psi for 5 hours.

The composition and leaching data of each of the samples is shown in Table 18 below.

TABLE 18

MATERIALS

| Sample | Embodiments of the present invention | | | | Commercially available AR glasses | | | |
|---|---|---|---|---|---|---|---|---|
|  | 1A | 1B | 1C | 1D | 2A | 2B | 2C | 2D |
| $SiO_2$ | 50.7 | 50.6 | 48.5 | 47.1 | 41.3 | 52.9 | 54.8 | 59.2 |
| $Al_2O_3$ | 19.8 | 19.3 | 20.1 | 19.4 | 3.3 | 0.7 | 0.9 | 0.3 |
| $Fe_2O_3$ | 7.5 | 7.5 | 7.2 | 7.7 | 0.1 | 0.3 | 0.2 | 0.1 |
| CaO | 12.4 | 12.1 | 12.1 | 11.7 | 6.0 | 4.85 | 5.7 | 0.6 |
| MgO | 2.5 | 2.2 | 3.2 | 3.0 | 2.3 | 0.4 | 0.1 | 0 |
| $Na_2O$ | 4.6 | 4.6 | 4.4 | 4.5 | 5.5 | 10.7 | 11.7 | 9.0 |
| $K_2O$ | 1.2 | 1.2 | 1.1 | 1.1 | 0.1 | 1.52 | 2.3 | 1.4 |
| $TiO2$ | 1.3 | 1.3 | 1.2 | 1.2 | 0 | 3.2 | 0.7 | 1.8 |
| $ZrSiO_4$ | 0 | 1.2 | 2.2 | 4.2 | 0 | 15 | 16 | 17 |
| Total Leaching by wt. % | | | | | | | | |
|  | 8.2 | 9.1 | 7.1 | 6.4 | 15.8 | 4.9 | 5.0 | 2.7 |

It can be seen that samples 1A, 1B, 1C, and 1D, made according to embodiments of the present invention, all have very comparable leach rates, and the addition of small amounts of zirconia only marginally improve their alkali resistance. In addition, while samples 2B, 2C, and 2D exhibit lower leaching rates, they contain very high amounts of zirconia, and thus are significantly more expensive to produce because of material cost and required melting energy. Sample 2A, a no-ZR commercially available alkali resistant glass, shows poor alkali resistance in comparison with the samples prepared according to the present invention.

While the included examples do not define the full limits of the inventive concepts presented herein, they do indicate some very interesting trends. Based upon hundreds of tests and extensive use of statistical analysis of the test results, it has been found that there are a group of non-zirconia glasses that provide exceptional AR characteristics that can be manufactured economically from abundant materials. It is believed that these non-zirconia glasses exhibit their AR characteristics due to the interaction of increased levels of CaO and Fe, while having a relatively low $R_2O$ (where $R_2O$ is chosen from $K_2O$, $Na_2O$, and $Li_2O$). Specifically, the present inventors believe that alkali resistance in high pH environments can be improved with increasing $CaO/R_2O$ molar ratio, the concentration of Fe, and in some embodiments, the addition of Zr and/or Ti into the glass composition. For example, testing and analyses have determined that glasses having the desired AR properties can be economically manufactured according to the following composition:

>35% $SiO_2$
1-25% CaO
1-15% $Fe_2O_3$
1-10% $R_2O$, and
an amount of $Al_2O_3$ such that $SiO_2:Al_2O_3>1$.

Optionally, up to about 10 wt. %, or even up to about 15 wt. % $ZrO_2+TiO_2$ can be added to further improve the AR properties of the described glass. Ternary phase diagrams showing exemplary compositional ranges are presented in FIGS. 21a and 21b which incorporate 0 wt. % and 15 wt. % $ZrO_2+TiO_2$ respectively. Inexpensive glass articles made from the described compositions are particularly suitable in cementitious applications where the cementitious products are cured under high temperature hydrothermal conditions (e.g., above 100° C.), such as is experienced in an autoclave. As discussed above, by forming glasses having the described compositions and processing the glass articles as described, a passivity layer can be formed on the exterior surface of the glass articles, thus further improving their alkali resistance.

While the foregoing description and samples produced according to embodiments of the invention limited the inclusion of $ZrO_2$ and $TiO_2$, it is believed that modest amounts of these elements, such as a combination of up to about 15 wt. %, will serve to further increase the AR properties of the samples, and therefore, some embodiments of the present invention include up to about 15 wt. %, and more preferably up to about 10 wt. % of either $ZrO_2$, $TiO_2$, or a combination thereof.

While the inventors have ascertained that high temperature hydrothermal treatment results in the formation of a passivity layer on the unique glass articles described herein, the inventors further believe that a passivity layer can be formed under low temperature hydrothermal conditions as well. The passivity layer is believed to be formed by redeposition of leached ingredients from the glass matrix, which is accelerated under high temperature hydrothermal conditions. However, if given sufficient time, an alkali solution at low temperature (e.g., below about 100° C.) is believed to cause similar results. Specifically, tests have been run in an aqueous alkaline solution prepared with 2.343 g/L of LiOH, and 0.080 g/L of Ca(OH)2 at a pH of about 13.0, at temperatures of 35° C. and 95° C. The inventors have discovered that, even at 35° C., a passivity layer begins to form, and given sufficient time, it is believed that a substantially continuous passivity layer will form and cover the surface of the glass article. In fact, testing shows that if left at about 95° C. for a sufficient amount of time, a continuous passivity layer forms over the surface of the glass article.

In addition, the inventors believe that a passivity layer may be formed through other processes, such as by preferential leaching of the glass materials from the surface of the article. Alternatively, reaction of metal hydroxides or dissolved inorganic compounds such as nitrates, chlorides, sulfates, silicates, borates, phosphates, and the like, with the glass constituents may also form a passivity layer on the surface of the glass.

Accordingly, the general methods by which a passivity layer can be formed are either through leaching and redeposition, by glass material being preferentially leached from the surface of the article, or by chemical reaction of the soluble species of the contact solution with the glass.

While the inventors have discovered that a passivity layer can be formed in situ by incorporating the glass articles into a cementitious composite, it was unexpectedly found that a passivity layer can be formed outside of a cementitious composite by treatment in an appropriate solution. Accordingly, manufactured glass articles can be post treated to form a passivity layer. In one preferred embodiment, the post treatment is conducted by subjecting the glass articles to hydrothermal treatment conditions, such as, for example in a pressurized vessel containing an alkaline solution of maintained between 100° C. and 400° C. for a predetermined length of time. The alkaline solution, containing a predetermined amount of Ca (OH)2, may be removed and recycled for treating a new batch of glass articles, while the glass articles themselves may be washed, dried and packaged using conventional techniques for washing, drying and packaging powders or granular materials.

The inventors have also determined that a passivity layer may also be formed on the glass articles at temperatures lower than 100° C., eliminating the need for a pressurized vessel in the process above. The glass articles with the formed passivity layer can then be incorporated into other applications where durability is a concern. Alternatively, a coating or other type of surface layer can be added to improve the glasses compatibility with the material matrix.

Accordingly, glass articles can be manufactured according to the compositions and methods described herein, subsequently treated to form a passivity layer, and then integrated into a desired application.

Heterogeneous Spheres and Methods for Producing

Certain preferred embodiments of the present invention provide a low-density, heterogeneous microparticle, such as a microsphere, wherein the microparticle is engineered to have a heterogeneous phase distribution within the walls of the microparticle so as to impart certain favorable properties to the microparticle or to improve the process by which it is formed. In one embodiment, the microparticle is constructed of materials of at least two different phases, such as amorphous and crystalline. As will be described in greater detail below, the amorphous/crystalline phase distribution and gas content within the walls of the microparticle are preferably predetermined and engineered according to the desired density and other properties. The preferred embodiments of the present invention also provide methods for producing these engineered, low-density microparticles, which entail purposefully controlling the amorphous/crystalline phase distribution and gas content within the wall of the sphere.

FIG. 23 schematically illustrates in cross-section a low-density, heterogeneous microparticle 100. As shown in FIG. 23, microparticle 100 has a generally circular cross-section, although it will be appreciated that the microparticle can assume a variety of other shapes. As further shown in FIG. 23, microparticle 100 has a cavity shown as cavity 102 defined by a generally spherical wall shown as wall 104. The wall 104 of microparticle 100 is preferably heterogeneous and comprises a first region shown as 106 and a second region shown as 108, wherein the material of each region is in a different phase. In one embodiment, the first region 106 comprises an amorphous glassy phase and the second region 108 comprises residual particles in a solid phase. The solid residual particles can be left over from the starting solids in the original precursor agglomerate formulation, and/or newly formed crystalline phases that may nucleate and/or grow from the glassy phase. In another embodiment, the second region 108 may comprise minute gas bubbles. In yet another embodiment, the second regions 108 may comprise micro-inclusions such as crystalline solids formed from nucleation or gaseous pockets entrained in the wall.

Preferably, the residual particles in the solid phase and/or the bubbles in the gas phase in the second regions 108 are encapsulated by the glassy material in the amorphous phase in the first regions 106. The described amorphous glassy phase preferably entraps gasses within the particle wall before the gas can escape through the sphere wall to the surrounding environment. The relative amount of glass required with respect to volume of other phases should be sufficient to form a continuous structure that substantially surrounds the other phases, such as gas filled voids or crystalline inclusions, within it.

In one embodiment, the low-density, heterogeneous microparticle 100 is a partially vitrified sphere, comprising an amorphous phase glassy material 106 in combination with residual solids 108 derived from the starting materials that are part of the precursor formulation. In most conventional glass microsphere forming applications, the glass forming materials are completely melted to form a homogeneous melt. In contrast, in forming the low-density heterogeneous microparticles 100, a quantity of starting materials is not allowed to homogeneously melt, thereby resulting in residual crystalline or amorphous solids contained within the glassy material that has been allowed to melt. This is preferably done by either varying the melting time or temperature or both, which, results in a partially vitrified microparticle.

Vitrification is the process by which solids are melted to form an amorphous glassy phase. By allowing the crystalline or amorphous solids to only partially vitrify, a quantity of the starting materials remains in its original amorphous or crystalline form.

Preferably, the processing time and temperature for forming the partially vitrified, heterogeneous microparticles are selected such that the blowing agent forms gas bubbles to blow the melted glass materials into a hollow sphere, as described elsewhere herein. Rapid cooling of the sphere at the desired time will result in residual solid material remaining within the amorphous glassy sphere wall, thus producing a heterogeneous sphere.

In another embodiment, the low-density, heterogeneous microparticle 100 comprises a glassy amorphous phase 106 and gas bubbles 108 trapped in the wall 104 of the microparticle 100. As will be described in greater detail below, this embodiment generally entails quenching the microparticles at the appropriate time after firing to retain the gas bubbles in the walls of the microparticle. As the glass material temperature is increased, its viscosity is reduced. As the melted glass viscosity reduces, its surface tension also reduces, and the gasses produced by the blowing agent activation reach a gas pressure that is sufficient to overcome the glass surface tension and escape. However, the escape of gas from within the sphere results in a diminished sphere size and a concomitant increase in density. Accordingly, quenching the sphere at the appropriate time allows the gas bubbles to be frozen or trapped in the sphere wall before they are able to escape. Since the gas has a lower density than the glass materials, the inclusion of gas bubbles in the sphere wall will also achieve a reduction in sphere density, and specifically, a reduction in the density of the sphere wall.

In yet another embodiment, the low-density, heterogeneous microparticle 100 of FIG. 23 comprises 106 as a glass amorphous phase and 108 as a crystalline structure encapsulated by the amorphous phase. This embodiment generally entails allowing nucleation and forming crystals from the melted materials. For example, the amorphous glass phase is relatively unstable thermodynamically, and the melt materials will prefer to assume a crystalline structure as they cool. Rapid cooling, or quenching, of a melt, reduces molecule mobility, and hence "freezes" the material in an amorphous glassy phase. However, if the melt materials are allowed to cool relatively slowly, nucleation may occur and crystals may form and grow in the glass. Accordingly, by controlling the cooling of the spheres, the glass materials will have an opportunity to nucleate and grow crystals within the sphere wall. However, whenever particle cooling is slowed to allow nucleation, degassing will continue to occur until the glassy material viscosity increases enough to prevent degassing. Accordingly, allowing crystal nucleation results in a higher density sphere as the gas continues to escape from the sphere than if the sphere were rapidly quenched and thus is not preferred in embodiments where particle density is the driving factor.

Conventionally hollow glass microsphere formation generally follows four stages. The first stage occurs as the starting materials begin to soften and melt and the blowing agent is activated. Numerous small bubbles begin to form within the softened material.

During the second stage, many of the small bubbles begin to coalesce into a fewer number of larger bubbles toward the center of the material in order to assume a lower energy state. This is caused, in part, because for a given volume of gas, a single larger bubble has a smaller surface area than many smaller bubbles, and so coalescing reduces the overall surface tension of the bubbles. The starting materials continue to melt during the second stage.

In the third stage, the larger bubbles begin coalescing into a central primary bubble. As the residence time of the particle increases, the particle temperature increases, resulting in a decrease in the surface tension of the particle and the material viscosity. So, while many smaller bubbles continue to coalesce into the central primary bubble, some of the smaller bubbles begin to degas through the surface of the sphere and escape to the environment.

During the fourth stage, the surface area of the sphere continues to reduce, and the smaller bubbles either coalesce into the single primary bubble, or degas through the sphere wall. It is at this stage when the starting materials achieve a homogeneous melt and is the stage at which typical sphere making methods quench the spheres. The result of the typical methods is a substantially solid wall consisting of a completely homogeneous amorphous phase surrounding a central primary bubble. Of course, if the sphere wall material temperature is allowed to increase either through increased temperature or increased residence time, its viscosity and surface tension continue to decrease, which promotes continued degassing of the internal gasses. Eventually, without quenching or cooling, a solid sphere would form when all the gas escapes to the external environment.

As discussed above, to form the low-density heterogeneous microparticle 100 of a preferred embodiment in which the microparticle contains a glassy amorphous phase 106 and bubbles in a gaseous phase 108 encapsulated within the microparticle wall, the microparticle is preferably quenched during the third stage. This is when the blowing agent reaction is substantially complete, yet before a majority of the smaller bubbles degas to the external environment. Consequently, the maximum volume of gas is trapped within the sphere, either in a central primary bubble, or in smaller bubbles within the sphere wall. Additionally, the starting materials may not have had sufficient time to homogeneously melt and a solid portion of the starting materials remains embedded in the sphere wall. Because the gas volume trapped within the sphere is at a substantial maximum, the sphere volume also reaches its substantial maximum, and thus, sphere density is substantially minimized since mass remains substantially constant throughout the process. There may be a miniscule mass loss due to some degassing, but this is negligible compared to the mass of the sphere materials. The result is a low density heterogeneous microparticle having a gas phase within the sphere wall and optionally a crystalline or different amorphous phase from the starting materials.

Thus, the low-density microparticles of the preferred embodiments of the present invention may derive heterogeneity through either (1) partial vitrification of starting materials, (2) trapping gas bubbles within the sphere wall, and/or (3) allowing nucleation and/or crystal growth during sphere formation and cooling. Apart from controlling formulation, the first two embodiments can be achieved by controlling the firing conditions, while the third embodiment can be achieved by controlling the cooling conditions. Of course, two or three of the techniques for forming heterogeneous microparticles may be combined to result in a microparticle having the desired strength to weight properties, all having a lower density than a purely homogeneous sphere. However, preferred embodiments achieve heterogeneity due to gas bubbles in the sphere wall in combination with crystalline materials resulting from incomplete melting of the raw materials, i.e. a partially vitrified sphere.

In one embodiment, a partially vitrified microparticle results when amorphous or crystalline materials are present in the starting materials and are only allowed to partially melt during the microparticle forming process. The result is that while some of the starting materials are allowed to vitrify, a quantity of the starting materials remains in its original crystalline or amorphous form in the final vitroceramic article.

In any of the above embodiments, the microparticles can be formed by first forming an agglomerated precursor material from a single particle or by combining particles of one material or several materials together. The precursor material containing a blowing agent is then introduced into a heating environment, such as a furnace, where the blowing agent releases a gas by activation, such as, for example, evaporation, decomposition, pyrolysis, oxidation, reduction, sublimation, or any other suitable gas forming process.

In forming a heterogeneous microparticle such as a sphere, the starting materials may be glassy or crystalline, or a combination thereof. In the case of a glassy precursor, the resulting sphere heterogeneity may be due to inclusion of a gas phase, unmelted materials from the original glass phase, crystal nucleation and growth, or a combination thereof. In the case of crystalline starting materials, a glass is formed upon heating and melting the precursor, and heterogeneity may include unmelted crystalline starting materials, additional nucleation and/or growth and/or a gas phase. In the case of glassy-crystalline starting materials, heterogeneity may include the residue of the original glassy phase, a gas phase, and a single or plurality of crystalline phases which were present in the starting glassy-crystalline material and/or additional crystal nucleation and/or growth. An example of such a starting material is fly ash which is substantially comprised of a silicate glassy phase and oftentimes the presence of crystalline phases such as quartz, magnetite, hematite, and mullite, among others.

As is understood with glass foaming, a plurality of bubbles typically coalesce into a central primary bubble. It should be noted that heterogeneity as a result of the gas phase in the glass refers to gas bubbles dispersed within the wall of the sphere, and not the single central primary gas bubble.

FIGS. 24A and 24B illustrate representative early stages of engineered heterogeneous microparticle formation in which the blowing agent is activated to produce gas bubbles 210 within the glass material 212. The surface tension of the glass material initially traps the gas bubbles 210 within the glass material 212. However, as the glass temperature increases, its viscosity and surface tension decrease. Additionally, as the temperature increases, the internal gas pressure increases both as a function of temperature and as a result of the blowing agent continuing to react to release additional gas. The individual gas bubbles 210 have a tendency to coalesce in the center of the sphere in response to the surface tension of the glass material to form one or more intermediate bubbles 214. However, some of the bubbles 210 will achieve a gas pressure that results in a pressure differential with the atmospheric pressure that imparts a tendency on those bubbles 210 to breach the glass material and escape to the surrounding atmosphere. Should the glass be cooled such that its viscosity increases sufficiently to trap the gas bubbles 210 before they escape, the result is that gas bubbles will become dispersed in the sphere wall, as shown in FIG. 25. Several embodiments of the present invention result in a microparticle having gas bubbles trapped within the wall of the sphere, as illustrated in FIG. 25. According to some embodiments, the second regions 108, which is in gaseous phase and shown as porosity of the microparticle wall, as a measure of the percentage of voids to solid material in the sphere wall is greater than 2%. In other embodiments, the porosity is greater than about 5%, 8%, 10%, and in some embodiments is greater than 15% or even 20%. Of course, the gas inclusion percent is somewhat dependent on the starting materials, and can even be as high as 30%, 40%, or 50% or greater.

This is in contrast with a homogeneous sphere of the prior art in which sufficient gas is allowed to escape from the sphere such that the glass surface tension and the gas pressure reach equilibrium. In this case, as schematically illustrated in FIG. 26, a central bubble 216 forms and there are substantially no gas bubbles dispersed within the sphere wall. The result is a homogeneous sphere having a higher density than the described heterogeneous sphere. The sphere of FIG. 26 has a higher density because a greater volume of gas has been allowed to escape thus reducing the sphere volume while maintaining the same mass of glass material. In fact, if the sphere continues to be heated, all the entrained gas will continue to escape as the sphere approaches solidity.

While it is possible to gradually cool a homogeneous sphere to allow nucleation and crystal growth within the sphere, this is typically only performed after a homogeneous melt of the glass material and equilibration of the gas pressure with the glass surface tension caused by allowing gas to escape from the sphere. The gas escaping from the sphere necessarily results in a smaller particle size thus increases the overall density.

The following discussion further describes some of the preferred processes for achieving the low apparent density of the heterogeneous microparticleds described above. The following discussion assumes the more general case where the starting materials contain crystalline materials; however, the discussion equally applies to glassy starting materials as well. In certain preferred implementations, the microparticle heterogeneity results from the firing step and is independent from the starting materials. As mentioned above, engineered, heterogeneous microparticles created through controlled firing are preferred over spheres produced through controlled cooling because the sphere density is lower under controlled firing conditions. Accordingly, the following discussion focuses on controlled firing conditions to produce heterogeneous microparticles.

Controlled firing can be carried out by two methods, fixed firing temperature-varying residence time, and fixed residence time-varying firing temperature.

Fixed Final Firing Temperature, Varying Residence Time

Agglomerated precursor materials are prepared as described elsewhere herein and are heated to a predetermined firing temperature. The heating rate is preferably fixed and is typically within the range of from about 60° C./min to about 25000° C./min. The firing temperature is also fixed in many embodiments and can be in the range of from about 700° C. to about 2000° C., but in some preferred embodiments is within the range of from about 1200° C. to about 1600° C. As the precursor is heated, a viscous glassy phase is formed, having a viscosity which is temperature dependent. The viscous liquid encapsulates the crystalline starting materials as they melt to form an amorphous glassy phase. Of course, some of the starting materials may have a melting temperature higher than the firing temperature and will remain in its original form in the resulting microparticle.

The blowing agent is selected and configured to activate at or below the chosen firing temperature ("blowing agent activation temperature"). During heating, as the agglomerated precursor material reaches the blowing agent activation temperature, the blowing agent activates and the gas generated by the blowing agent is entrapped in the viscous liquid and expands the viscous material. However, in some preferred embodiments, multiple blowing agents having sequential activation temperatures may be used to provide multiple staged blowing. The sphere reaches a volume at which the apparent particle density is at a substantial minimum when the substantial maximum volume of gas is trapped within the viscous material.

However, as the residence time of particles continues to increase at the final firing temperature, the glassy phase may dissolve more of the starting material crystalline solids and degassing begins as the pressure differential between the blowing agent gas pressure and atmospheric overcomes the surface tension of the glassy phase. As noted, continued residence in the heated environment continues to reduce the viscosity of the melted glassy material and thus further promotes degassing. The particle continues to degas as long as the gas pressure differential overcomes the particle surface tension. We can ignore the mass of the blowing agent and, for those particles that do not fragment, assume that the particle mass does not change during firing; however, as the volume of entrapped gas decreases, the apparent particle density increases as a function of the residence time.

Preferred embodiments of the microparticle reach a substantial minimum density value before all the residual solids are completely dissolved and before the glassy phase degases. In either case, a heterogeneous particle is formed, e.g. a particle wall containing a combination of glass and gas and/or second-phase crystal material.

Note that the apparent particle density before the activation of the blowing agent and before the encapsulation by the glassy phase is relatively high. It should be noted that premature activation of the blowing agent prior to the formation of a viscous glassy phase results in a loss of gas, as it escapes through the crevasses between the grains of the agglomerated precursor. Thus, the blowing agent activation temperature is selected such that the blowing agent is activated at a temperature above the glass transition temperature of the starting materials and the firing conditions and residence time are selected such that the blowing agent activates prior to homogeneous melting of the starting materials.

However, as the particles continue to reside at the firing temperature after the blowing agent is fully activated, the glass continues to degas until the gas pressure equilibrates with the glass surface tension and the sphere forms a solid wall surrounding a central cavity, resulting in a hollow sphere having a density greater than the minimum density. In addition, as the residence time increases, the residual starting solids dissolve until they reach a homogeneous melt. During this time, the glass surface tension continues to reduce as a function of temperature and the gas continues to diffuse through the sphere wall until the entire sphere reaches the fixed firing temperature, the glass forms a homogeneous melt, and the internal gas pressure equilibrates with the surface tension of the sphere.

Thus, where there is a fixed firing temperature, there is an optimal residence time that results in substantially minimum particle density that occurs after the blowing agent reaction is substantially complete, but prior to the starting materials achieving a homogeneous melt and prior to substantial degassing. In addition, when compared to traditional sphere making processes, the production economies are increased due to a lower residence time thereby resulting in increased throughput and/or energy savings over typical hollow glass sphere forming processes.

Fixed Residence Time and Varying Firing Temperatures

A second method of arriving at a low-density particle is by fixing the residence time and varying the firing temperature. This method utilizes a thermodynamic methodology while the previous method utilizes a kinetic methodology.

Glass viscosity is temperature dependent and decreases with increasing temperature. The rate of fusion or dissolution of starting solid particles will increase as the viscosity of the encapsulating glass decreases and heat is transferred to the remaining solid particles with greater efficiency. However, a lower viscosity also coincides with a lower surface tension thus providing a weaker barrier against gas escape.

There exists a range of optimal firing temperature and residence time combinations in which a glassy liquid is formed that seals around the crystalline precursor materials and the blowing agent is activated thus producing gas within the glassy liquid. For a given residence time, an optimal temperature results in a complete blowing agent reaction without reducing the viscosity of the glassy material to a level that allows significant degassing. It is with these conditions that the particle will reach its substantial minimum density. This results in a heterogeneous particle, where the glass sphere wall contains either residual starting solids, gas bubbles, or both. For a given residence time, higher temperatures result in an increased particle density caused by degassing of the glass until equilibrium pressure is reached, thereby reducing the particle volume.

Formation Temperatures and Apparent Densities

The following two examples illustrate that, in certain embodiments, in order to produce desired low-density, heterogeneous microparticles according to the defined process or method, the homogeneous glassy matrix (comprising the majority of the microparticle walls) will contain gas and/or second-phase micro-inclusions, such as unmelted starting materials, thus resulting in a heterogeneous particle.

Example 1

This example illustrates a method to make heterogeneous microparticles from a formulation consisting of fly ash, sodium hydroxide, carbohydrate such as molasses, and silicon carbide by varying the formation temperature.

A sample was prepared by mixing 93.1 grams of fly ash; ground to a $d_{50}$ particle size of 5.1 microns, with 5 grams of solid sodium hydroxide (flakes), 1.5 grams of commercial molasses, and 0.4 grams of silicon carbide. The formulation is shown in Table 19. The composition of the fly ash is shown in Table 20.

TABLE 19

| Example 1 Formulation (grams) | |
|---|---|
| Fly Ash | 93.1 |
| NaOH | 5.0 |
| Carbohydrate | 1.5 |
| Silicon Carbide | 0.4 |

TABLE 20

| Composition of Fly Ash (percent) | |
|---|---|
| $SiO_2$ | 50.63 |
| $Al_2O_3$ | 21.14 |
| $Fe_2O_3$ | 7.62 |
| CaO | 12.39 |
| MgO | 3.61 |
| $SO_3$ | 0.66 |
| $Na_2O$ | 0.63 |
| $K_2O$ | 1.27 |
| $TiO_2$ | 1.3 |
| $Mn_2O_3$ | 0.17 |
| $P_2O_5$ | 0.14 |
| ZnO | 0.045 |
| $CrO_3$ | 0.015 |
| Cl | 0.004 |

Each mixture was blended into a homogeneous slurry, poured into a flat dish and allowed to solidify at room temperature for approximately 5 minutes. The resulting product was further dried at about 70 degrees Celsius for at least 24 hours, after which it was ground and sieved to obtain powders within a size range of 106 to 180 microns. The resulting powders were then fed into a vertical heated tube furnace at an approximate feed rate of 0.10 g/min. The residence time in the furnace was kept constant for each change in the formation temperature. The expanded microparticles were collected on a funnel shaped collecting device covered with a fine mesh screen positioned at the bottom portion of the furnace. A mild suction was applied to the end of funnel to aid in collecting the microparticles. The products were characterized for particle density (e.g. apparent density) by helium pycnometry and general microscopic examination by scanning electron microscopy (SEM). Some of the microparticles were then embedded in a resin, and the cured resin surface was polished until it included multiple particle cross-sections. The combination of SEM and energy dispersive spectroscopy (EDS) was then used to map the microparticle cross-sections locating any areas of gas and second-phase micro-inclusions.

For the second-phase micro-inclusions, a specific element that comprises each inclusion was determined and was then converted into its simplest oxide form. Results are reported by dividing the area occupied by each type of micro-inclusion oxide by the total cross-sectional area analyzed. Measurements were conducted until at least 10 microparticles were analyzed and the total suitable area exceeded 4000 square microns.

Figure 27:
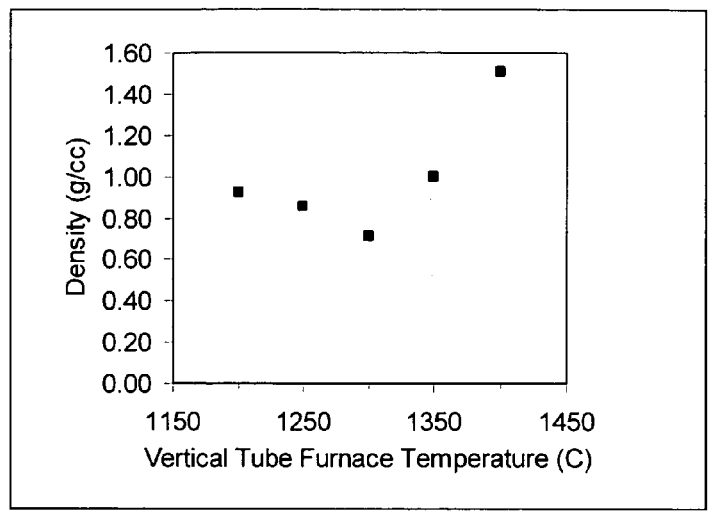
FIG. 27 is a temperature versus density plot of microparticles formed according to several embodiments of the present disclosure.

Table 21 shows the various temperatures used in the vertical heated tube furnace and the apparent densities of the resulting products, while FIG. 27 plots the same data.

TABLE 21

Formation Temperatures and Apparent Densities of Various Products Made.

|  | Furnace Temperature (° C.) | Apparent Density (g/cc) |
| --- | --- | --- |
| Product 1A | 1200 | 0.92 |
| Product 1B | 1250 | 0.85 |
| Product 1C | 1300 | 0.72 |
| Product 1D | 1350 | 1.00 |
| Product 1E | 1400 | 1.51 |

As can be seen from Table 21 above and with reference to FIG. 27, the apparent density reaches a relative minimum at about 1300° C. As explained above regarding microsphere formation at fixed residence time while varying temperature, the lowest density value corresponds with the formation of a heterogeneous particle. For a given residence time, the apparent density increases as temperature increases beyond this relative minimum density value as the particle continues to exhibit a lower viscosity and degassing continues to occur. Thus, for a given residence time, there exists a temperature at which the particle achieves a relative minimum density, as expected and shown in FIG. 27.

FIGS. 28A-32B show SEM images of the various products listed in Table 21, where the first image provides information about the microparticle morphology, e.g., overall shape, surface smoothness and porosity, and the second image confirms that the microparticles are hollow and provides details about the porosity and thickness of the microparticle walls.

Figure 28A:
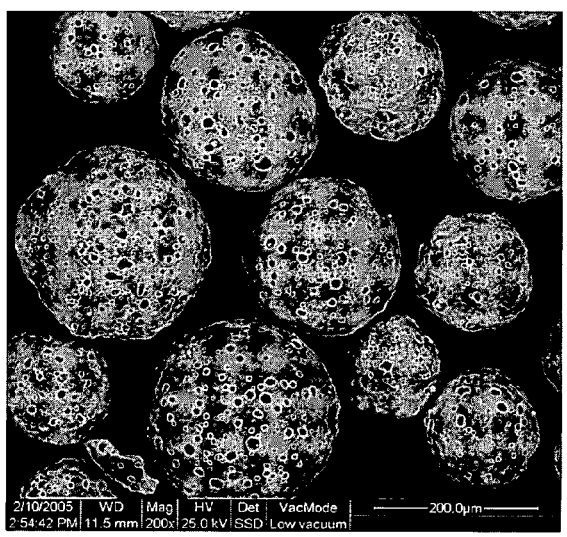
FIG. 28A is a scanning electron micrograph of engineered, heterogeneous microparticles of one embodiment of the present invention.
Figure 28B:
FIG. 28B is a scanning electron micrograph of the microparticles of FIG. 28A wherein the microparticles have been ruptured to illustrate the wall characteristics.

FIGS. 28A and 28B show particles corresponding with Product 1A from Table 21 fired at 1200° C. for a fixed residence time, preferably between about 0.1 seconds and 1.5 seconds. More preferably, the fixed residence time is between 0.3 and 1.1 seconds, and in some embodiments, is about 0.3, 0.6, 0.8, 0.9 or 1.1 seconds. The particles shown in FIGS. 28A and 28B exhibit an irregular surface texture and substantial porosity. This is due to the relatively low firing temperature for the predetermined residence time. The low firing temperature resulted in the particle materials having a viscosity that resisted sphere formation by the blowing gas. Consequently, at this temperature and residence time combination, the particles only reached the early stages of sphere formation. FIG. 28B confirms that the particles where hollow and that the blowing gas had begun to coalesce in the center of the sphere.

Figure 29A:
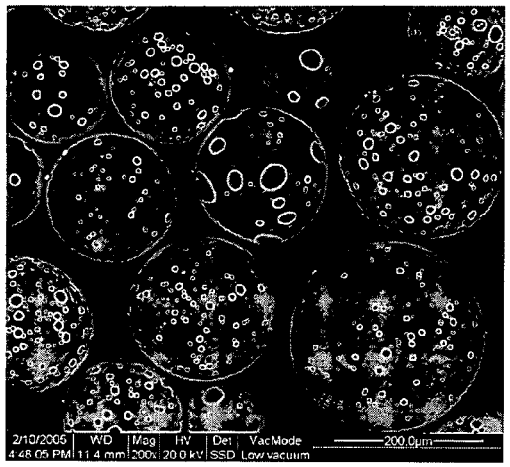
FIG. 29A is a scanning electron micrograph of one embodiment of engineered, heterogeneous microparticles of another embodiment of the present invention.
Figure 29B:
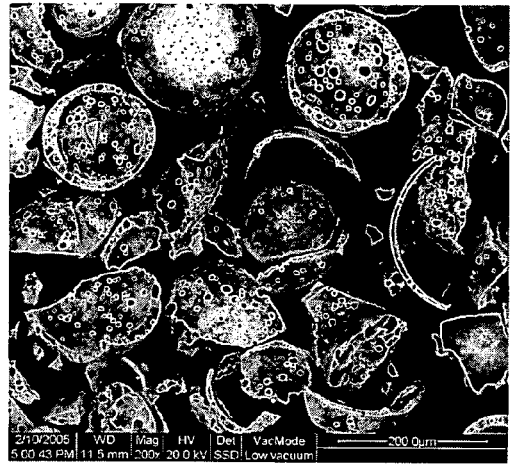
FIG. 29B is a scanning electron micrograph of the microparticles of FIG. 29A wherein the microparticles have been ruptured to illustrate the wall characteristics.

FIGS. 29A and 29B show particles corresponding with Product 1B from Table 21 fired at 1250° C. for a fixed residence time. It can be seen that surface roundness improved and density was decreased in comparison to product 1A. This results from the higher firing temperature that allowed the melted starting materials to achieve a lower viscosity, thus more thoroughly melting, fluxing, and blowing the starting materials.

Figure 30A:
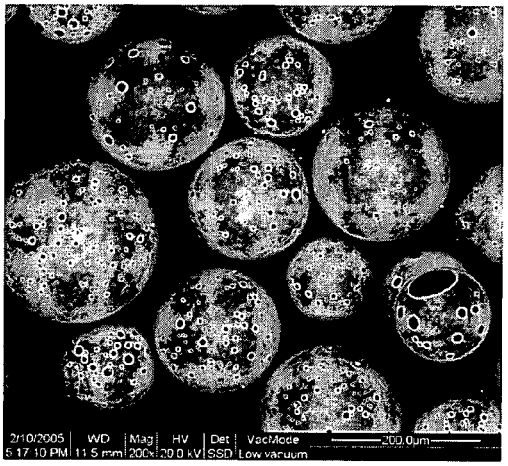
FIG. 30A is a scanning electron micrograph of engineered, heterogeneous microparticles of yet another embodiment of the present invention.
Figure 30B:
FIG. 30B is a scanning electron micrograph of the microparticle of FIG. 30A wherein the microparticles have been ruptured to illustrate the wall characteristics.

FIGS. 30A and 30B show particles corresponding with Product 1C from Table 21 fired at 1300° C. for a fixed residence time. As can be seen in Table 21, Product 1C corresponds with the sample exhibiting the lowest apparent density, even though its porosity appears significantly lower than Product 1B. In fact, Table 22 below, which lists the porosity and second-phase inclusions data verifies that Product 1C does have significantly less porosity than Product 1B.

TABLE 22

| Product | Gas Inclusions (percent) | Secondary-Phase Inclusions (percent) Fe (as an oxide) |
| --- | --- | --- |
| 1A | 18.66 ± 5.83 | 2.50 ± 0.97 |
| 1B | 18.98 ± 4.84 | 1.16 ± 0.67 |
| 1C | 8.44 ± 1.98 | 0.16 ± 0.08 |
| 1D | 10.74 ± 2.42 | 0 |
| 1E | 3.51 ± 1.87 | 0 |

The data shows that there is a decrease in the percentage of both gas and secondary-phase inclusions as the formation temperature is increased. At a first glance, the percentage of gas inclusions in Product 1D is larger than the number of inclusions in Product 1C; however, they are similar within the experimental error. The lowest density product in the group, Product 1C, has both gas and secondary-phase inclusions.

FIGS. 31A and 31B shows the results of Product 1D, which confirms that as firing temperature increases, the particles approach homogeneity. This is further exampled with reference to FIGS. 32A and 32B, showing the results of Product 1E fired at 1400° C. Reference to Table 22 further illustrates that as the firing temperature increases for a given residence time, the particles approach homogeneity as the percentage of both gas inclusions and secondary-phase inclusions approaches zero. The gas phase and secondary-phase inclusion measurements were verified through SEM/EDS analysis.

Example 1 illustrates that the lowest density particles in the group using the chosen formulation are obtained at a firing temperature of 1300° C. FIGS. 30A and 30B along with Table 22 verify that the produced particles are heterogeneous, e.g. they contain both gas and second-phase microinclusions. FIGS. 28A through 32B provide evidence of gas micro-inclusions on the microparticle surface as well as within the walls at the various formation temperatures. The porosity continues to decrease as the formation temperature increases; however, the particle density also increases.

The data in Table 22 further provides evidence of second-phase microinclusions in the form of undissolved iron and/or iron oxide particles in the microparticle walls. As expected, the percentage of these second-phase microinclusions decreases with increasing firing temperature.

Example 2

This example illustrates a method to make low-density heterogeneous microparticles from a formulation comprising clay, sodium hydroxide, molasses, and silicon carbidy by varying the formation temperature.

A sample was prepared by mixing 95.9 grams of clay which was ground to a $d_{50}$ particle size of about 3.5 microns, with 2 grams of solid sodium hydroxide, 1.5 grams of commercial molasses, and 0.6 grams of silicon carbide. The formulation is shown in Table 23. The composition of the clay is shown in Table 24.

TABLE 23

| Example 2 Formulation (grams) | |
| --- | --- |
| Clay | 95.9 |
| NaOH | 2.0 |
| Molasses | 1.5 |
| Silicon Carbide | 0.6 |

TABLE 24

Composition of Clay (percent)

| | |
|---|---|
| $SiO_2$ | 52.59 |
| $Al_2O_3$ | 13.48 |
| $Fe_2O_3$ | 4.91 |
| CaO | 5.96 |
| MgO | 4.65 |
| $SO_3$ | 0.00 |
| $Na_2O$ | 1.25 |
| $K_2O$ | 5.39 |
| $TiO_2$ | 0.65 |
| $Mn_2O_3$ | 0.15 |
| $P_2O_5$ | 0.15 |
| ZnO | 0.034 |
| $CrO_3$ | 0.008 |
| Cl | 0.005 |

Each mixture was blended to form a homogeneous slurry, poured into a flat dish and allowed to solidify at room temperature for approximately 5 minutes. The resulting product was further dried at about 70 degrees Celsius for at least 24 hours, after which it was ground and sieved to obtain powders within a size range of 106 to 180 microns. The powders were then fed into a vertical heated tube furnace at an approximate feed rate of 0.10 g/min. The residence time in the furnace was kept constant for each change in the formation temperature.

The resulting expanded microparticles were collected on a funnel shaped collecting device covered with a fine mesh screen positioned along the bottom portion of the furnace. A mild suction was applied to the end of funnel to aid in collecting the microparticles. The products were characterized for particle density (e.g. apparent density) by helium pycnometry and general microscopic examination by scanning electron microscopy (SEM). Some of the microparticles were then embedded in a resin, and the cured resin surface was polished until it included multiple particle cross-sections. The combination of SEM and energy dispersive spectroscopy (EDS) was then used to map the microparticle cross-sections thus locating any areas of gas and/or second-phase microinclusions.

For the second-phase microinclusions, the specific element that composes each inclusion was determined and was then converted into its simplest oxide form. Results are reported by dividing the area occupied by each type of microinclusion oxide by the total cross-sectional area analyzed. Measurements were conducted until at least 10 microparticles were analyzed and the total analyzed area exceeded 4000 square microns. The product was assessed for sodium leaching by exposure to Modified Lawrence Solution (MLS) at 180° C. and 135 psi for 5 hours.

Figure 33:
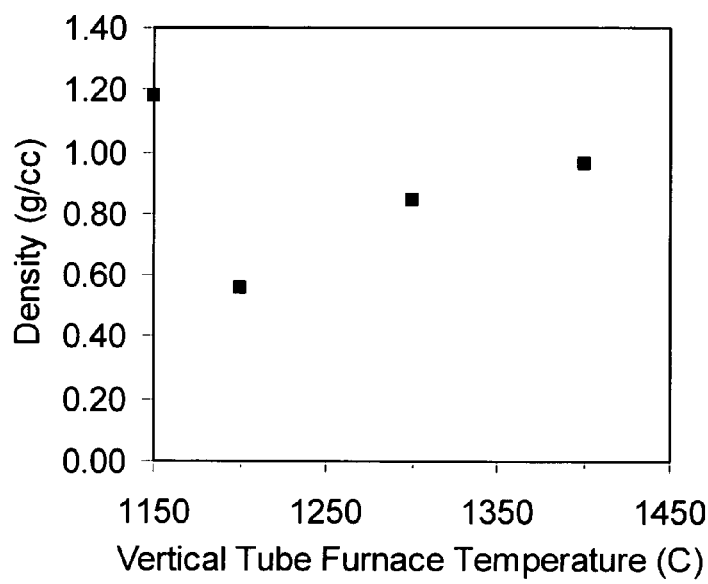
FIG. 33 is a density versus furnace temperature plot illustrating how the microparticle density of certain preferred embodiments varies with furnace temperature.
Figure 34A:
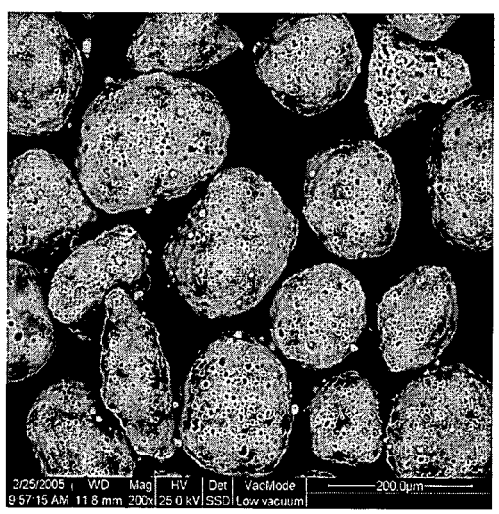
FIG. 34A is a scanning electron micrograph of an engineered, heterogeneous microparticle of yet another embodiment of the present invention.
Figure 34B:
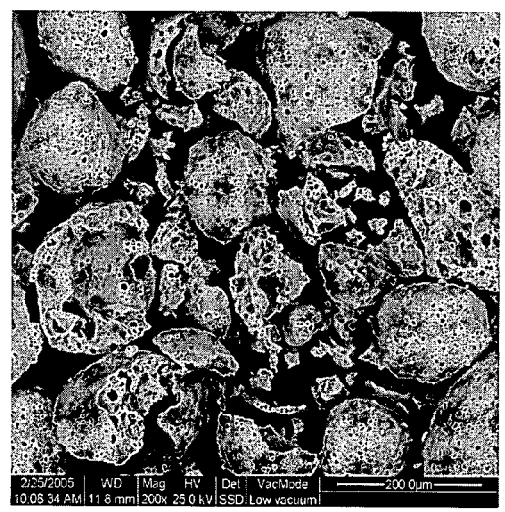
FIG. 34B is a scanning electron micrograph of the microparticle of FIG. 34A that has been ruptured to illustrate the wall characteristics.

Table 25 shows the various temperatures used in the vertical heated tube furnace and the apparent densities of the resulting products, while FIG. 33 shows the same data in a plot.

TABLE 25

Formation Temperatures and Apparent Densities of Various Products Made.

| | Formation Temperature (° C.) | Apparent Density (g/cc) |
|---|---|---|
| Product 2A | 1150 | 1.18 |
| | 1175 | 0.82 |
| Product 2B | 1200 | 0.56 |
| | 1225 | 0.57 |
| | 1250 | 0.62 |

TABLE 25-continued

Formation Temperatures and Apparent Densities of Various Products Made.

| | Formation Temperature (° C.) | Apparent Density (g/cc) |
|---|---|---|
| Product 2C | 1300 | 0.84 |
| Product 2D | 1400 | 0.96 |

FIGS. 34A-37B are SEM images of the various clay products formed, where the first image provides information about the microparticle morphology, e.g., overall shape, surface smoothness and porosity, and the second image confirms that the microparticles are hollow and provides details about the porosity and thickness of the microparticle walls.

The following Table 26 shows the percentage of gas and second-phase microinclusions in the polished microparticle cross section, expressed as a percentage of the total cross-sectional area measured.

TABLE 26

| Product | Gas Inclusions (percent) | Secondary-Phase Inclusions (percent) Fe (as an oxide) |
|---|---|---|
| 2A | 38.73 ± 4.02 | 0.49 ± 0.36 |
| 2B | 55.16 ± 6.11 | 0.22 ± 0.22 |
| 2C | 29.95 ± 5.50 | 0 |
| 2D | 19.78 ± 6.10 | 0 |

Figure 35A:
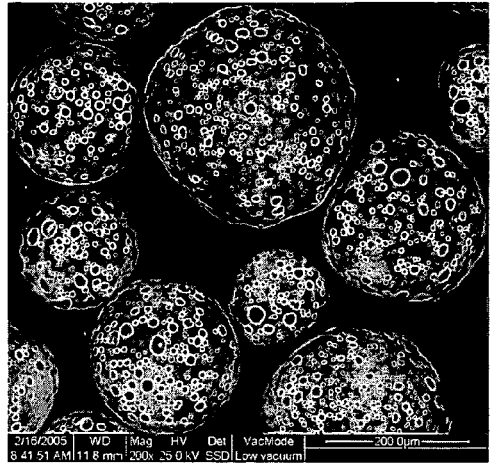
FIG. 35A is a scanning electron micrograph of an engineered, heterogeneous microparticle of yet another embodiment of the present invention.
Figure 35B:
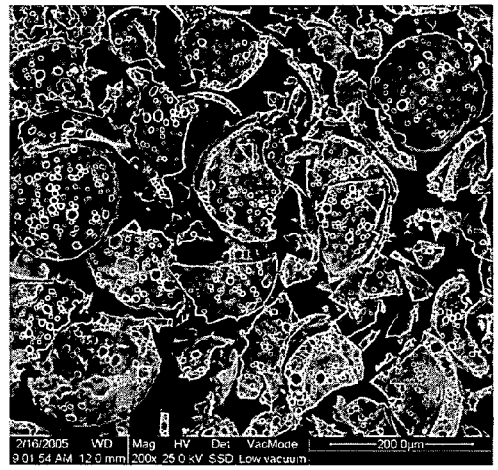
FIG. 35B is a scanning electron micrograph of the microparticle of FIG. 35A that has been ruptured to illustrate the wall characteristics.
Figure 36A:
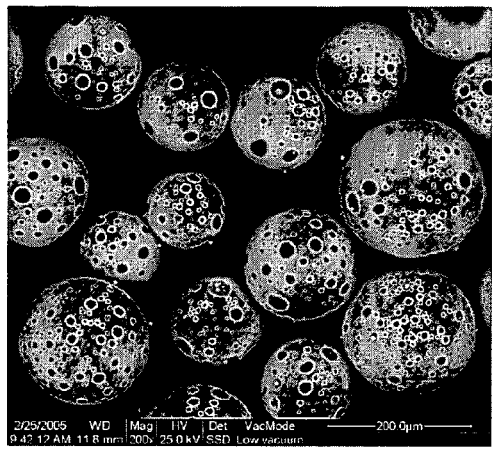
FIG. 36A is a scanning electron micrograph of an engineered, heterogeneous microparticle of yet another embodiment of the present invention.
Figure 36B:
FIG. 36B is a scanning electron micrograph of the microparticle of FIG. 36A that has been ruptured to illustrate the wall characteristics.
Figure 37A:
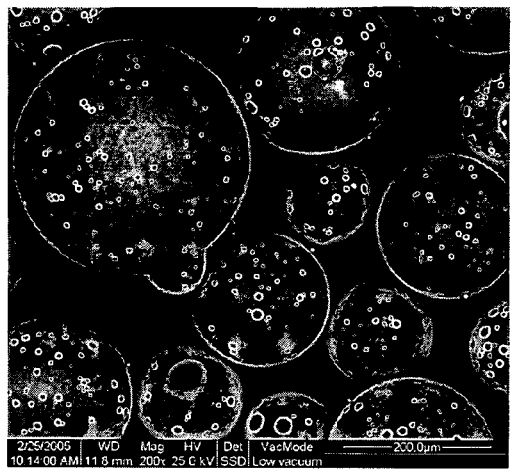
FIG. 37A is a scanning electron micrograph of an engineered, heterogeneous microparticle of yet another embodiment of the present invention.
Figure 37B:
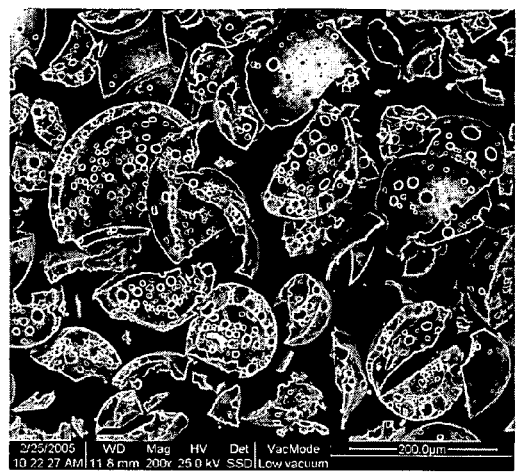
FIG. 37B is a scanning electron micrograph of the microparticle of FIG. 37A that has been ruptured to illustrate the wall characteristics.

The data shows that there is a decrease in the percentage of secondary-phase inclusions as the formation temperature is increased. The percentage of gas inclusions increase initially and then decrease from Product 2B to 2D, but the initial increase is expected since Product 2A has not been expanded completely into spheres, as illustrated in FIG. 35A. Expansion into spheres occurs in Product 2B, corresponding with FIG. 36A, which is the lowest density product in the group and contains both gas and secondary-phase inclusions. As expected in Product 2B, the additional gas produced by the blowing agent increases the porosity when compared with Product 2A. Following expansion into spheres, there is a decrease in the percentage of gas inclusions as the formation temperature is increased caused by the particle wall viscosity being reduced and gas coalescing and degassing occurring, shown in FIGS. 36A and 37A.

As shown in Table 25 and Table 26, and with concurrent reference to FIGS. 34A-37B, the lowest density expanded microparticles using the provided formulation are obtained at a formation temperature of about 1300° C. As the data shows, particles produced at this temperature are heterogeneous, that is, they include gas and/or second-phase inclusions. As the temperature increases, the porosity is reduced and the second-phase inclusions reduce. However, once the firing temperature is increased beyond about 1300° C., the particle density increases as the particle degasses and its volume is reduced accordingly.

Figure 38:
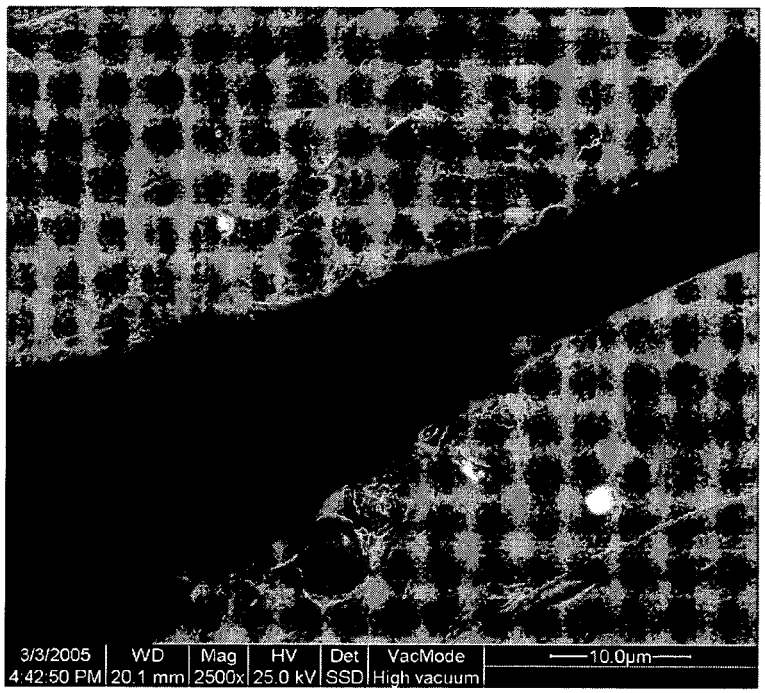
FIG. 38 is a scanning electron micrograph showing a cross section of one microparticle embodiment illustrating various phases present in the particle wall.

FIG. 38 is an SEM image illustrating a part of the wall cross-section of a heterogeneous microparticle of one preferred embodiment. The image shows the wall as comprising of an amorphous glassy phase surrounding a number of other solid phases. It is clearly seen that there are discrete microinclusions and voids contained within the wall of the microparticle.

An easily overlooked benefit of expanding particles as described herein is the energy savings when quenching the particles prior to homogeneity.

The described heterogeneous particles can be produced by any of the preferred methods disclosed herein, as well as by other methods typically used to cellulate or foam glass. In addition, this application discloses certain preferred glass formulation embodiments which can be used to produce any of the articles described herein, including fibers or the novel heterogeneous microspheres described above. Finally, the unique blowing agents and their uses can also be combined with the glass formulations and various articles disclosed herein.

In one specific embodiment, a precursor material is made from the described alkali resistant glass formulations, is combined with one or more of the blowing agents discussed herein, and is fired according to the novel firing parameters to produce a highly durable, low density, hollow microsphere wherein the sphere wall contains a glassy phase and either a crystalline phase or a gas phase, or both. Such a sphere results in a particularly low density sphere that is produced very economically from readily abundant materials yet still provides excellent alkali resistant characteristics.

Moreover, the inventors have engineered the synthetic articles produced according to the methods and materials described herein exhibit desirable chemical repeatability from sphere to sphere, especially in comparison with coal-ash derived cenospheres. The particle chemical repeatability allows the unique articles produced according to embodiments disclosed herein to have repeatable characteristics that can be engineered and relied upon when producing articles for a particular application. For example, as additives to a composite material, particles of different chemical make-ups may introduce non-uniformity in the composite matrix, thus introducing weak spots where degradation or failure may originate from and develop rapidly.

As discussed above, synthetic microparticles according to preferred embodiments described herein may be used as fillers in composite materials, where they impart properties of cost reduction, weight reduction, improved processing, performance enhancement, improved machinability and/or improved workability. More specifically, the synthetic microparticles may be used as fillers in polymers and polymer composites (including thermoset, thermoplastic, and inorganic geopolymers), inorganic cementitious materials (including material comprising Portland cement, lime cement, alumina-based cements, plaster, phosphate-based cements, magnesia-based cements, gypsum and other hydraulically settable binders), concrete composites and systems (including precast concrete structures, tilt up concrete panels, columns, suspended concrete structures etc.), putties (e.g. for void filling and patching applications), wood composites (including particleboards, fiberboards, wood/polymer composites and other composite wood structures), clays, and ceramics, metals, metal alloys and composites thereof. One particularly preferred use is in fiber cement building products.

Although the foregoing descriptions of certain preferred embodiments of the present invention have shown, described and pointed out some fundamental novel features of the invention, it will be understood that various omissions, substitutions, combinations, and changes in the form of the detail of the articles and methods as described as well as the uses thereof, may be made by those skilled in the art, without departing from the spirit of the invention.

The invention claimed is:

1. An engineered, low-density, heterogeneous microparticle, comprising:
a wall defining a primary void in the microparticle, wherein the wall comprises an amorphous phase and a crystalline phase, wherein the amorphous comprises an amorphous aluminum silicate based material and a pre-determined amount of solid micro-inclusions embedded in said amorphous aluminum silicate based material, wherein the solid micro-inclusions are comprised of materials that are not in an amorphous phase.

2. The microparticle of claim 1, wherein the micro-inclusions comprise crystalline solids.

3. The microparticle of claim 1, wherein the micro-inclusions comprise at least 5% of the volume of the microparticle.

4. The microparticle of claim 1, wherein the micro-inclusions comprise no more than 50% of the volume of the microparticle.

5. The microparticle of claim 1, wherein each micro-inclusion has a length of no greater than 0.1 mm.

6. The microparticle of claim 1, wherein the amount of micro-inclusions is pre-determined by the desired density of the microparticle.

7. A cementitious article incorporating the microparticle of claim 1.

8. A composite article incorporating the microparticle of claim 1.

* * * * *